(12) United States Patent
Abdelghaffar et al.

(10) Patent No.: US 11,791,969 B2
(45) Date of Patent: Oct. 17, 2023

(54) TECHNIQUES FOR CHANNEL STATE FEEDBACK FOR PANEL ADAPTATION

(71) Applicant: QUALCOMM Incorporated, San Diego, CA (US)

(72) Inventors: Muhammad Sayed Khairy Abdelghaffar, San Jose, CA (US); Hung Dinh Ly, San Diego, CA (US); Huilin Xu, Temecula, CA (US); Krishna Kiran Mukkavilli, San Diego, CA (US); Wanshi Chen, San Diego, CA (US); Hwan Joon Kwon, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 130 days.

(21) Appl. No.: 17/409,162

(22) Filed: Aug. 23, 2021

(65) Prior Publication Data

US 2023/0062380 A1    Mar. 2, 2023

(51) Int. Cl.
 *H04L 5/00* (2006.01)
 *H04W 24/10* (2009.01)

(52) U.S. Cl.
 CPC ........... *H04L 5/0057* (2013.01); *H04W 24/10* (2013.01)

(58) Field of Classification Search
 CPC .............................. H04L 5/0057; H04W 24/10
 USPC ....................................................... 370/329
 See application file for complete search history.

(56) References Cited

U.S. PATENT DOCUMENTS

| | | | |
|---|---|---|---|
| 2016/0157218 A1* | 6/2016 | Nam | H04B 7/0632 370/329 |
| 2019/0053072 A1* | 2/2019 | Kundargi | H04W 16/28 |
| 2019/0261329 A1* | 8/2019 | Park | H04L 5/0048 |
| 2022/0014956 A1* | 1/2022 | Rahman | H04L 5/0048 |
| 2023/0044880 A1* | 2/2023 | Cao | H04W 16/28 |

FOREIGN PATENT DOCUMENTS

| | | | | |
|---|---|---|---|---|
| CN | 111095977 | * | 5/2020 | |
| WO | WO 2018204571 | * | 11/2018 | ........... H04B 7/08 |
| WO | WO 2020/168296 | * | 8/2020 | ........... H04W 52/36 |

* cited by examiner

*Primary Examiner* — Christopher R Crompton
(74) *Attorney, Agent, or Firm* — QUALCOMM Incorporated

(57) ABSTRACT

Methods, systems, and devices for wireless communications are described. A user equipment (UE) may receive, from a base station, signaling indicating a channel state information (CSI) report configuration. The CSI report configuration may indicate a mapping between one or more CSI reference signal (CSI-RS) resources or one or more CSI-RS port groups and one or more antenna panels or antenna subpanels of the base station. The UE may generate CSI feedback based on the mapping. In some cases, the UE may generate the CSI feedback based on multiple hypotheses that correspond to CSI-RS measurements. In some examples, the multiple hypotheses may include a set of hypothesis groups based on one or more antenna panels or antenna subpanels of the base station. The UE may transmit a message reporting the CSI feedback to the base station.

30 Claims, 18 Drawing Sheets

TECHNIQUES FOR CHANNEL STATE FEEDBACK FOR PANEL ADAPTATION

FIELD OF TECHNOLOGY

The following relates to wireless communications, including techniques for channel state feedback for panel adaptation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, a device may transmit or receive the signals using multiple antennas or combinations of antennas. To reduce power consumption, the device, such as a base station, may power down or turn off some antenna panels or antenna elements (e.g., a subpanel of an antenna panel), which may be referred to as panel adaptation. However, turning off antenna panels or antenna elements may, in some cases, affect operations at a UE being served by the base station.

SUMMARY

The described techniques relate to improved methods, systems, devices, and apparatuses that support techniques for channel state feedback for panel adaptation. Generally, the described techniques provide for a UE to determine accurate channel state information (CSI) feedback based on receiving one or more CSI reference signals (CSI-RSs) from a base station with a single transmission/reception point (TRP), where the base station may have multiple collocated antenna panels. The base station may perform panel adaptation, where the base station may dynamically turn off and/or turn on a subset of the antenna panels to adjust throughput or power consumption. As a result, the UE may generate CSI feedback based on a number of active antenna panels or sub-panels at the base station. For instance, the base station may transmit a CSI configuration to the UE that indicates a mapping between resources used for the one or more CSI-RSs and one or more of active antenna panels, one or more active sub-panels, or a combination thereof. In some cases, antenna ports (e.g., or groups of antenna ports) associated with the CSI-RS may be mapped to antenna panels or sub-panels, or both. The UE may determine and report CSI feedback associated with a respective antenna panel or sub-panel based on the mapping.

In some examples, the UE may generate the CSI based on or according to multiple hypotheses. For instance, the hypotheses may include multiple hypothesis groups (e.g., with each group based on a quantity of antenna panels), where each hypothesis group includes a set of one or more hypotheses. Each hypothesis in a hypothesis group may be based on a respective antenna panel or subset of the antenna panels. The UE may transmit CSI reports indicating the CSI feedback based on the hypotheses (e.g., or hypotheses groups). In some examples, the hypotheses from one or more hypothesis groups may be associated with respective indicators (e.g., CSI-RS resource indicators (CRIs)), which may be included in the CSI feedback. A method for wireless communications at a UE is described. The method may include receiving, from a base station, signaling indicating a CSI report configuration that indicates one or more CSI-RS resources, where the one or more CSI-RS resources are mapped to at least one antenna panel of the base station, receiving one or more CSI-RSs on the one or more CSI-RS resources based on the CSI report configuration, and transmitting, to the base station, a message reporting CSI feedback based on measurements associated with the received one or more CSI-RSs.

A method for wireless communications at a UE is described. The method may include receiving, from a base station, signaling indicating a CSI report configuration that indicates one or more CSI-RS resources, where the one or more CSI-RS resources are mapped to at least one antenna panel of the base station, receiving one or more CSI-RSs on the one or more CSI-RS resources based on the CSI report configuration, and transmitting, to the base station, a message reporting CSI feedback based on measurements associated with the received one or more CSI-RSs.

An apparatus for wireless communications at a UE is described. The apparatus may include a processor, memory coupled with the processor, and instructions stored in the memory. The instructions may be executable by the processor to cause the apparatus to receive, from a base station, signaling indicating a CSI report configuration that indicates one or more CSI-RS resources, where the one or more CSI-RS resources are mapped to at least one antenna panel of the base station, receive one or more CSI-RSs on the one or more CSI-RS resources based on the CSI report configuration, and transmit, to the base station, a message reporting CSI feedback based on measurements associated with the received one or more CSI-RSs.

Another apparatus for wireless communications at a UE is described. The apparatus may include means for receiving, from a base station, signaling indicating a CSI report configuration that indicates one or more CSI-RS resources, where the one or more CSI-RS resources are mapped to at least one antenna panel of the base station, means for receiving one or more CSI-RSs on the one or more CSI-RS resources based on the CSI report configuration, and means for transmitting, to the base station, a message reporting CSI feedback based on measurements associated with the received one or more CSI-RSs.

A non-transitory computer-readable medium storing code for wireless communications at a UE is described. The code may include instructions executable by a processor to receive, from a base station, signaling indicating a CSI report configuration that indicates one or more CSI-RS resources, where the one or more CSI-RS resources are mapped to at least one antenna panel of the base station, receive one or more CSI-RSs on the one or more CSI-RS resources based on the CSI report configuration, and transmit, to the base station, a message reporting CSI feedback based on measurements associated with the received one or more CSI-RSs.

Some examples of the method, apparatuses, and non-transitory computer-readable medium described herein may further include operations, features, means, or instructions for generating the CSI feedback based on respective CSI-RS resources of the one or more CSI-RS resources being mapped to respective antenna panels of the base station in accordance with the CSI report configuration.

In some examples of the method, apparatuses, and non-transitory computer-readable medium described herein, generating the CSI feedback may include operations, features, means, or instructions for generating the CSI feedback based on a first quantity of CSI-RS ports associated with a first antenna panel of the base station and a second quantity of CSI-RS ports associated with a second antenna panel of the base station, the first antenna panel being mapped to a first CSI-RS resource and the second antenna panel being mapped to a second CSI-RS resource.

In some examples of the method, apparatuses, and non-transitory computer-readable medium described herein, the first quantity of CSI-RS ports may be the same as the second quantity of CSI-RS ports based on a number of antenna elements of the first antenna panel being the same as a number of antenna elements of the second antenna panel.

In some examples of the method, apparatuses, and non-transitory computer-readable medium described herein, the first quantity of CSI-RS ports may be different from the second quantity of CSI-RS ports based on a number of antenna elements of the first antenna panel being different from a number of antenna elements of the second antenna panel.

Some examples of the method, apparatuses, and non-transitory computer-readable medium described herein may further include operations, features, means, or instructions for generating the CSI feedback based on a CSI-RS resource of the one or more CSI-RS resources being mapped to multiple antenna panels of the base station in accordance with the CSI report configuration.

In some examples of the method, apparatuses, and non-transitory computer-readable medium described herein, generating the CSI feedback may include operations, features, means, or instructions for identifying a set of multiple port groups associated with the one or more CSI-RSs, where at least a first port group of the set of multiple port groups may be associated with a first set of CSI-RS ports and a second port group of the set of multiple port groups may be associated with a second set of CSI-RS ports and generating the CSI feedback based on the set of multiple port groups.

In some examples of the method, apparatuses, and non-transitory computer-readable medium described herein, each port group of the set of multiple port groups may be mapped to a respective antenna panel of the base station.

In some examples of the method, apparatuses, and non-transitory computer-readable medium described herein, a first antenna panel of the base station may be mapped to one or more port group of the set of multiple port groups based on a first number of antenna elements of the first antenna panel, and a second antenna panel of the base station may be mapped to a single port group of the set of multiple port groups based on a second number of antenna elements of the second antenna panel.

In some examples of the method, apparatuses, and non-transitory computer-readable medium described herein, the set of multiple port groups may be based on one or more code division multiplexing (CDM) groups associated with CSI-RS locations, the CSI report configuration indicating a mapping between each of the one or more CDM groups and respective port groups of the set of multiple port groups.

Some examples of the method, apparatuses, and non-transitory computer-readable medium described herein may further include operations, features, means, or instructions for generating the CSI feedback based on a CSI-RS resource of the one or more CSI-RS resources being mapped to multiple sub-panels of an antenna panel of the base station in accordance with the CSI report configuration.

In some examples of the method, apparatuses, and non-transitory computer-readable medium described herein, generating the CSI feedback may include operations, features, means, or instructions for identifying a set of multiple port groups associated with the one or more CSI-RSs, where at least a first port group of the set of multiple port groups may be associated with a first set of CSI-RS ports and a second port group of the set of multiple port groups may be associated with a second set of CSI-RS ports and generating the CSI feedback based on the set of multiple port groups.

In some examples of the method, apparatuses, and non-transitory computer-readable medium described herein, each port group of the set of multiple port groups may be mapped to respective sub-panels of the antenna panel of the base station.

In some examples of the method, apparatuses, and non-transitory computer-readable medium described herein, a first sub-panel of the antenna panel may be mapped to one or more port group of the set of multiple port groups based on a first number of antenna elements of the first sub-panel, and and a second sub-panel of the antenna panel may be mapped to a single port group of the set of multiple port groups based on a second number of antenna elements of the second sub-panel.

In some examples of the method, apparatuses, and non-transitory computer-readable medium described herein, the set of multiple port groups may be based on one or more CDM groups associated with CSI-RS locations, the CSI report configuration indicating a mapping between each of the one or more CDM groups and respective port groups of the set of multiple port groups.

In some examples of the method, apparatuses, and non-transitory computer-readable medium described herein, the CSI report configuration may be associated with a single transmission configuration indicator (TCI) state.

A method for wireless communications at a UE is described. The method may include receiving, from a base station, signaling indicating a CSI report configuration that indicates one or more CSI-RS resources, where the one or more CSI-RS resources correspond to a set of antenna panels of the base station, a set of sub-panels of an antenna panel of the base station, or any combination thereof, generating CSI based on a set of multiple hypotheses corresponding to measurements of one or more CSI-RSs received on the one or more CSI-RS resources, where the set of multiple hypotheses are based on the set of antenna panels, the set of sub-panels, or any combination thereof, and transmitting, to the base station, a message reporting CSI feedback based on the set of multiple hypotheses.

An apparatus for wireless communications at a UE is described. The apparatus may include a processor, memory coupled with the processor, and instructions stored in the memory. The instructions may be executable by the processor to cause the apparatus to receive, from a base station, signaling indicating a CSI report configuration that indicates one or more CSI-RS resources, where the one or more CSI-RS resources correspond to a set of antenna panels of the base station, a set of sub-panels of an antenna panel of the base station, or any combination thereof, generate CSI based on a set of multiple hypotheses corresponding to measurements of one or more CSI-RSs received on the one or more CSI-RS resources, where the set of multiple hypotheses are based on the set of antenna panels, the set of sub-panels, or any combination thereof, and transmit, to the base station, a message reporting CSI feedback based on the set of multiple hypotheses.

Another apparatus for wireless communications at a UE is described. The apparatus may include means for receiving, from a base station, signaling indicating a CSI report configuration that indicates one or more CSI-RS resources, where the one or more CSI-RS resources correspond to a set of antenna panels of the base station, a set of sub-panels of an antenna panel of the base station, or any combination thereof, means for generating CSI based on a set of multiple hypotheses corresponding to measurements of one or more CSI-RSs received on the one or more CSI-RS resources, where the set of multiple hypotheses are based on the set of antenna panels, the set of sub-panels, or any combination thereof, and means for transmitting, to the base station, a message reporting CSI feedback based on the set of multiple hypotheses.

A non-transitory computer-readable medium storing code for wireless communications at a UE is described. The code may include instructions executable by a processor to receive, from a base station, signaling indicating a CSI report configuration that indicates one or more CSI-RS resources, where the one or more CSI-RS resources correspond to a set of antenna panels of the base station, a set of sub-panels of an antenna panel of the base station, or any combination thereof, generate CSI based on a set of multiple hypotheses corresponding to measurements of one or more CSI-RSs received on the one or more CSI-RS resources, where the set of multiple hypotheses are based on the set of antenna panels, the set of sub-panels, or any combination thereof, and transmit, to the base station, a message reporting CSI feedback based on the set of multiple hypotheses.

In some examples of the method, apparatuses, and non-transitory computer-readable medium described herein, and the method, apparatuses, and non-transitory computer-readable medium may include further operations, features, means, or instructions for a first hypothesis group of the set of hypothesis groups including one or more hypotheses based on respective antenna panels of the set of antenna panels, respective sub-panels of the set of sub-panels, or any combination thereof, a second hypothesis group of the set of hypothesis groups including one or more hypotheses based on antenna panel pairs of the set of antenna panels, sub-panel pairs of the set of sub-panels, or any combination thereof, a third hypothesis group of the set of hypothesis groups including one or more hypotheses based on a set of multiple antenna panels of the set of antenna panels, a set of multiple sub-panels of the set of sub-panels, or any combination thereof, and a fourth hypothesis group of the set of hypothesis groups including a single hypothesis based on the set of antenna panels, the set of sub-panels, or any combination thereof.

Some examples of the method, apparatuses, and non-transitory computer-readable medium described herein may further include operations, features, means, or instructions for receiving, within the CSI report configuration, an indication to use one or more hypothesis groups from the set of hypothesis groups, where generating the CSI feedback may be based on the one or more hypothesis groups.

In some examples of the method, apparatuses, and non-transitory computer-readable medium described herein, transmitting the message reporting the CSI feedback may include operations, features, means, or instructions for generating a first CSI report including first CSI feedback that may be based on a first hypothesis selected from a first set of multiple hypotheses of a first hypothesis group, generating a second CSI report including second CSI feedback that may be based on a second hypothesis selected from a second set of multiple hypotheses of a second hypothesis group, and transmitting the first CSI report and the second CSI report to the base station.

In some examples of the method, apparatuses, and non-transitory computer-readable medium described herein, transmitting the message reporting the CSI feedback may include operations, features, means, or instructions for generating one or more first CSI reports each including CSI feedback that may be based on respective hypotheses selected from a first set of multiple hypotheses of a first hypothesis group, generating one or more second CSI reports each including CSI feedback that may be based on respective hypotheses selected from a second set of multiple hypotheses of a second hypothesis group, and transmitting the one or more first CSI reports and the one or more second CSI reports to the base station.

In some examples of the method, apparatuses, and non-transitory computer-readable medium described herein, transmitting the message reporting the CSI feedback may include operations, features, means, or instructions for generating a first CSI report including first CSI feedback that may be based on a first hypothesis selected from a set of hypothesis groups, generating a second CSI report including second CSI feedback that may be based on a second hypothesis corresponding to a single antenna panel of the set of antenna panels, or a single sub-panel of the set of sub-panels, or any combination thereof, and transmitting the first CSI report and the second CSI report to the base station.

In some examples of the method, apparatuses, and non-transitory computer-readable medium described herein, transmitting the message reporting the CSI feedback may include operations, features, means, or instructions for generating a first CSI report including first CSI feedback that may be based on a first hypothesis selected from a set of hypothesis groups, generating a second CSI report including second CSI feedback that may be based on a second hypothesis corresponding to a threshold number of antenna panels of the set of antenna panels, or a threshold number of sub-panels of the set of sub-panels, or any combination thereof, and transmitting the first CSI report and the second CSI report to the base station.

In some examples of the method, apparatuses, and non-transitory computer-readable medium described herein, the set of multiple hypotheses includes a set of hypothesis groups and the method, apparatuses, and non-transitory computer-readable medium may include further operations, features, means, or instructions for determining respective CSI-RS resource indicators for respective hypotheses from each hypothesis group, or respective CSI-RS resource indicators for respective hypotheses from the set of hypothesis groups, or any combination thereof, where the CSI feedback includes an indication of the respective CSI-RS resource indicators.

Some examples of the method, apparatuses, and non-transitory computer-readable medium described herein may further include operations, features, means, or instructions for transmitting, to the base station, signaling including capability information for the UE, the capability information including a threshold number of hypothesis groups, or a threshold number of hypotheses within a hypothesis group, or a threshold number of CSI reports within a hypothesis group, or a threshold number of CSI reports for a set of multiple hypothesis groups, or any combination thereof.

A method for wireless communications at a base station is described. The method may include transmitting, to a UE, signaling indicating a CSI report configuration that indicates one or more CSI-RS resources, where the one or more CSI-RS resources correspond to at least one antenna panel of the base station, transmitting one or more CSI-RSs on the one or more CSI-RS resources based on the CSI report configuration, and receiving, from the UE, a message reporting CSI feedback based on measurements associated with the received one or more CSI-RSs.

An apparatus for wireless communications at a base station is described. The apparatus may include a processor, memory coupled with the processor, and instructions stored in the memory. The instructions may be executable by the processor to cause the apparatus to transmit, to a UE, signaling indicating a CSI report configuration that indicates one or more CSI-RS resources, where the one or more CSI-RS resources correspond to at least one antenna panel of the base station, transmit one or more CSI-RSs on the one or more CSI-RS resources based on the CSI report configuration, and receive, from the UE, a message reporting CSI feedback based on measurements associated with the received one or more CSI-RSs.

Another apparatus for wireless communications at a base station is described. The apparatus may include means for transmitting, to a UE, signaling indicating a CSI report configuration that indicates one or more CSI-RS resources, where the one or more CSI-RS resources correspond to at least one antenna panel of the base station, means for transmitting one or more CSI-RSs on the one or more CSI-RS resources based on the CSI report configuration, and means for receiving, from the UE, a message reporting CSI feedback based on measurements associated with the received one or more CSI-RSs.

A non-transitory computer-readable medium storing code for wireless communications at a base station is described. The code may include instructions executable by a processor to transmit, to a UE, signaling indicating a CSI report configuration that indicates one or more CSI-RS resources, where the one or more CSI-RS resources correspond to at least one antenna panel of the base station, transmit one or more CSI-RSs on the one or more CSI-RS resources based on the CSI report configuration, and receive, from the UE, a message reporting CSI feedback based on measurements associated with the received one or more CSI-RSs.

Some examples of the method, apparatuses, and non-transitory computer-readable medium described herein may further include operations, features, means, or instructions for determining a mapping between respective CSI-RS resources of the one or more CSI-RS resources and respective antenna panels of the base station, the CSI report configuration indicating the mapping, where the CSI feedback may be based on the respective CSI-RS resources of the one or more CSI-RS resources being mapped to the respective antenna panels of the base station in accordance with the CSI report configuration.

Some examples of the method, apparatuses, and non-transitory computer-readable medium described herein may further include operations, features, means, or instructions for determining a mapping between a CSI-RS resource of the one or more CSI-RS resources and multiple antenna panels of the base station and identifying a set of multiple port groups associated with the one or more CSI-RSs, at least a first port group of the set of multiple port groups being associated with a first set of CSI-RS ports and a second port group of the set of multiple port groups being associated with a second set of CSI-RS ports, where the CSI feedback may be based on a set of multiple port groups and the CSI-RS resource being mapped to the multiple antenna panels of the base station, and where the set of multiple port groups may be based on one or more CDM groups associated with CSI-RS locations.

Some examples of the method, apparatuses, and non-transitory computer-readable medium described herein may further include operations, features, means, or instructions for determining a mapping between a CSI-RS resource of the one or more CSI-RS resources and multiple sub-panels of an antenna panel of the base station and identifying a set of multiple port groups associated with the one or more CSI-RSs, at least a first port group of the set of multiple port groups being associated with a first set of CSI-RS ports and a second port group of the set of multiple port groups being associated with a second set of CSI-RS ports, where the CSI feedback may be based on the set of multiple port groups and the CSI-RS resource being mapped to the multiple sub-panels, and where the set of multiple port groups may be based on one or more CDM groups associated with CSI-RS locations.

DETAILED DESCRIPTION

Figure 1:
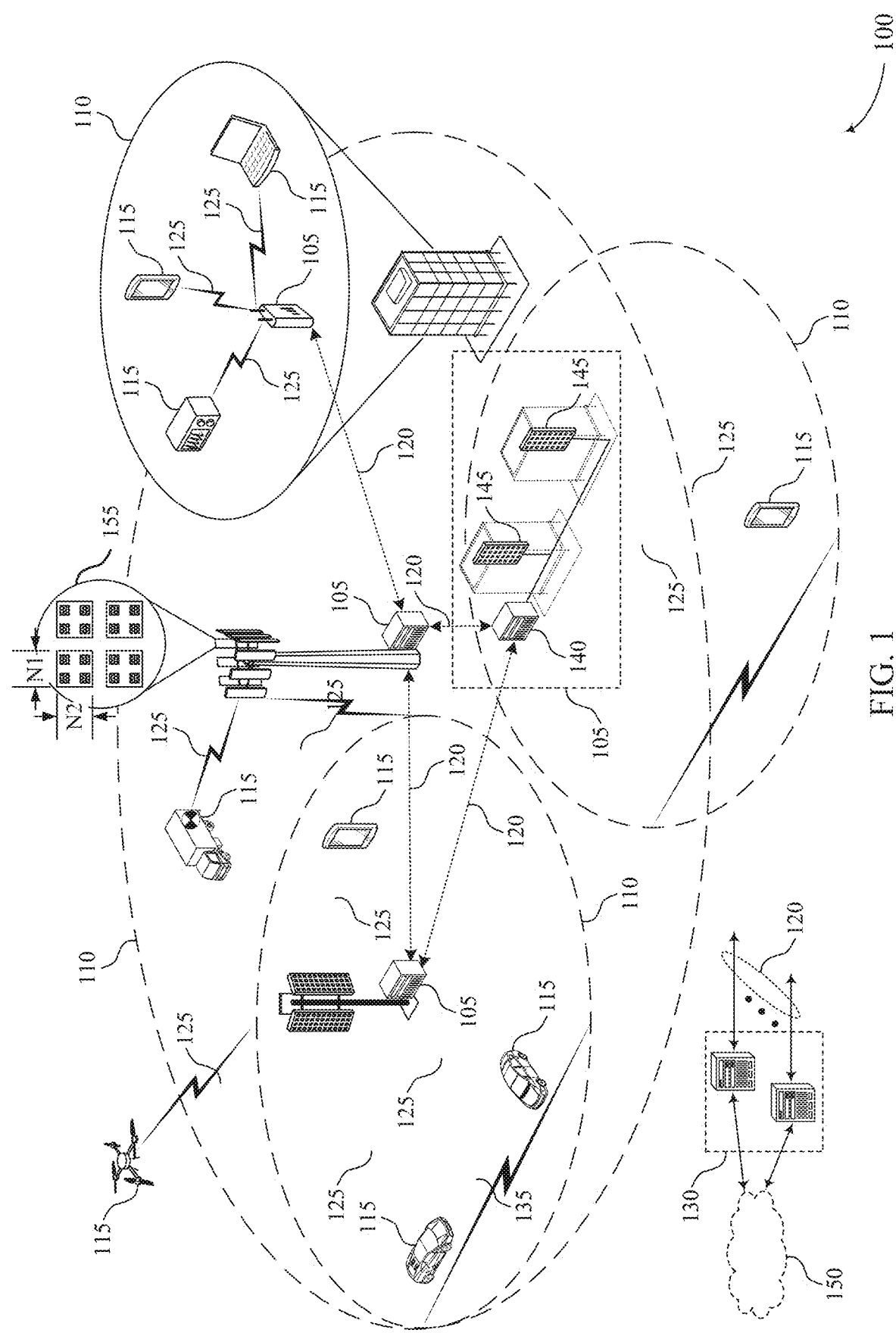
FIGS. 1 and 2 illustrate examples of wireless communications systems that support techniques for channel state feedback for panel adaptation in accordance with aspects of the present disclosure.

In some wireless communications systems, devices (e.g., user equipment (UE), base stations) may support multiple input multiple output (MIMO) communications, in which a device transmits and receives multiple signals using different spatial layers. In some cases, the device may transmit and receive the multiple signals using multiple antennas or combinations of antennas. For instance, a base station may have multiple antenna panels, where each antenna panel includes multiple antenna elements. In such cases, each antenna element may be associated with one or more radio frequency (RF) components. The use of a relatively large number of antenna elements (and corresponding RF components), however, may be associated with considerable power consumption. Thus, as the quantity of antenna elements increases, the power consumption may also increase; consequently, power consumption in a system with many multiple-panel base stations may be significant.

To reduce power consumption, a base station may perform panel adaptation by dynamically activating or deactivating (e.g., turning off, powering down) a subset of antenna panels or antenna subpanels. For example, if traffic in a cell served by the base station is relatively low, the base station may reduce the number of active panels, which may conserve power while providing service to the cell. Such techniques may be referred to as panel adaptation or other terminology. In some cases, however, operations at a UE being served by the base station may be affected by panel adaptation. As an example, the UE may determine and report channel state information (CSI) feedback to the base station based on receiving and measuring one or more CSI reference signals (CSI-RSs). If the base station is implementing panel adaptation, the UE may be unaware that some panels at the base station are deactivated and may determine the CSI assuming that all panels are active. As such, the CSI report may not provide feedback that is representative of the panels or subpanels currently active at the base station. Panel adaptation at a base station may therefore negatively impact the usefulness of CSI feedback provided by the UE.

According to the techniques described herein, a UE may determine CSI feedback for communications with a base station (e.g., that performs panel adaptation), where the base station may have a single transmission/reception point (TRP) with multiple collocated antenna panels or multiple subpanels of an antenna panel. That is, the CSI feedback may be generated by the UE based on a quantity of active panels (e.g., or subpanels) at the base station. For instance, the base station may transmit, to the UE, a configuration for CSI reporting (e.g., a CSI report configuration, CSI-report-Config) that indicates CSI-RS resources. The resources may be mapped to one or more antenna panels or subpanels of the base station, and the configuration may be associated with a single transmission configuration indicator (TCI) state. In a first example, the CSI report configuration may indicate a set of multiple CSI-RS resources, and each antenna panel of the base station may be mapped to a separate CSI-RS resource. Here, a different CSI-RS resource may be configured per antenna panel. In a second example, the CSI report configuration may indicate a single CSI-RS resource that is mapped to multiple antenna panels. In this example, the CSI-RS resource may be associated with multiple antenna ports (e.g., groups of antenna ports) and the CSI report configuration may indicate a mapping between antenna ports and respective antenna panels or subpanels. In some cases, the groups of antenna ports may correspond to code division multiplexing groups. In any case, the UE may receive and measure the CSI-RS in accordance with the configuration (e.g., based on the mapping) of the CSI-RS resources. The UE may generate and report CSI feedback associated with respective antenna panels or subpanels based on the mapping.

In some examples, the UE may generate the CSI based on or according to one or more hypotheses that correspond to the CSI-RS resource mapping. For instance, for a single TRP with multiple panels or subpanels and each panel or subpanel is mapped to a single CSI-RS resource, the UE may perform multiple hypotheses when generating CSI feedback. The hypotheses may include multiple hypothesis groups (e.g., based on a quantity of antenna panels), where each hypothesis group includes a set of one or more hypotheses. Each hypothesis in a hypothesis group may be based on a respective antenna panel or subset of the antenna panels, and each hypothesis group may have a different number of hypotheses per panel. For instance, a first hypothesis group may include one hypothesis for each panel, while a second hypothesis group may include one hypothesis for each pair of panels. The UE may transmit CSI reports indicating the CSI feedback based on the hypotheses (e.g., or hypotheses groups). In some examples, the hypotheses may be associated with respective indicators (e.g., CSI-RS resource indicators (CRIs)), which may be included in the CSI feedback.

Particular aspects of the subject matter described herein may be implemented to realize one or more advantages. The described techniques may support reduced power consumption in systems utilizing MIMO or other techniques. For example, by indicating a mapping between CSI-RS resources and antenna panels, a base station may dynamically perform panel adaptation to conserve power without adversely affecting CSI operations at a UE. In another example, the base station may configure the UE to report CSI associated with hypotheses based on an energy saving mode or a spectral efficiency mode. Here, the base station may utilize the CSI reports to more efficiently perform panel adaptation to achieve reduced power consumption (e.g., based on CSI reports associated with the energy saving mode), increased throughput (e.g., based on CSI reports associated with the spectral efficiency mode), or the like.

Additionally, the described techniques support improvements in CSI procedures performed at the UE. For instance, the UE may generate CSI feedback with increased granularity. More specifically, the UE may generate CSI feedback for respective panels based on a mapping between the panels and the CSI-RS resources, which may relatively increase the accuracy and efficacy of the CSI feedback as compared to generating CSI independent of the mapping. Thus, the supported techniques may include improved UE operations, and, in some examples, may promote efficiencies in communications, among other benefits.

Aspects of the disclosure are initially described in the context of wireless communications systems. Aspects of the disclosure are then illustrated by antenna panel configurations, port group configurations, and resource configurations, as well as a process flow. Aspects of the disclosure are further illustrated by and described with reference to apparatus diagrams, system diagrams, and flowcharts that relate to techniques for channel state feedback for panel adaptation.

FIG. 1 illustrates an example of a wireless communications system 100 that supports techniques for channel state feedback for panel adaptation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $TS=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI-RS (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). CSI may provide information regarding the properties of a communication link, and CSI may describe how a signal propagates from base station 105 to a UE 115. In some examples, CSI may represent some aspects of scattering, fading, and power decay for a transmitted signal over a wireless link. CSI feedback may enable the adaptation of transmissions to current channel conditions, particularly for signal transmitted using multiple antennas. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A quasi co-location (QCL) relationship between one or more transmissions or signals may refer to a relationship between the antenna ports (and the corresponding signaling beams) of the respective transmissions. For example, one or more antenna ports may be implemented by a base station 105 for transmitting at least one or more reference signals (such as a downlink reference signal, a synchronization signal block (SSB), or the like) and control information transmissions to a UE 115. However, the channel properties of signals sent via the different antenna ports may be interpreted (e.g., by a receiving device) to be the same (e.g., despite the signals being transmitted from different antenna ports), and the antenna ports (and the respective beams) may be described as being quasi co-located (QCLed). QCLed signals may enable the UE 115 to derive the properties of a first signal (e.g., delay spread, Doppler spread, frequency shift, average power, etc.) transmitted on a first antenna port from measurements made on a second signal transmitted via a second antenna port. Put another way, if two antenna ports are categorized as being QCLed in terms of, for example, delay spread then the UE 115 may determine the delay spread for one antenna port (e.g., based on a received reference signal, such as CSI-RS) and then apply the result to both antenna ports. Such techniques may avoid the UE 115 determining the delay spread separately for each antenna port. In some cases, two antenna ports may be said to be spatially QCLed, and the properties of a signal sent over a directional beam may be derived from the properties of a different signal over another, different directional beam. That is, QCL relationships may relate to beam information for respective directional beams used for communications of various signals.

Different types of QCL relationships may describe the relation between two different signals or antenna ports. For instance, QCL-TypeA may refer to a QCL relationship between signals including Doppler shift, Doppler spread, average delay, and delay spread. QCL-TypeB may refer to a QCL relationship including Doppler shift and Doppler spread, whereas QCL-TypeC may refer to a QCL relationship including Doppler shift and average delay. A QCL-TypeD may refer to a QCL relationship of spatial parameters, which may indicate a relation between two or more directional beams used to communicate signals. Here, the spatial parameters indicate that a first beam used to transmit a first signal may be similar (or the same) as another beam used to transmit a second, different, signal, or, that the same receive beam may be used to receive both the first and the second signal. Thus, the beam information for various beams may be derived through receiving signals from a transmitting device, where, in some cases, the QCL information or spatial information may help a receiving device efficient identify communications beams (e.g., without having to sweep through a large number of beams to identify the best beam (e.g., the beam having a highest signal quality)). In addition, QCL relationships may exist for both uplink and downlink transmissions and, in some cases, a QCL relationship may also be referred to as spatial relationship information.

In some examples, a transmission configuration indication (TCI) state configuration may include one or more parameters associated with a QCL relationship between transmitted signals. For example, a base station 105 may configure a QCL relationship that provides a mapping between a reference signal and antenna ports of another signal (e.g., a demodulation reference signal (DMRS) antenna port for PDCCH, a DMRS antenna port for PDSCH, a CSI-RS antenna port for CSI-RS, or the like), and the TCI state may be indicated to the UE 115 by the base station 105. In some cases, a set of TCI states may be indicated to a UE 115 via RRC signaling, where some number of TCI states (e.g., a pool of 8 TCI states from of a total of 64 TCI states may be configured via RRC) and a particular TCI state may be indicated via downlink control information (DCI) (e.g., within a CORESET). The QCL relationship associated with the TCI state (and further established through higher-layer parameters) may provide the UE 115 with the QCL relationship for respective antenna ports and reference signals transmitted by the base station 105.

A UE 115 and a base station 105 may communicate over a communication link 125. The base station 105 may include or may be an example of a single TRP. In some implementations, the UE 115 may perform one or more channel measurements of the communication link 125 between the UE 115 and the base station 105 to determine a channel quality associated with the communication link 125. For instance, the base station 105 may transmit one or more CSI-RSs to the UE 115 for the UE 115 to use in determining a channel estimate that is used to assist in link adaptation. The UE 115 may perform one or more channel measurements (e.g., CSI measurements) based on the one or more received CSI-RSs and may transmit a CSI report to the base station 105. Based on the CSI report, the UE 115, the base station 105, or both, may adapt transmission parameters to maintain a reliable communication link between the UE 115 and the base station 105.

In some examples, the CSI report may include one or more parameters based on the CSI measurements. For instance, the CSI report may include one or more precoding matrix indicators (PMIs), rank indicators (RIs), layer indicators (LIs), channel quality indicators (CQIs), reference signal received power (RSRP) measurements (e.g., Layer 1-RSRPs (L1-RSRPs)), signal to interference plus noise (SINR) measurements (e.g., L1-SINRs), or the like. In some examples, the UE 115 may perform periodic CSI reporting (e.g., the base station 105 may transmit higher layer signaling scheduling periodic CSI reports), aperiodic CSI reporting (e.g., the base station 105 may dynamically configure a CSI report), semi-persistent CSI reporting (e.g., the base station 105 may transmit higher layer signaling scheduling periodic CSI reports and may use dynamic signaling to trigger the periodic CSI reporting), or a combination thereof.

In some examples, the base station 105 may configure a set of CSI measurement resources, such as CSI-RS resources, and the UE 115 may perform the one or more channel measurements over one or more of the configured set of CSI measurement resources. For example, the base station 105 may transmit control signaling, such as a radio resource control (RRC) message, that indicates a CSI report configuration. The CSI report configuration may indicate the configured set of CSI measurement resources, as well as any other resource settings that the UE 115 may select and use to generate a CSI report based on channel and interference measurements performed in accordance with the selected resource setting. For example, the UE 115 may receive the control signaling including the CSI report configuration, which may link to one or more resource settings associated with different measurement types. The CSI report configuration may link to a setting for one or more of a non-zero power (NZP) CSI-RS resource for channel measurement (CMR), a CSI-RS resource for interference measurement (CSI-IM), or an NZP CSI-RS for interference measurement (NZP IMR), or any combination thereof. Each resource setting of the one or more resource settings to which the CSI report configuration links may be associated with multiple resources sets, but one active resource set (for example, one active resource set). The UE 115 may select one or more resources from a resource set to use for reporting the CSI. In some cases, the UE 115 may include, in the CSI report, a resource indicator (e.g., a CRI) associated with the selected one or more resources; in this manner, the base station 105 may be informed of the correspondence between the selected resource and the reported CSI.

In some examples of the wireless communications system 100, the base station 105, the UE 115, or both, may be configured with multiple antennas, which may be used to employ techniques such as transmit diversity, receive diversity, MIMO communications, or beamforming, or any combination thereof. For example, in MIMO operations, a device may transmit and receive multiple signals using different spatial layers based on one or more antenna ports of an antenna panel. As another example, multiple antennas may enable full duplex communications, where a device may transmit and receive simultaneously (e.g., in a same time frame); in sub-band full duplex communications, for instance, both uplink and downlink transmissions may share a same time resource (e.g., and different frequency resources). MIMO and full duplex communications may increase throughput and reduce latency in the wireless communications system 100.

The antennas of the base station 105 and the UE 115 may be located within one or more antenna arrays or antenna panels arranged in an antenna configuration 155 and may be collocated. For example, the antenna configuration 155 may include a quantity $N_g$ of antenna panels. Each antenna panel may include a number of antenna elements arranged in a configuration ($N_1$, $N_2$), where $N_1$ refers to a number of antenna elements in the horizontal dimension and $N_2$ refers to a number of antenna elements in the vertical dimension. As illustrated in FIG. 1, the antenna configuration 155 includes four (4) antenna panels, where each antenna panel includes two antenna elements in the horizontal dimension and two antenna elements in the vertical dimension for a total of four antenna elements per antenna panel.

An antenna panel may support radio frequency beamforming for a signal transmitted via one or more antenna ports. The base station 105 and the UE 115 may thus be configured to support beamformed communications using multiple antenna ports. For example, the base station 105 may transmit the one or more CSI-RSs using one or more CSI-RS-specific antenna ports, which may be referred to as CSI-RS ports. The quantity of CSI-RS ports supported by an antenna panel may be based on the quantity and configuration of antenna elements, and the total quantity of CSI-RS ports for an antenna configuration 155 may further depend on the total number of antenna panels. The total quantity of CSI-RS ports for the antenna configuration 155 may be determined by $2N_gN_1N_2$, in the example of FIG. 1, the total quantity of CSI-RS ports is 2*4*2*2=32.

Additionally, the quantity and configuration of antenna panels, and the corresponding quantity of CSI-RS ports, may determine one or more parameters indicated in a CSI report by the UE 115 to the base station 105. For example, the UE 115 may report a PMI based on the antenna configuration of the base station 105. A PMI may indicate a codebook (e.g., a precoding matrix) preferred by the UE 115 for subsequent communications with the base station 105. The codebook may be of a codebook type (e.g., a type 1 single panel, a type 1 multi-panel, a type 2 single panel, a type 2 port selection, a type 2 enhanced port selection), where each codebook type corresponds to a supported configuration of antenna elements. Table 1 below illustrates examples of supported configurations of antenna elements for type 2 single panel and type 2 port selection codebooks based on $N_1$ and $N_2$, and includes possible codebook oversampling factors $(O_1, O_2)$ used for PMI computation.

TABLE 1

| Number of CSI-RS antenna ports | $(N_1, N_2)$ | $(O_1, O_2)$ |
|---|---|---|
| 4 | (2, 1) | (4, 1) |
| 8 | (2, 2) | (4, 4) |
|  | (4, 1) | (4, 1) |
| 12 | (3, 2) | (4, 4) |
|  | (6, 1) | (4, 1) |
| 16 | (4, 2) | (4, 4) |
|  | (8, 1) | (4, 1) |
| 24 | (4, 3) | (4, 4) |
|  | (6, 2) | (4, 4) |
|  | (12, 1) | (4, 1) |
| 32 | (4, 4) | (4, 4) |
|  | (8, 2) | (4, 4) |
|  | (16, 1) | (4, 1) |

Table 2 illustrates examples of supported configurations for type 1 multipanel codebooks based on $N_g$, $N_1$, and $N_2$.

TABLE 2

| Number of CSI-RS antenna ports | $(N_g, N_1, N_2)$ | $(O_1, O_2)$ |
|---|---|---|
| 8 | (2, 2, 1) | (4, 1) |
| 16 | (2, 4, 1) | (4, 1) |
|  | (4, 2, 1) | (4, 1) |
|  | (2, 2, 2) | (4, 4) |
| 32 | (2, 8, 1) | (4, 1) |
|  | (4, 4, 1) | (4, 1) |
|  | (2, 4, 2) | (4, 4) |
|  | (4, 2, 2) | (4, 4) |

In one example, the antenna configuration 155 illustrated in FIG. 1 may have a configuration of (2,4,2) and thus be associated with 32 CSI-RS ports.

Base stations 105 in the wireless communications system 100 may have any number of antenna elements and antenna panels. For example, massive MIMO operations may be supported by relatively large numbers of antenna panels. However, as the number of antenna elements increases, power consumption at a base station 105 increases. In some examples, a base station 105 may perform panel adaptation by turning on or off (i.e., activating or deactivating) a subset of antenna panels or subpanels, for example, to reduce such power consumption. For instance, if traffic in a cell served by the base station 105 is relatively low, the base station 105 may deactivate some antenna panels without negatively impacting devices operating in the cell. As another example, the base station 105 may reduce (e.g., deactivate) the number of antenna panels or antenna elements when switching from full duplex communications to half duplex communications, in which uplink and downlink transmissions may be transmitted in different time resources (e.g., instead of a same time resource, as in full duplex communications).

As panel adaptation at a base station 105 changes the configuration of the antenna panels and antenna elements, panel adaptation may modify the number of antenna elements used to transmit and receive signals over a wireless channel. In some cases, panel adaptation may have an impact on CSI feedback by a UE 115, as the UE 115 may not be aware of channel adaptation implemented by a base station 105. As such, information included in the CSI feedback may not correlate to one or more antenna panels or antenna elements that may be deactivated at the base station 105. That is, the CSI reported by the UE 115 may not provide information with enough granularity (e.g., on a per-panel or per-subpanel basis) for modifying communications parameters and link adaptation based on a number of active and non-active antenna panels at the base station 105. The techniques described herein therefore support a UE 115 performing CSI procedures based on a quantity of active antenna panels and/or subpanels at the base station 105. The base station 105 may configure CSI-RS resources such that respective CSI-RS resources map to one or more antenna panels at the base station 105. In some examples, the base station 105 may identify one or more port groups that each include one or more CSI-RS ports, and may map respective one or more port groups to respective antenna panels or subpanels.

The base station 105 may transmit, and the UE 115 may receive, control signaling indicating a CSI report configuration. The CSI report configuration may include an indication of the mapping, e.g., between the one or more CSI-RS resources and respective antenna panels or subpanels or between the one or more port groups and respective antenna panels or subpanels. In response to receiving one or more CSI-RSs on the configured resources, the UE 115 may generate CSI feedback in accordance with the CSI report configuration and based on the indicated mapping. In some examples, the UE 115 may generate the CSI feedback based on multiple hypotheses that correspond to measurements of the CSI-RSs. The hypotheses may be based on one or more subsets of antenna panels or subpanels. The UE 115 may transmit a message reporting the CSI feedback to the base station 105 in accordance with the CSI report configuration.

Figure 2:
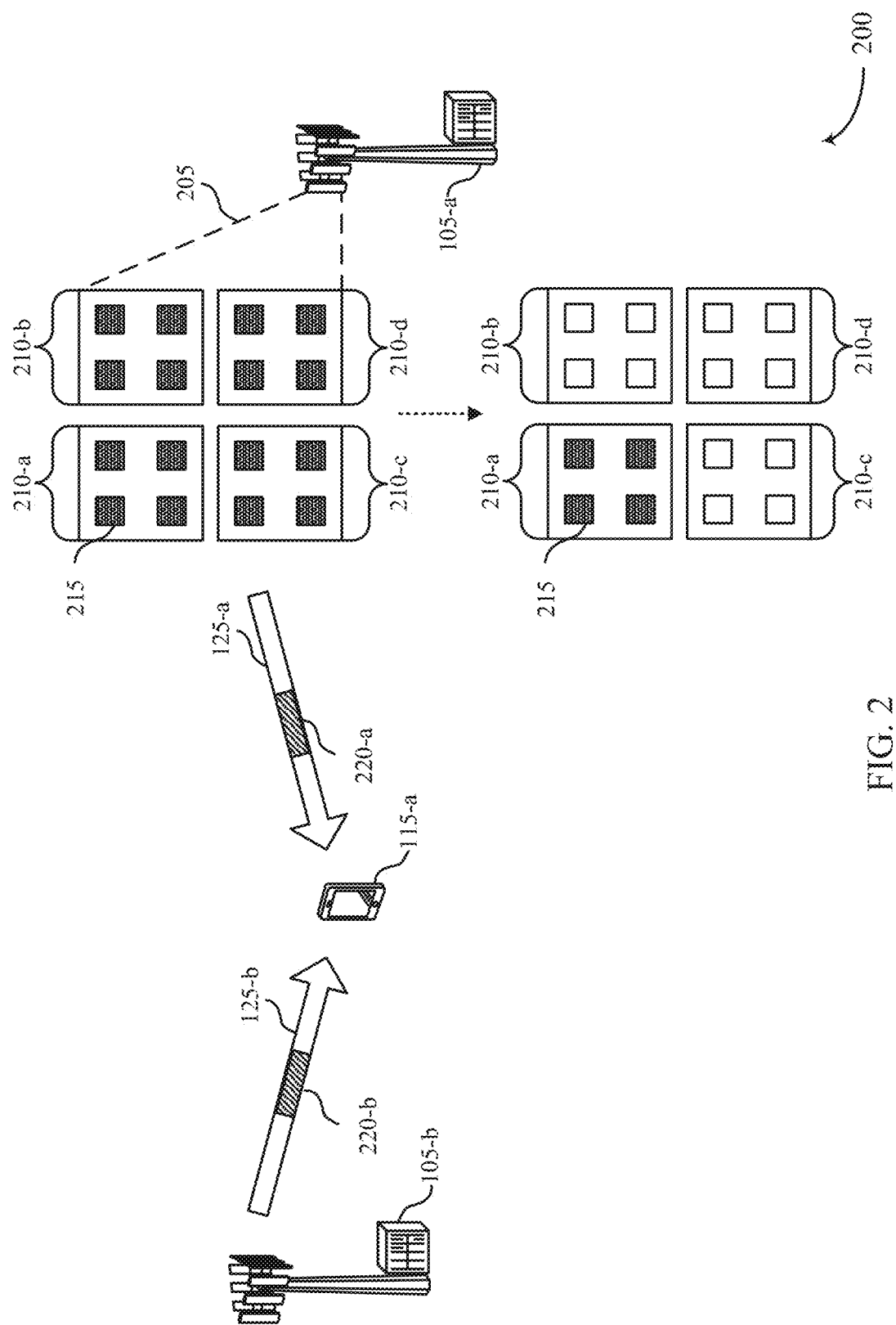

FIG. 2 illustrates an example of a wireless communications system 200 that supports techniques for channel state feedback for panel adaptation in accordance with aspects of the present disclosure. In some examples, wireless communications system 200 may implement aspects of wireless communications system 100. For instance, wireless communications system 200 includes a UE 115-a, a base station 105-a, and a base station 105-b, which may be examples of the corresponding devices described with reference to FIG. 1. Additionally or alternatively, the UE 115-a may be an example of a CPE, a relay node, a repeater, a router, an IAB node, or the like. Similarly, the base station 105-a and/or the base station 105-b may be an example of a backhaul node, an IAB node, or the like. Thus, although aspects of the present disclosure are described with reference to a UE 115 and base stations 105, it is understood that the described techniques may be performed by a wireless device different from a UE 115 and base stations 105. Stated another way, operations performed by the UE 115-a and the base stations 105 may be respectively performed by a UE 115, a base station 105, or another wireless device, and the example shown should not be construed as limiting.

The base stations 105-a and 105-b may include or be examples of TRPs, respectively. The UE 115-a may communicate with the base stations 105-a and 105-b via communication links 125-a and 125-b, respectively. The base stations 105 and the UE 115-a may be configured with multiple antennas located within one or more antenna arrays or antenna panels. Antenna panels that are collocated within a wireless device (e.g., a base station 105 or the UE 115-a).

As illustrated in FIG. 2, the base station 105-a includes multiple antenna elements 215 arranged in an antenna panel configuration 205 that includes, for example, four antenna panels 210-a, 210-b, 210-c and 210-d. Each antenna panel 210-a, 210-b, 210-c and 210-d may include multiple antenna elements 215. The base station 105-a may transmit and receive downlink and uplink transmissions using the antenna panels 210, for example, via full duplex and/or MIMO communications. For instance, the UE 115-a and the base station 105-a may utilize subband full duplex (SBFD) communications, where uplink and downlink communications may be transmitted in a same time resource. In some cases, greater data throughput may be achieved by operating SBFD on several antenna panels 210, e.g., such that some antenna elements 215 may be configured for transmitting and receiving uplink transmissions and other antenna elements 215 may be configured for transmitting and receiving downlink transmissions. Additionally, in MIMO communications, the multiple antenna elements 215 may support transmission and reception of different data streams. As an example, the base station 105-a may transmit and receive multiple signals using different spatial layers based on one or more antenna ports associated with antenna elements 215. In some cases, each data stream may be referred to as a MIMO layer, where the number of MIMO layers for MIMO communications may be based on the number of transmit and receive antennas.

In some examples, the UE 115-a may communicate with the base station 105-a and the base station 105-b simultaneously, while in other examples, the UE 115-a may communicate with either the base station 105-a or the base station 105-b at a given time. For instance, the UE 115-a may operate using dynamic point selection (DPS), where the UE 115-a may dynamically communicate with each of the base stations 105, e.g., depending on channel conditions.

In the wireless communications system 200, the UE 115-a may perform channel and interference measurements to maintain or improve the communication links 125 with the respective base stations 105. For instance, the UE 115-a may receive a CSI report configuration 220-a from the base station 105-a and a CSI report configuration 220-b from the base station 105-b. The CSI report configurations 220 may include information for the UE 15-a to use in determining and reporting CSI, such as CSI report timing, quantities to measure, codebooks to use, and/or TCI state and antenna panel configuration information (e.g., associated with the corresponding base station 105), among other examples. The base station 105-a may transmit one or more CSI-RSs over one or more CSI-RS resources (e.g., CMRs) to the UE 115-a via the communication link 125-a and in accordance with the CSI report configuration 220-a. The UE 115-a may perform measurements based on the received CSI-RSs and generate CSI based on the measurements. The UE 115-a may transmit a CSI report including CSI feedback to the base station 105-a, which may allow the base station 105-a to perform link adaptation procedures and optimize communications parameters for the communication link 125-a.

Whether the UE 115-a communicates with the base stations 105 simultaneously or operates using DPS may impact CSI procedures at the UE 115-a. For example, in DPS, because the UE 115-a may communicate with either the base station 105-a or the base station 105-b in a given time frame, the base station 105-a and the base station 105-b may share a common CSI report configuration 220 that includes multiple configured CSI-RS resources. In some examples, each base station 105 (e.g., each TRP) may configure a some different TCI state for communications with the UE 115-a, and each TCI state may be associated with one or more of the CSI-RS resources. The UE 115-a may receive a CSI-RS from each base station 105 and may determine CSI based on the received CSI-RS. The UE 115-a may report CSI feedback to the base stations 105, and because the base stations 105 share a common CSI report configuration 220, the UE 115-a may transmit a same CSI report to both base stations 105.

In contrast, in non-DPS communications, the base station 105-a and the base station 105-b may each have separate CSI report configurations 220-a and 220-b, respectively. The CSI report configurations 220-a and 220-b may be different from one another. In this example, the UE 115-a may receive CSI-RSs, generate CSI feedback, and transmit CSI reports to the base stations 105-a and 105-b independently from one another. In accordance with the CSI report configuration 220-a, the UE 115-a may receive a CSI-RS from the base station 105-a, generate CSI feedback, and transmit a CSI report to the base station 105-a. In accordance with the CSI report configuration 220-b, the UE 115-a may receive a CSI-RS from the base station 105-b, generate CSI feedback, and transmit a CSI report to the base station 105-b.

While having multiple antenna elements 215 and multiple antenna panels 210 may enable the base station 105-a to utilize various communications schemes, such as SBFD, MIMO, or other examples, the power consumed by the base station 105-a may increase as the quantity of antenna panels 210 and antenna elements 215 increases. For instance, each antenna element 215 may be linked with an RF chain that may include power amplifiers (PAs), low noise amplifiers (LNAs), and other RF components. Each component, and each RF chain, may consume relatively large amounts of power. Accordingly, in some cases, and as described herein, the base station 105-a may dynamically turn off (e.g., deactivate, power down) one or more antenna panels 210 and/or one or more subpanels of one or more of the antenna panels 210 to conserve power and increase energy efficiency.

For instance, when there is low traffic/activity in a cell served by the base station 105-a, the base station 105-a may switch from full duplex communications to half duplex communications, and the base station 105-a may operate with fewer overall antenna panels 210 when using half duplex communications. In other examples, the base station 105-a may reduce a number of MIMO layers used, which may enable the base station 105-a to deactivate some antenna panels 210. However, deactivating antenna panels 210 may impact CSI procedures at the UE 115-a. For instance, a number of CSI-RS ports associated with a CSI-RS may be mapped to physical antennas of the antenna panels 210 and antenna elements 215 at the base station 105-a. Further, codebooks used by the base station 105-a and the UE 115-a may be based on the number of CSI-RS ports. Thus, changing the configuration of the antenna panels 210 may change the number of available CSI-RS ports and the associated codebooks, among other impacts.

The antenna panel configuration 205 may be associated with a number of CSI-RS ports determined by $2N_gN_1N_2$. With all antenna panels 210 active, the antenna panel configuration 205 may be associated with 32 CSI-RS ports. The base station 105-a, in some cases, may determine to deactivate antenna panels 210-b, 210-c, and 210-d, and the antenna panel configuration 205, having one active antenna panel 210-a, may be associated with 8 CSI-RS ports. If the UE 115-a is unaware that some antenna panels 210 are turned off, the UE 115-a may be unaware of the change in CSI-RS ports. In such cases, the UE 115-a may be unable to adapt CSI feedback accordingly. Because the UE 115-a may be unaware of panel adaptation implemented at the base station 105-a, information provided in response to measurements performed by the UE 115-a (e.g., based on the CSI-RSs) may not fully account for the one or more panels/sub-panels at the base station 105-a being deactivated. As such, the CSI feedback from the UE 115-a may not be fully representative of active of the base station 105-a. Panel adaptation at a base station 105 may therefore impact the usefulness of CSI feedback provided by the UE 115-a and improved techniques may be desirable.

The methods and techniques described herein may enable the UE 115-a to perform CSI procedures based on a quantity of active antenna panels and/or subpanels at a base station 105. The base station 105-a, for instance, may configure CSI-RS resources such that respective CSI-RS resources map to one or more antenna panels 210. In some examples, the base station 105-a may map a single CSI-RS resource to multiple antenna panels 210. In such examples, the base station 105-a may identify one or more port groups that each include one or more CSI-RS ports associated with the CSI-RS resource, and may map respective one or more port groups to respective antenna panels 210. The base station 105-a may transmit a CSI report configuration 220-a (e.g., CSI-reportConfig) to UE 115-a which may include an indication of a mapping between CSI-RS resources (e.g., or CSI-RS ports) and one or more of the antenna panels 210. This configuration may facilitate transitions during panel adaption, as the UE 115-a may adaptively perform CSI procedures for different antenna panel configurations.

The UE 115-a may receive the CSI report configuration 220-a as well as one or more CSI-RSs and may perform channel estimation measurements, which may include multiple hypotheses. Each hypothesis may correspond to a single antenna panel 210 or one or more subsets of antenna panels 210. In the case of subsets of antenna panels 210, the UE 115-a may perform a hypothesis for each possible combination of panels, e.g., based on a hypothesis group, as described in more detail with reference to FIG. 6. For instance, the CSI report configuration 220-a may indicate that the UE 115-a is to perform a dual panel hypothesis, where the UE 115-a performs a hypothesis for each set of two antenna panels 210. For four antenna panels 210, as illustrated in antenna panel configuration 205, the UE 115-a may perform six total hypotheses.

Generating CSI feedback based on hypotheses performed at antenna panel or subpanel levels of granularity may enable the base station 105-a to more efficiently perform panel adaptation. For instance, in the antenna panel configuration 205, the base station 105-a may have two active antenna panels 210 and two deactivated antenna panels 210. Antenna panels 210-a and 210-b may be on while panels 210-c and 210-d are off, or antenna panels 210-a and 210-b may be off while panels 210-c and 210-d are on, and so forth. There may be six possible combinations of two activated antenna panels 210 and two deactivated antenna panels 210, and the UE 115-a may perform a hypothesis for each of the six combinations. The UE 115-a may transmit one or more CSI reports including CSI feedback based on the six hypotheses to the base station 105-a. In some examples, the UE 115-a may transmit CSI feedback for each hypotheses, while in other examples, the UE 115-a may select (e.g., based on the CSI report configuration 220-a) a subset of hypotheses for which to transmit CSI feedback. The base station 105-a may determine, based on the CSI feedback associated with the hypotheses, which of the six combinations may provide a highest channel quality for the UE 115-a, a lowest power consumption, a highest throughput, and the like.

Figure 3:
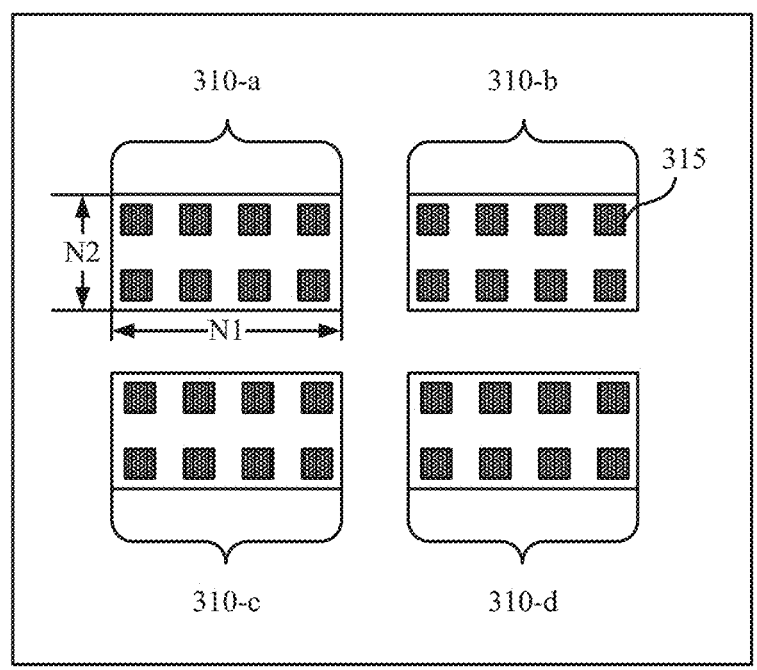
FIG. 3 illustrates an example of an antenna panel configuration that supports techniques for channel state feedback for panel adaptation in accordance with aspects of the present disclosure.

FIG. 3 illustrates an example of an antenna panel configuration 300 that supports techniques for channel state feedback for panel adaptation in accordance with aspects of the present disclosure. In some examples, the antenna panel configuration 300 may implement aspects of wireless communications system 100 or 200. For example, the antenna panel configuration 300 may be an example of an antenna array implemented at a wireless device, such as a UE 115, a base station 105, a CPE, a repeater, a router, or other device. The antenna panel configuration 300 may include a set of antenna panels 310, where each antenna panel 310 includes a number of antenna elements 315 in a horizontal dimension N1 and a vertical dimension N2. It is noted that the dimensions of the antenna panel configuration 300 are provided for illustrative purposes and should not be considered limiting, as antenna arrays having different sizes, configurations, and/or dimensions are also possible.

The antenna panel configuration 300 may be associated with a number of CSI-RS ports based on the quantity and configuration of the antenna panels 310 and the antenna elements 315. In accordance with techniques described herein, a device, such as a base station (e.g., a single TRP with multiple collocated antenna panels 410), may configure a set of CSI-RS resources for transmitting, to a UE, CSI-RSs using the antenna panel configuration 300. The base station may indicate (e.g., via control signaling, such as RRC signaling) a CSI report configuration that includes an indication of the set of CSI-RS resources. The number of configured CSI-RS resources in the set of CSI-RS resources may correspond to the number of antenna panels 310. That is, for N antenna panels 310, the base station may configure N CSI-RS resources. Each CSI-RS resource of the set of CSI-RS resources may be mapped to a single antenna panel 310. For instance, the base station may configure four CSI-RS resources for antenna panel configuration 300, which may include a first CSI-RS resource mapped to antenna panel 310-a, a second CSI-RS resource mapped to antenna panel 310-b, a third CSI-RS resource mapped to antenna panel 310-c, and a fourth CSI-RS resource mapped to antenna panel 310-d. That is, there may be a one-to-one mapping between CSI-RS resources and antenna panels 310, such that a CSI-RS set may include {CSI-RSID1, CSI-RSID2, . . . , CSI-RSIDN} mapped to antenna panels 1, 2, . . . N. Additionally, the CSI-RS resource configuration for the set of CSI-RS resources may be associated with a single TCI state.

The base station may transmit the CSI report configuration to the UE and may subsequently transmit one or more CSI-RSs on the configured CSI-RS resources. The UE may perform channel measurements based on receiving the one or more CSI-RSs, and may generate CSI feedback based on the channel measurements and in accordance with the CSI report for configuration. For example, the CSI report configuration may include an indication of the mapping, such as a CRI for each respective CSI-RS associated with each antenna panel 310. The UE may receive a CSI-RS and generate CSI feedback for the associated antenna panel 310.

In some cases, a number of CSI-RS ports per antenna panel 310 may or may not be the same. For instance, if the antenna panels 310-a, 310-b, 310-c, and 310-d have the same number of antenna elements 315, there may be a same number of CSI-RS ports across the respective CSI-RS resources for each panel. In other examples, if the antenna panels 310-a, 310-b, 310-c, and 310-d have a different number of antenna elements, the respective CSI-RS resources may have different number of CSI-RS ports.

Figure 4A:
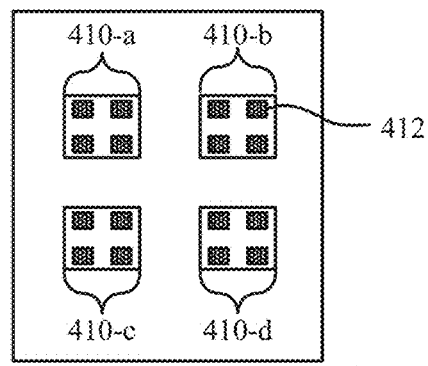
FIGS. 4A, 4B, and 4C illustrate examples of antenna panel and port group configurations that support techniques for channel state feedback for panel adaptation in accordance with aspects of the present disclosure.
Figure 4B:
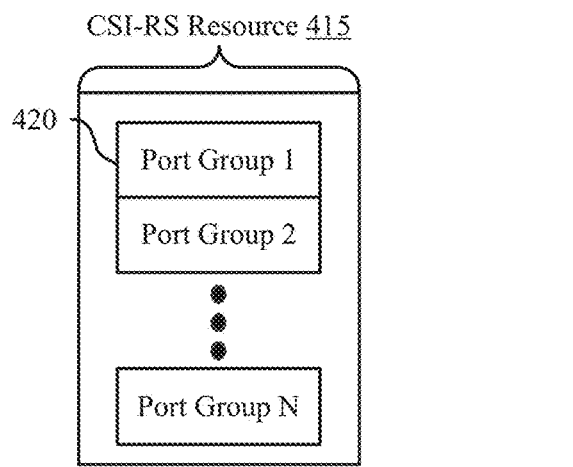
Figure 4C:
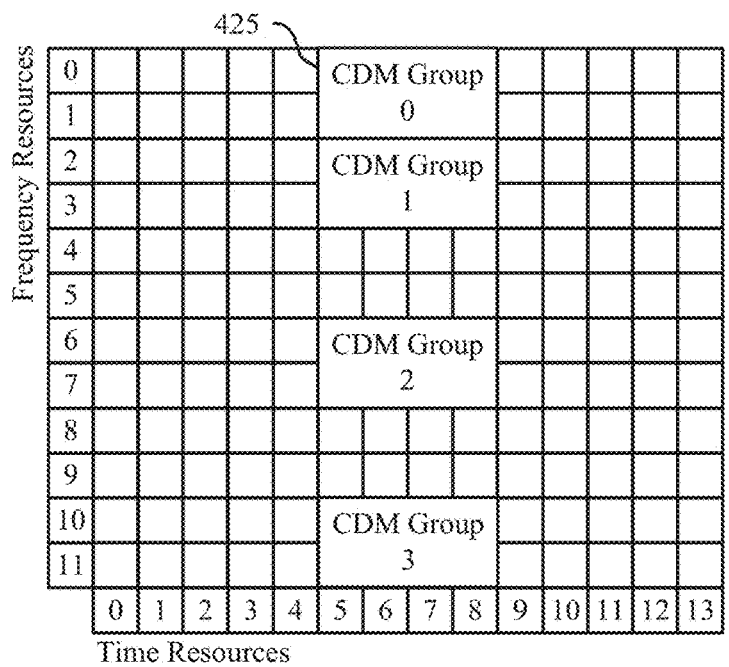

FIGS. 4A, 4B, and 4C illustrate examples of an antenna panel configuration 401, a port group configuration 402, and a port group configuration 403, respectively, that support techniques for channel state feedback for panel adaptation in accordance with aspects of the present disclosure. In some examples, the antenna panel configuration 401 and the port group configurations 402 and 403 may implement aspects of wireless communications system 100 or 200. For example, the antenna panel configuration 401 may be an example of an antenna array implemented at a wireless device, such as a UE 115, a base station 105, a CPE, a repeater, a router, or other device. The port group configurations 402 and 403 may be examples of port groups implemented at a wireless device having an antenna panel configuration 401. That is, the port group configurations 402 and 403 may include port groups, where each port group includes one or more antenna ports of the antenna panel configuration 401.

As illustrated in FIG. 4A, antenna panel configuration 401 may include a set of antenna panels 410 at a base station having a single TRP. The set of antenna panels 410, and each antenna panel 410 includes a number of antenna elements 412 in a horizontal dimension N1 and a vertical dimension N2. It is noted that the dimensions of the antenna panel configuration 401 are provided for illustrative purposes and should not be considered limiting, as antenna arrays having different sizes, configurations, and/or dimensions are possible.

According to the techniques described herein, the base station (e.g., a single TRP with multiple collocated antenna panels 410) may configure a single CSI-RS resource for transmitting a CSI-RS to a UE. The single CSI-RS resource may be mapped to the antenna panels 410 (e.g., to all of the antenna panels 410) and the CSI-RS resource configuration may be associated with a single TCI state. The base station may transmit a CSI report configuration to the UE that includes an indication of the mapping between the CSI-RS resource and the antenna panels 410. The UE may receive the CSI report configuration and may receive the CSI-RS on the indicated CSI-RS resource. The UE may generate CSI feedback in accordance with the CSI report configuration, e.g., based on the mapping between the CSI-RS resource and the antenna panels 410, and the UE may transmit a message reporting the CSI feedback to the base station.

In some examples, the configured CSI-RS resource may be associated with multiple CSI-RS ports, for instance, based on the configuration of the antenna panels 410 and antenna elements 412 within the antenna panel configuration 401 In some examples, the number of CSI-RS ports per antenna panel 410 may be based on the number of antenna elements 412 in the antenna panel 410. The number of CSI-RS ports per antenna panel 410 may thus be the same for antenna panels 410 that have the same number of antenna elements 412. In other examples, antenna panels 410 with different numbers of antenna elements 412 may have different numbers of CSI-RS ports per antenna panel 410.

FIG. 4B illustrates an example port group configuration 402 for a CSI-RS resource 415, which may be an example of a CSI-RS resource mapped to the antenna panels 410 of the antenna panel configuration 401. The port group configuration 402 may include a number of port groups 420, where each port group 420 includes one or more CSI-RS ports. That is, the CSI-RS ports associated with the antenna panels 410 may be divided into the port groups 420. In some examples, the quantity of CSI-RS ports per port group 420, the quantity of port groups 420, or some combination thereof, may be based on the number of antenna panels 410 in the antenna panel configuration 401. For example, a total number of CSI-RS ports may be divided into N port groups 420, where N is the quantity of antenna panels 410. As illustrated, the antenna panel configuration 401 includes N=4 antenna panels 410. Accordingly, the 32 CSI-RS ports of the CSI-RS resource 415 may be divided into four port groups 420, where each port group 420 includes eight CSI-RS ports.

Additionally, or alternatively, the CSI-RS ports within a port group 420, the quantity of CSI-RS ports within a port group 420, the quantity of port groups 420, or some combination thereof, may be based on one or more CDM groups 425 illustrated in FIG. 4C. For example, the grouping of the CSI-RS ports of the antenna panels 410 into the one or more port groups 420 may be based on the CDM groups 425. A CDM group 425 may be a group of resource elements for which an orthogonal cover code (OCC) is applied. That is, the resource elements may share one or more time resources (e.g., symbols, slots, etc.), one or more frequency resources (e.g., resource blocks, subcarriers, etc.), or both, but may be orthogonal in the code domain. For instance, in the port group configuration 403, CDM group 0 may be associated with frequency resources 0 and 1 and time resources 5 through 8. CDM group 1, CDM group 2, and CDM group 3 may also be associated with time resources 5 through 8. CDM group 1 may be associated with frequency resources 2 and 3, CDM group 2 may be associated with frequency resources 6 and 7, and CDM group 3 may be associated with frequency resources 10 and 11.

The CDM groups 425 may be associated with resource locations of the CSI-RS (e.g., the CSI-RS resource 415) such that the port groups 420 (e.g., the CSI-RS ports in each port group 420) are based on the CDM groups 425. Put another way, the grouping of resource elements into CDM groups 425 may define the grouping of the CSI-RS ports into the port groups 420. For example, the 32 CSI-RS resources may be grouped into port groups 420 based on four CDM groups 425, where each CDM group 425 may have eight CSI-RS ports. Thus, port group 1 may be based on (e.g., mapped to) CDM group 0, port group 2 may be based on CDM group 1, and so forth.

The CSI report configuration indicated by the base station to the UE may include information about the port groups 420 and/or the CDM groups 425. The UE may receive the CSI report configuration and may identify the port groups 420, e.g., may identify CSI-RS ports associated with each of one or more port groups 420. In some examples, the CSI report configuration may indicate a mapping between each of the CDM groups 425 and respective port groups 420.

Additionally, or alternatively, the CSI report configuration may include an indication of a mapping between one or more of the antenna panels 410 and the port groups 420 and/or the CDM groups 425. For example, the port groups 420 may be mapped to respective antenna panels 410, such that port group 1 may be mapped to antenna panel 410-a, port group 2 may be mapped to antenna panel 410-b, port group 3 may be mapped to antenna panel 410-c, and port group 4 may be mapped to antenna panel 410-d. In some examples, the number of port groups 420 mapped to an antenna panel 410 may vary across the antenna panel configuration 401, e.g., based on a number of antenna elements 412 in respective antenna panels 410. For instance, the antenna panel 410-a may be mapped to port group 1 and port group 2 (e.g., based on a number of antenna elements 412 in the antenna panel 410-a), while the antenna panel 410-b may be mapped to port group 3 (e.g., based on a number of antenna elements 412 in the antenna panel 410-b).

The UE may receive the CSI report configuration and may identify the one or more port groups 420, for instance, based on an indicated mapping between the port groups 420 and the CDM groups 425. The UE may receive and measure a CSI-RS in accordance with the CSI report configuration and may generate the CSI feedback based on the mapping of the antenna panels 410 to the CSI-RS resource 415 (e.g., the mapping of the antenna panels 410 to the port groups 420). After generating the CSI feedback, the UE may generate a CSI report and may transmit, to the base station, a message indicating the CSI report. The base station and/or the UE may perform link adaptation procedures in accordance with the CSI report. In some examples, the base station may perform panel adaptation at the antenna panel configuration 401. For example, based on the CSI report, the base station may determine that one or more antenna panels 410 may be deactivated, or one or more antenna panels 410 may provide a relatively high spectral efficiency. As another example, based on the CSI report, the base station may determine a configuration for the antenna panels 410 that is based on a trade-off between reduced power consumption and spectral efficiency. For instance, the base station may determine that deactivating antenna panel 410-a and antenna panel 410-b, while maintaining active antenna panel 410-c and antenna panel 410-d, provides sufficient throughput for the UE while conserving power.

Figure 5A:
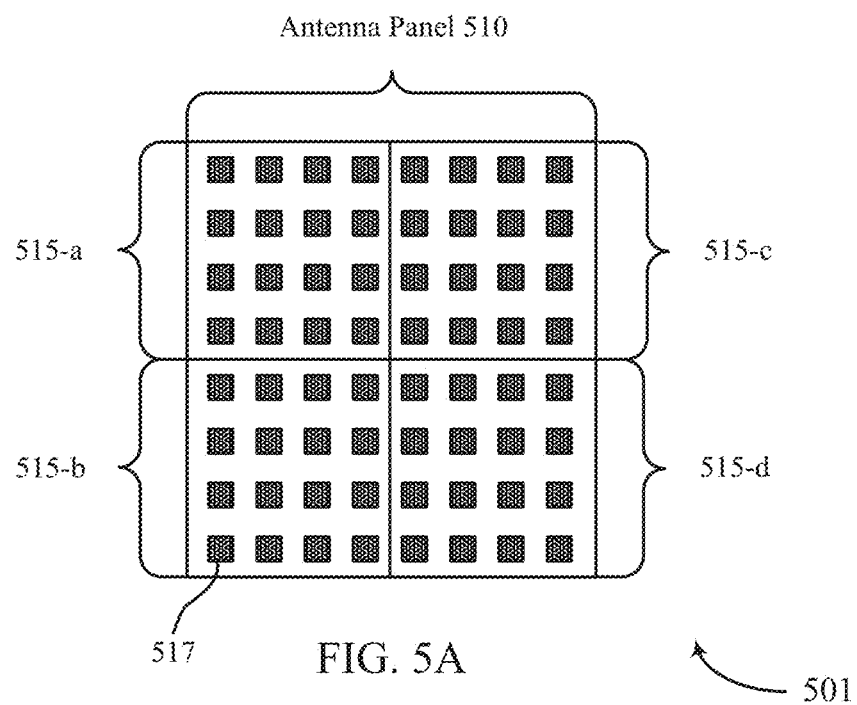
FIGS. 5A and 5B illustrate examples of antenna subpanel and port group configurations that support techniques for channel state feedback for panel adaptation in accordance with aspects of the present disclosure.
Figure 5B:
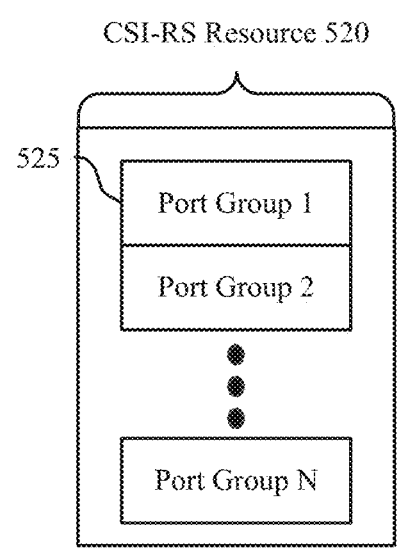

FIGS. 5A and 5B illustrate examples of antenna subpanel and port group configurations 501 and 502, respectively, that support techniques for channel state feedback for panel adaptation in accordance with aspects of the present disclosure. In some examples, the antenna subpanel configuration 501 may implement aspects of wireless communications system 100 or 200. For example, the antenna subpanel configuration 501 may be an example of an antenna array implemented at a wireless device, such as a UE 115, a base station 105, a CPE, a repeater, a router, or other device. The port group configuration 502 may be an example of port groups implemented at a wireless device having an antenna subpanel configuration 501. That is, the port group configuration 502 may include multiple port groups, where each port group includes one or more antenna ports of the antenna subpanel configuration 501.

As illustrated in FIG. 5A, the antenna subpanel configuration 501 may include an antenna panel 510 at a base station having a single TRP. The antenna panel 510 may be divided into a set of antenna subpanels 515. Each antenna subpanel 515 may include a number of antenna elements 517 in a horizontal dimension N1 and a vertical dimension N2 (e.g., as described with reference to FIGS. 1-3). It is noted that the dimensions of the antenna subpanel configuration 501 are provided for illustrative purposes and should not be considered limiting, as antenna arrays having different sizes, configurations, and/or dimensions are also possible.

According to the techniques described herein, the base station may configure a CSI-RS resource for transmitting a CSI-RS to a UE. The CSI-RS resource may be mapped to the antenna subpanels 515 (e.g., to all of the antenna subpanels 515) of the antenna panel 510, and the CSI-RS resource configuration may be associated with a single TCI state. The base station may transmit a CSI report configuration to the UE that includes an indication of the mapping between the CSI-RS resource and the antenna subpanels 515. The UE may receive the CSI report configuration and may receive the CSI-RS on the indicated CSI-RS resource. The UE may generate CSI feedback in accordance with the CSI report configuration, e.g., based on the mapping between the CSI-RS resource and the antenna subpanels 515.

A configured CSI-RS resource may be associated with multiple CSI-RS ports, for instance, based on the configuration of the antenna subpanels 515 and antenna elements 517 within the antenna subpanel configuration 501. In some examples, the number of CSI-RS ports per antenna subpanel 515 may be based on the number of antenna elements 517 in the antenna subpanel 515. The number of CSI-RS ports per antenna subpanel 515 may thus be the same for antenna subpanels 515 that have the same number of antenna elements 517. In other examples, antenna subpanels 515 with different numbers of antenna elements 517 may have different numbers of CSI-RS ports per antenna subpanel 515.

FIG. 5B illustrates an example port group configuration 502 for a CSI-RS resource 520, which may be an example of a CSI-RS resource mapped to the antenna subpanels 515 of the antenna subpanel configuration 501. The port group configuration 502 may include a number of port groups 525, where each port group 525 includes one or more CSI-RS ports. That is, the CSI-RS ports associated with the antenna subpanels 515 may be divided into the port groups 525. In some examples, the quantity of CSI-RS ports per port group 525, the quantity of port groups 525, or some combination thereof, may be based on the number of antenna subpanels 515 in the antenna subpanel configuration 501. For example, a total number of CSI-RS ports may be equally divided into N port groups 525, where N may be the quantity of antenna subpanels 515. As illustrated, the antenna panel configuration 501 includes N=4 antenna subpanels 515. Accordingly, the 32 CSI-RS ports of the CSI-RS resource 520 may be divided into four port groups 525, where each port group 525 includes eight CSI-RS ports.

In some examples, the CSI-RS ports within a port group 525, the quantity of CSI-RS ports within a port group 525, the quantity of port groups 525, or some combination thereof, may be based on one or more CDM groups. For example, the grouping of the CSI-RS ports of the antenna subpanels 515 into the one or more port groups 525 may be based on one or more CDM groups. The CDM groups may be associated with resource locations of the CSI-RS (e.g., the CSI-RS resource 520) such that the port groups 525 (e.g., the CSI-RS ports in each port group 525) are based on the CDM groups. Put another way, the grouping of resource elements into CDM groups may define the grouping of the CSI-RS ports into the port groups 525. For example, the 32 CSI-RS resources may be grouped into port groups 525 based on four CDM groups, where each CDM group may have eight CSI-RS ports. Thus, port group 1 may be based on (i.e., mapped to) a first CDM group, port group 2 may be based on a second CDM group, and so forth.

The CSI report configuration indicated by the base station to the UE may include information about the port groups 525 and/or the CDM groups. The UE may receive the CSI report configuration and may identify the port groups 525, e.g., may identify CSI-RS ports associated with each of one or more port groups 525. In some examples, the CSI report configuration may indicate a mapping between each of the CDM groups and respective port groups 525.

Additionally, or alternatively, the CSI report configuration may include an indication of a mapping between one or more of the antenna subpanels 515 and the port groups 525 and/or the CDM groups. For example, the port groups 525 may be mapped to respective antenna subpanels 515, such that port group 1 may be mapped to antenna subpanel 515-a, port group 2 may be mapped to antenna subpanel 515-b, port group 3 may be mapped to antenna subpanel 515-c, and port group 4 may be mapped to antenna subpanel 515-d. In some examples, the number of port groups 525 mapped to an antenna subpanel 515 may vary across the antenna subpanel configuration 501, e.g., based on a number of antenna elements 517 in respective antenna subpanels 515. For instance, the antenna subpanel 515-*a* may be mapped to port group 1 and port group 2 (e.g., based on a number of antenna elements 517 in the antenna subpanel 515-*a*), while the antenna subpanel 515-*b* may be mapped to port group 3 (e.g., based on a number of antenna elements 517 in the antenna subpanel 515-*b*).

The UE may receive the CSI report configuration and may identify the one or more port groups 525, for instance, based on an indicated mapping between the port groups 525 and the CDM groups. The UE may receive and measure a CSI-RS in accordance with the CSI report configuration and may generate the CSI feedback based on the mapping of the antenna subpanels 515 to the CSI-RS resource 520 (e.g., the mapping of the antenna subpanels 515 to the port groups 525). After generating the CSI feedback, the UE may generate a CSI report and may transmit, to the base station, a message indicating the CSI report. The base station and/or the UE may perform link adaptation procedures in accordance with the CSI report. In some examples, the base station may perform panel adaptation at the antenna panel 510. For example, based on the CSI report, the base station may determine that one or more antenna subpanels 515 may be deactivated, or one or more antenna subpanels 515 may provide a relatively high spectral efficiency. As another example, based on the CSI report, the base station may determine a configuration for the antenna subpanels 515 that is based on a trade-off between reduced power consumption and spectral efficiency. For instance, the base station may determine that deactivating antenna subpanel 515-*a* and antenna subpanel 515-*b*, while maintaining active antenna subpanel 515-*c* and antenna subpanel 515-*d*, provides sufficient throughput for the UE while conserving power.

Figure 6:
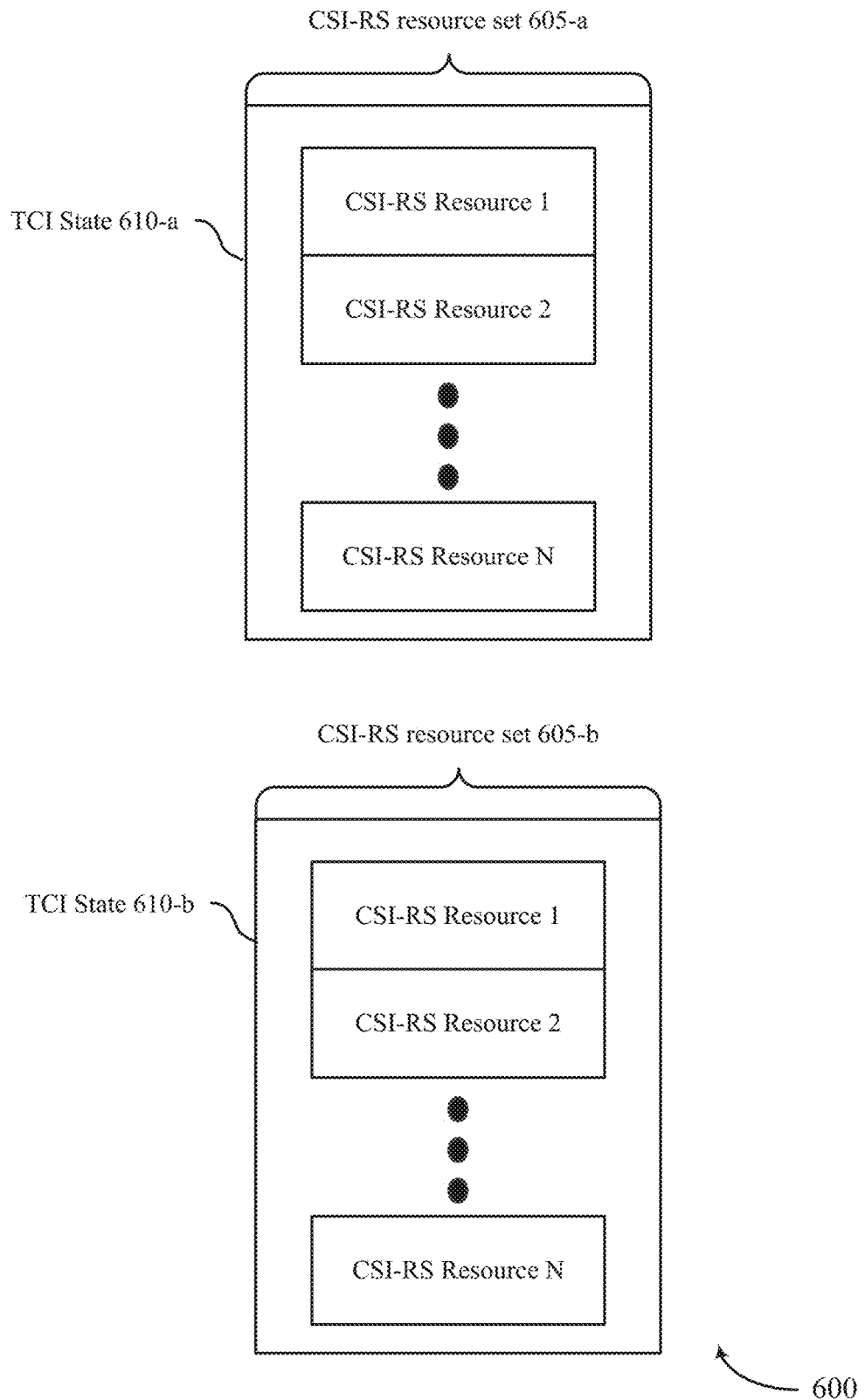
FIG. 6 illustrates examples of resource group configurations that support techniques for channel state feedback for panel adaptation in accordance with aspects of the present disclosure.

FIG. 6 illustrates an example of a resource group configuration 600 that supports techniques for channel state feedback for panel adaptation in accordance with aspects of the present disclosure. In some examples, the resource group configuration 600 may implement aspects of wireless communications system 100 or 200. For example, the resource group configuration 600 may implemented at a wireless device, such as a UE 115, a base station 105, a CPE, a repeater, a router, or other device.

The resource group configuration 600 includes a CSI-RS resource set 605-*a* associated with a first TCI state 610-*a* and a CSI-RS resource set 605-*b* associated with a second TCI state 610-*b*. The CSI-RS resource set 605-*a* and the CSI-RS resource set 605-*b* may each include N CSI-RS resources. In some examples, the CSI-RS resources in each CSI-RS resource set 605 may be grouped into one or more port groups, e.g., as described with reference to FIGS. 4 and 5.

The CSI-RS resource sets 605 may each be an example of a CSI-RS resource set configured for respective TRPs (e.g., associated with one or more base stations) that correspond to a set of collocated antenna panels or subpanels. For instance, the CSI-RS resource set 605-*a* may be configured for a first TRP and may correspond to a set of antenna panels or subpanels. Likewise, the CSI-RS resource set 605-*b* may be configured for a second TRP and may correspond to a set of antenna panels or subpanels. In some examples, the CSI-RS resource set 605-*a* may be associated with a first TCI state 610-*a*, whereas the second CSI resource set 605-*b* may be associated with a second TCI state 605-*b*. The TCI states 610-*a* and 610-*b* may be different.

In some examples, a UE may operate within a multi-TRP system, as described with reference to FIG. 2, and may receive joint transmissions from multiple TRPs. The UE may receive a CSI-RS from each of two TRPs that each apply a different TCI state 610. For example, the UE may receive a first CSI-RS, over one or more CSI-RS resources of the CSI-RS resource set 605-*a*, from a first TRP according to a TCI state 610-*a*, and may receive a second CSI-RS, over one or more CSI-RS resources of the CSI-RS resource set 605-*b*, from a second TRP according to a TCI state 610-*b*. In some examples, the first TRP and the second TRP may be associated with a same base station, while in other examples, the first TRP and the second TRP may be associated with different base stations.

The UE may generate a CSI report that includes CSI associated with more than one TCI state (for example, the TCI state 610-*a* and the TCI state 610-*b*). In some examples, the UE may select one or more hypotheses (e.g., CSI hypotheses) according to which the UE is to generate the CSI report. In some examples, each CSI measurement resource within a CSI-RS resource set 605 may be referred to as a CSI hypothesis. For instance, the first TRP (e.g., a first base station associated with the first TRP) may transmit a message (e.g., an RRC message) indicating a CSI report configuration that includes an indication of the CSI-RS resource set 605-*a*. The second TRP (e.g., a second base station associated with the second TRP) may likewise indicate a CSI report configuration that includes an indication of the CSI-RS resource set 605-*b*. In some examples, the UE may determine to use one or more hypotheses, while in other examples, the CSI report configuration may include an indication of the one or more hypotheses (e.g., as selected by the corresponding TRP). The UE may generate CSI feedback for the CSI report based on the one or more hypotheses, one or more hypothesis groups, or some combination thereof, and may transmit the CSI report to the first TRP and/or the second TRP.

The CSI-RS resource set 605-*a* and the CSI-RS resource set 605-*b* may correspond to a set of antenna panels, subpanels, or both, at the first TRP and the second TRP, respectively. For instance, each CSI-RS resource of the CSI-RS resource set 605-*a* may be mapped to one antenna panel of a set of antenna panels at the first TRP (e.g., as described with reference to FIG. 3). Alternatively, the CSI-RS resource set 605-*a* may include multiple port groups, such that one or more port groups are mapped to respective antenna panels at the first TRP (e.g., as described with reference to FIG. 4) or to respective subpanels of an antenna panel at the first TRP (e.g., as described with reference to FIG. 5). The UE may receive the CSI report configuration that includes an indication of a mapping between the CSI-RS resources of the CSI-RS resource set 605 and the antenna panels or subpanels at the corresponding TRP.

According to the techniques described herein, the one or more hypotheses and/or the one or more hypothesis groups performed by the UE may be based on the set of antenna panels (e.g., or subpanels) at the corresponding TRP. A hypothesis group may include one or more hypotheses, where each hypothesis of the one or more hypotheses may correspond to an antenna panel or a subset of antenna panels of the set of antenna panels. In some examples, the quantity of hypotheses in a hypothesis group may be based on a number of hypotheses to be performed per antenna panel (e.g., or subpanels). Additionally, or alternatively, the quantity of hypotheses in a hypothesis group, the quantity of hypothesis groups, or both, may be based on a quantity of antenna panels in the set of antenna panels (e.g., or a quantity of subpanels in the set of subpanels).

In some cases, different hypothesis groups may correspond to different types of hypotheses to be performed. For instance, for a set of N antenna panels (e.g., or subpanels), a first hypothesis group may include N hypotheses, such that the UE may perform one hypothesis per antenna panel. This hypothesis group type may be referred to as a single panel hypothesis group. A second hypothesis group may be referred to as a dual-panel hypothesis group and may include $$\frac{N(N-1)}{2}$$

hypotheses, such that one hypothesis corresponds to one pair of antenna panels of the set of antenna panels. A third hypothesis group may include one hypothesis per subset of antenna panels of the set of antenna panels, and so on. A final hypothesis group may be referred to as an N panel hypothesis and may include a single hypothesis that corresponds to the entire set of antenna panels.

For a TRP with a set of four antenna panels (e.g., as illustrated in FIGS. 4A-4C), for instance, the first hypothesis group may include four hypotheses (e.g., one hypothesis per antenna panel). The second hypothesis group may include six hypotheses. Here, a first hypothesis may correspond to a first subset of two antenna panels (e.g., an antenna panel pair) of the set of antenna panels, a second hypothesis may correspond to a second subset of two antenna panels of the set of antenna panels, and so on, such that all possible combinations of antenna pairs may correspond to a respective hypothesis. The third hypothesis group may include three hypotheses, e.g., one hypothesis per three-panel subset of the set of antenna panels. The fourth hypothesis group may include one hypothesis that corresponds to the set of four antenna panels.

It should be noted that while the examples described herein generally relate to antenna panels, the methods and techniques may be similarly applied to antenna subpanels (e.g., as described with reference to FIG. 5), or any combination of antenna panels and antenna subpanels.

In some examples, a hypothesis or hypothesis group may correspond to a configured mode. For example, the first hypothesis group (e.g., the single panel hypothesis) may correspond to an energy saving mode. The UE may perform a hypothesis for each antenna panel and may generate CSI feedback for the CSI report based on the respective hypotheses. In this manner, the base station may perform panel adaptation (e.g., may dynamically activate or deactivate antenna panels, for instance, to conserve power) without affecting the CSI feedback generated by the UE. That is, because the UE performs a hypothesis per antenna panel, the base station may deactivate one or more antenna panels of the set of antenna panels without affecting the hypotheses associated with the remaining antenna panels. As another example, the N panel hypothesis may correspond to a high spectral efficiency (e.g., high throughput) mode; here, the UE may perform one hypothesis for the set of antenna panels, as the base station may achieve a highest possible throughput by using all of the set of antenna panels.

As the number of antenna panels increases, however, the quantity of possible hypotheses and hypothesis groups increases. To avoid corresponding increased overhead, the UE may be configured (e.g., by a TRP, via a CSI report configuration) with a subset of hypothesis groups from the set of all possible hypothesis groups. The CSI report configuration may include an indication of one or more hypothesis groups to use. For instance, the CSI report configuration may indicate that the UE is to use a subset of hypothesis groups that includes the single panel hypothesis group and the N panel hypothesis group. Alternatively, the CSI report configuration may indicate that the UE is to use all of the hypothesis groups available for the corresponding TRP (e.g., based on the quantity of antenna panels at the corresponding TRP).

Additionally, as the number of hypotheses (e.g., and hypothesis groups) performed by the UE increases, the information to be sent as part of the CSI report increases. The UE may therefore be configured (e.g., by a TRP, via a CSI report configuration) to report CSI feedback that corresponds to a subset of hypotheses, e.g., rather than reporting CSI feedback for all hypotheses. For instance, the UE may select (e.g., based on the CSI report configuration) a quantity K of hypotheses for which to report CSI feedback. The K hypotheses may be selected from one or more of the hypothesis groups. In some examples, the UE may include CSI feedback for respective selected hypotheses in a single message (e.g., in a single CSI report), while in other examples, the UE may transmit separate CSI reports for each selected hypothesis.

As a first example, the UE may be configured with a first hypothesis group and a second hypothesis group, and may be configured to report CSI feedback for the hypothesis associated with the highest channel quality (e.g., the most favorable CSI) of each hypothesis group. That is, the UE may perform the hypotheses associated with each of the first hypothesis group and the second hypothesis group. The UE may select a first hypothesis from the first hypothesis group that is associated with a highest quality CSI out of all hypotheses in the first hypothesis group. The UE may also select a second hypothesis from the second hypothesis group that is associated with a highest quality CSI out of all hypotheses of the second hypothesis group. The UE may generate and report CSI feedback for the first hypothesis and the second hypothesis.

In a second example, the UE may be configured to report CSI feedback for the K hypotheses associated with the highest quality CSI per hypothesis group. For instance, for a base station with a single TRP with four antenna panels, the UE may be configured to perform a single panel hypothesis group and a dual panel hypothesis group, and to report CSI feedback for two hypotheses from each group. In this example, the UE may perform four hypotheses for the single panel hypothesis group and six hypotheses for the dual panel hypothesis group. The UE may select two hypotheses associated with a highest quality CSI from the single panel group and two hypotheses associated with a highest quality CSI from the dual panel group. The UE may therefore report CSI feedback for four total hypotheses, e.g., in a same CSI report or in respective CSI reports.

In some cases, rather than a quantity K of hypotheses per hypothesis group, the UE may be configured to report CSI feedback for a quantity of hypotheses from the set of configured hypothesis groups and for a specified hypothesis. For instance, the UE may select a hypothesis associated with a highest quality CSI from all hypotheses of the set of hypothesis groups and may generate a first CSI report based on that hypothesis. Additionally, the UE may generate a second CSI report for a first hypothesis group, such as a single panel hypothesis group. In some examples, the second CSI report may instead be generated based on a hypothesis that corresponds to a threshold, such as a threshold number of antenna panels or subpanels, which may be indicated in the CSI report configuration. Here, the threshold may be determined based on a tradeoff, such as a tradeoff between spectral efficiency and power consumption (e.g., based on a number of active antenna panels). That is, the threshold may represent a highest spectral efficiency achievable with a lowest number of active antenna panels.

The UE may, in some examples, determine and indicate one or more identifiers associated with hypotheses and/or hypothesis groups, for instance, as part of the CSI report(s) transmitted to the base station. As a first example, for a set of hypothesis groups, the UE may determine respective CRIs for respective hypotheses within each hypothesis group. In each hypothesis group, the hypotheses may be indexed from 0 to $N_k$, where $N_k$ is equal to the quantity of hypotheses in the hypothesis group. Alternatively, as a second example, the UE may determine CRIs for respective hypotheses from the set of hypothesis groups. In this example, the UE may index the hypotheses from 0 to n, where n is equal to the quantity of all hypotheses in the set of hypothesis groups.

In some examples, the UE may additionally or alternatively report an ordering of the hypotheses, e.g., using the CRIs, or may indicate (e.g., implicitly) one or more antenna panels or subpanels associated with each hypothesis within a hypothesis group or across all hypothesis groups. For instance, for a base station with a single TRP with a set of four antenna panels, the UE may be configured with four hypothesis groups—a single panel hypothesis group, a dual panel hypothesis group, a three panel hypothesis group, and a four panel hypothesis group. Using the three panel hypothesis group as an example, the UE may perform a hypothesis for each subset of three antenna panels from the set of four antenna panels, such that the UE may perform three total hypotheses. A first hypothesis may correspond to a first subset that includes a first antenna panel 0, a second antenna panel 1, and a third antenna panel 2. A second hypothesis may correspond to a second subset that includes the first antenna panel 0, the second antenna panel 1, and a fourth antenna panel 3. A third hypothesis may correspond to a third subset that includes the second antenna panel 1, the third antenna panel 2, and the fourth antenna panel 3.

The UE may order the hypotheses and may assign CRIs to respective hypotheses based on the ordering. For example, the UE may index the hypotheses from 0 to $N_k$, e.g., the UE may index and order hypotheses within each hypothesis group. The first hypothesis (e.g., corresponding to the subset (0, 1, 2)) may be assigned a CRI of 0, the second hypothesis (e.g., corresponding to the subset (0, 1, 3)) may be assigned a CRI of 1, and the third hypothesis (e.g., corresponding to the subset (0, 2, 3)) may be assigned a CRI of 2. Accordingly, when receiving a CSI feedback report, the base station may determine the subset of antenna panels that corresponds to a respective indicated CRI based on the ordering.

If, instead, the UE indexes the hypotheses from 0 to n, the UE may order and index the hypothesis across all hypothesis groups. For instance, the UE may order the hypotheses within each hypothesis group first and then across all hypothesis groups. Continuing the example above, the UE may order and index the hypotheses of the single panel hypothesis group, followed by the dual panel hypothesis group, the three panel hypothesis group, and the four panel hypothesis group. The hypotheses of the single panel group may be assigned CRIs of 0, 1, 2, and 3, respectively. The hypotheses of the dual panel group may be ordered based on respective subsets of the antenna panel set. For instance, a first hypothesis may correspond to a first dual panel subset (0, 1), a second hypothesis may correspond to a second dual panel subset (0, 2), a third hypothesis may correspond to a third dual panel subset (0, 3), and so on, for all possible dual panel subset combinations. The UE may assign the first hypothesis a CRI of 4, the second hypothesis a CRI of 5, the third hypothesis a CRI of 6, and so on, for the six hypotheses of the dual panel hypothesis group. Applying the same procedure to the three panel hypothesis group, the UE may assign the first, second, and third hypotheses CRIs of 10, 11, and 12. The single hypothesis of the four panel hypothesis group may be assigned a last CRI of 13.

The UE may include an indication of the determined CRIs as part of the CSI feedback report(s). In some cases, the UE may report CRIs for only those hypotheses for which the UE reports CSI feedback, and may refrain from reporting CRIs for hypotheses that are not used to generate a CSI report. In any case, the base station may determine a mapping between a hypothesis and an antenna panel subset based on the CRI and the ordering.

In some examples, there may be a threshold (e.g., a maximum) quantity of hypothesis groups or hypotheses within a hypothesis group that the UE is capable of performing, or a threshold (e.g., a maximum) quantity of CSI reports per hypothesis group or across all hypothesis groups that the UE is capable of generating. The UE may transmit an indication of such capability information to the base station. For instance, the capability information may include a threshold quantity of hypothesis groups, a threshold quantity of hypotheses within a hypothesis group, a threshold quantity of CSI reports within a hypothesis group, a threshold quantity of CSI reports for a set of hypothesis groups, or some combination thereof. In some examples, the base station may determine the CSI report configuration based on the indicated capability information.

Figure 7:
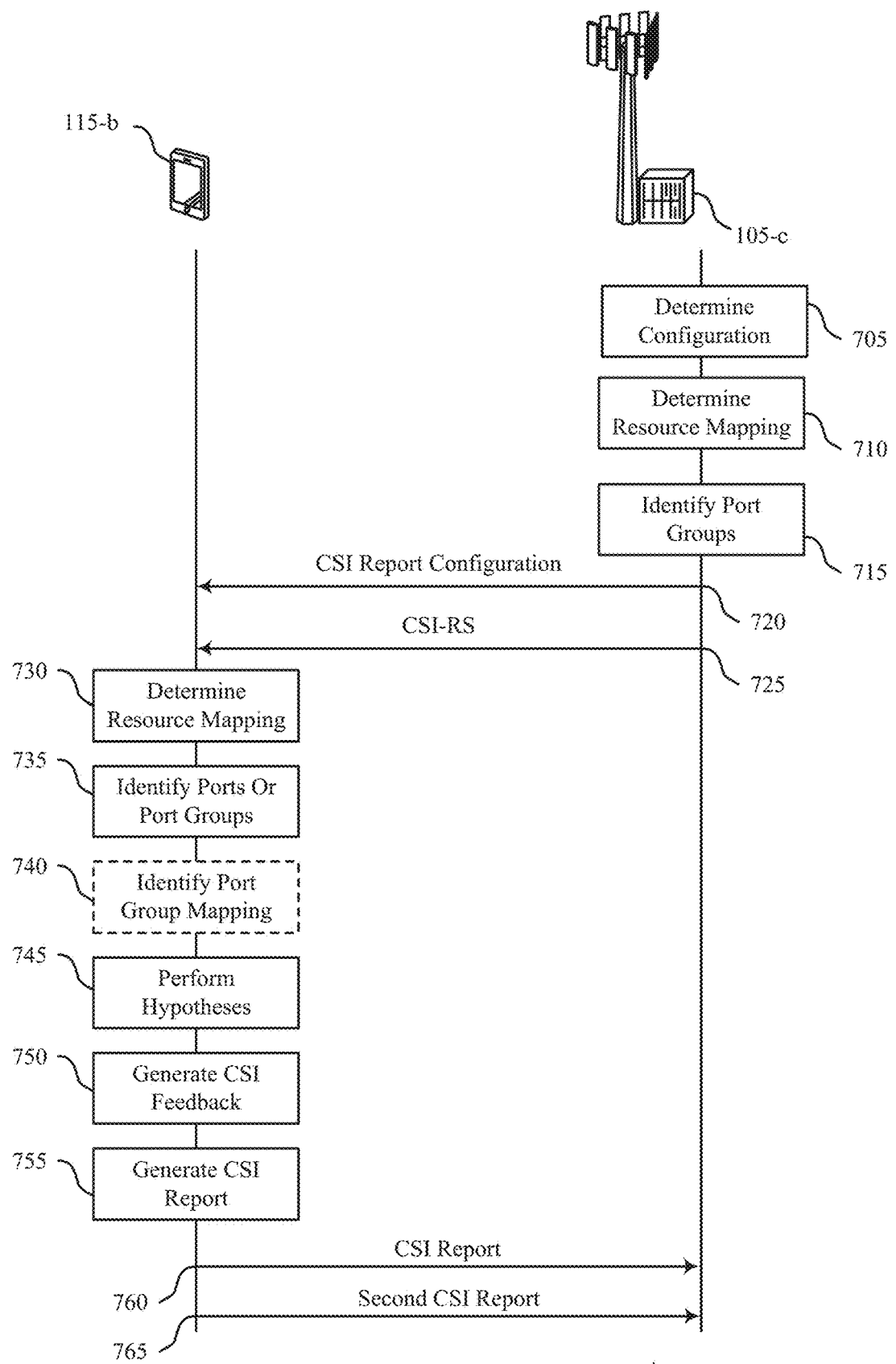
FIG. 7 illustrates an example of a process flow in a system that supports techniques for channel state feedback for panel adaptation in accordance with aspects of the present disclosure.

FIG. 7 illustrates an example of a process flow 700 in a system that supports techniques for channel state feedback for panel adaptation in accordance with aspects of the present disclosure. In some examples, process flow 700 may implement aspects of wireless communications systems 100 and 200. For example, process flow 700 includes a UE 115-b and a base station 105-c, which may be examples of the corresponding devices described herein. Additionally, the operations in process flow 700 performed by the UE 115-b and the base station 105-c may be respectively performed by a UE 115, a base station 105, or another wireless device, and the example shown should not be construed as limiting.

In the process flow 700, the base station 105-c may be an example of a single TRP and may have one or more antenna panels each including multiple antenna elements. In some examples, the one or more antenna panels may be divided into one or more subpanels. For instance, the base station 105-c may have four antenna panels, or may have one antenna panel divided into four subpanels.

At 705, the base station 105-c may determine a CSI report configuration associated with the TCI state, where the CSI report configuration indicates one or more CSI-RS resources (e.g., one or more sets of CSI-RS resources) to be used for one or more CSI-RSs. The one or more CSI-RS resources may correspond to a set of antenna panels of the base station 105-c, a set of subpanels of an antenna panel of the base station 105-c, or some combination thereof.

At 710, the base station 105-c may determine one or more resource mappings. For example, the base station 105-c may determine a mapping between respective CSI-RS resources of the one or more CSI-RS resources (e.g., indicated in the configuration) and respective antenna panels of the base station 105-c. In some examples, the base station 105-c may determine a mapping between a CSI-RS resource (e.g., of the one or more CSI-RS resources) and multiple antennas of the base station 105-c. Additionally or alternatively, the base station 105-*c* may determine a mapping between a CSI-RS resource and multiple antenna subpanels of an antenna panel of the base station 105-*c*.

At 715, the base station 105-*c* may identify multiple port groups associated with the one or more CSI-RSs. For instance, the base station 105-*c* may identify multiple CSI-RS ports associated with respective antenna panels of the base station 105-*c*. In some cases, a quantity of CSI-RS ports may be the same across antenna panels, while in other cases, the quantity of CSI-RS ports may differ across antenna panels. The base station 105-*c* may identify the multiple port groups such that each port group includes one or more CSI-RS ports. In some examples, at least a first port group of the multiple port groups may be associated with a first set of CSI-RS ports, a second group of the multiple port groups may be associated with a second set of CSI-RS ports, and so forth, for any quantity of ports and/or port groups.

At 720, the base station 105-*c* may transmit, and the UE 115-*b* may receive, signaling indicating the CSI report configuration. The CSI report configuration may optionally indicate the mapping determined at 710 or the port groups identified at 715. In some examples, the CSI report configuration may include an indication to use one or more hypothesis groups, e.g., from a set of hypothesis groups. In some cases, the CSI report configuration may indicate a mapping between each of one or more CDM groups and respective port groups.

At 725, the base station 105-*c* may transmit, and the UE 115-*b* may receive, the one or more CSI-RSs on the one or more CSI-RS resources in accordance with the CSI report configuration At 730, the UE 115-*b* may determine one or more resource mappings, e.g., based on the CSI report configuration. For instance, the UE 115-*b* may determine a mapping between respective CSI-RS resources and respective antenna panels of the base station 105-*c*. As a specific example, a first CSI-RS resource may be mapped to a first antenna panel and a second CSI-RS resource may be mapped to a second antenna panel. Alternatively, the first CSI-RS resource may be mapped to multiple antenna panels. In some examples, the UE 115-*b* may determine a mapping between a CSI-RS resource and multiple subpanels of an antenna panel.

At 735, the UE 115-*b* may identify multiple CSI-RS ports and/or port groups associated with the one or more CSI-RSs. In some examples, identifying the CSI-RS ports and/or port groups may be based on the CSI report configuration. For instance, the UE 115-*b* may identify multiple CSI-RS ports associated with respective antenna panels of the base station 105-*c*. A first quantity of CSI-RS ports may be associated with a first antenna panel of the base station 105-*c* and a second quantity of CSI-RS ports may be associated with a second antenna panel of the base station 105-*c*. In some cases, the first quantity and the second quantity may be the same, while in other cases, the first quantity and the second quantity may be different. In some examples, the quantity of CSI-RS ports per antenna panel may be based on a number of antenna elements of the antenna panel. Thus, if the first and second antenna panels have different numbers of antenna elements, the corresponding quantities of CSI-RS ports may also be different.

The UE 115-*b* may identify the multiple port groups such that each port group includes a set of one or more CSI-RS ports. For example, a first port group may be associated with a first set of CSI-RS ports, a second port group may be associated with a second set of CSI-RS ports, and so forth, for any quantity of port groups. In some cases, the quantity of port groups may be associated with a quantity of antenna panels or subpanels at the base station 105-*c*. In some instances, the port groups may be based on one or more CDM groups associated with CSI-RS locations. For instance, the UE 115-*b* may identify (e.g., based on the CSI report configuration) a mapping between each of one or more CDM groups and respective port groups.

In some examples, the resource mapping determined at 730 and the ports or port groups identified at 735 may be associated with one another. For instance, the UE 115-*b* may determine that a first quantity of CSI-RS ports is associated with a first antenna panel and a second quantity of CSI-RS ports is associated with a second antenna panel, where the first antenna panel is mapped to a first CSI-RS resource and the second antenna panel is mapped to a second CSI-RS resource.

At 740, the UE 115-*b* may identify one or more port group mappings. For example, the UE 115-*b* may identify that each port group of the multiple port groups (e.g., identified at 735) maps to a respective antenna panel of the base station 105-*c*. In some cases, an antenna panel may be mapped to one or more port groups, for instance, based on a number (i.e., a quantity) of antenna elements of the antenna panel. As an example, a first antenna panel may be mapped to one or more port groups based on a first number of antenna elements of the first antenna panel and a second antenna panel may be mapped to a single port group based on a second number of antenna elements of the second antenna panel.

In some examples, one or more port groups may map to a respective subpanel of an antenna panel of the base station 105-*c*. For example, each port group may be mapped to respective subpanels. Alternatively, a subpanel may be mapped to a single port group or to multiple port groups. For instance, a first subpanel map to one or more port groups (e.g., based on a first number of antenna elements of the first subpanel) and a second subpanel of the antenna panel may be mapped to a single port group (e.g., based on a second number of antenna elements of the second subpanel).

At 745, the UE 115-*b* may perform multiple hypotheses, for example, based on a set of antenna panels, a set of subpanels, or a combination thereof, as indicated by the CSI report configuration. In some examples, the multiple hypotheses may include a set of hypothesis groups (e.g., as described with reference to FIG. 6). For example, the set of hypothesis groups may include at least one of a first hypothesis group that includes one or more hypotheses based on respective antenna panels of the set of antenna panels, respective sub-panels of the set of sub-panels, or any combination thereof, a second hypothesis group that includes one or more hypotheses based on antenna panel pairs of the set of antenna panels, sub-panel pairs of the set of sub-panels, or any combination thereof, a third hypothesis group that includes one or more hypotheses based on a plurality of antenna panels of the set of antenna panels, a plurality of sub-panels of the set of sub-panels, or any combination thereof, or a fourth hypothesis group that includes a single hypothesis based on the set of antenna panels, the set of sub-panels, or any combination thereof.

At 750, the UE 115-*b* may generate CSI feedback in accordance with the CSI report configuration and based on measurements associated with the one or more CSI-RSs received at 725. In some cases, the UE 115-*b* may generate CSI feedback based on the resource mapping determined at 730, the ports and/or port groups identified at 735, the port group mapping at 740, the hypotheses performed at 745, or any combination thereof. For example, the UE 115-*b* may generate CSI feedback based on one or more respective CSI-RS resources being mapped to one or more respective antenna panels or subpanels (e.g., as determined at 730), one or more quantities of CSI-RS ports (e.g., as identified at 735), the multiple port groups (e.g., as identified at 735), a mapping between respective port groups and one or more respective antenna panels or subpanels (e.g., as determined at 740), or some combination thereof, among other examples.

Additionally, or alternatively, the UE 115-*b* may generate the CSI feedback based on the hypotheses performed at 745, e.g., where the hypotheses correspond to measurements of one or more of the CSI-RSs received at 725. For example, the UE 115-*b* may generate the CSI feedback based on one or more hypothesis groups, e.g., as indicated in the CSI report configuration. In some examples, when generating the CSI feedback, the UE 115-*b* may determine identifiers for respective hypotheses and/or hypothesis groups. For example, the UE 115-*b* may determine respective CSI-RS resource indicators for respective hypotheses from each hypothesis group or for respective hypotheses from the set of hypothesis groups, or some combination thereof, and the CSI feedback may include an indication of the respective CSI-RS resource indicators.

At 755, the UE 115-*b* may generate one or more CSI reports including the CSI feedback generated at 750, e.g., based on measurements associated with the one or more CSI-RSs received at 725. In some examples, the UE 115-*b* may generate one or more CSI reports based on hypotheses performed at 745, where each CSI report includes CSI feedback based on respective hypotheses. For example, the UE 115-*b* may be configured to generate a quantity of CSI reports for each hypothesis group. In a specific example, the UE 115-*b* may generate one CSI report for each of two hypothesis groups. The UE 115-*b* may generate a first CSI report that includes first CSI feedback that is based on a first hypothesis selected from among multiple hypotheses in a first hypothesis group. The UE 115-*b* may generate a second CSI report that includes second CSI feedback that is based on a second hypothesis selected from among multiple hypotheses in a second hypothesis group. Additionally or alternatively, the UE 115-*b* may generate a CSI report including CSI feedback for one hypothesis out of all of the set of hypothesis groups, a CSI report including CSI feedback that is based on a single panel or single subpanel hypothesis (e.g., as described with reference to FIG. 6), or some combination thereof. In some examples, the UE 115-*b* may generate a CSI report that includes CSI feedback corresponding to a hypothesis associated with a threshold number of antenna panels or subpanels.

At 760, the UE 115-*b* may transmit, and the base station 105-*c* may receive, a first one of the one or more CSI reports generated at 755. That is, the UE 115-*b* may transmit a message reporting the CSI feedback generated at 750 (e.g., based on the measurements associated with the CSI-RSs received at 725).

At 765, the UE 115-*b* may transmit, and the base station 105-*c* may receive, a second of the one or more CSI reports generated at 755.

Figure 8:
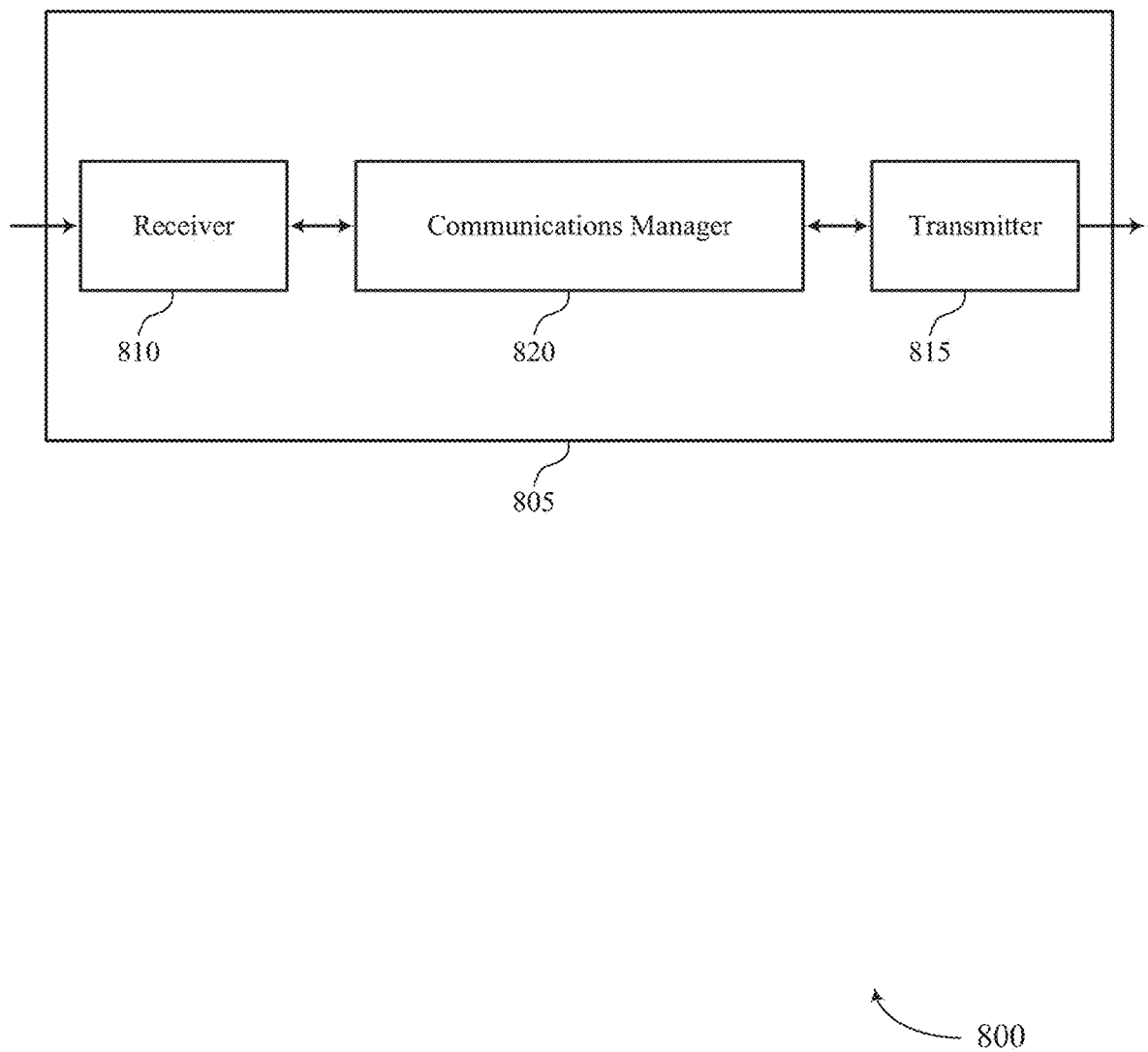
FIGS. 8 and 9 show block diagrams of devices that support techniques for channel state feedback for panel adaptation in accordance with aspects of the present disclosure.

FIG. 8 shows a block diagram 800 of a device 805 that supports techniques for channel state feedback for panel adaptation in accordance with aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for channel state feedback for panel adaptation). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for channel state feedback for panel adaptation). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of techniques for channel state feedback for panel adaptation as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a UE in accordance with examples as disclosed herein. For example, the communications manager 820 may be configured as or otherwise support a means for receiving, from a base station, signaling indicating a CSI report configuration that indicates one or more CSI-RS resources, where the one or more CSI-RS resources are mapped to at least one antenna panel of the base station. The communications manager 820 may be configured as or otherwise support a means for receiving one or more CSI-RSs on the one or more CSI-RS resources based on the CSI report configuration. The communications manager 820 may be configured as or otherwise support a means for transmitting, to the base station, a message reporting CSI feedback based on measurements associated with the received one or more CSI-RSs.

Additionally or alternatively, the communications manager 820 may support wireless communications at a UE in accordance with examples as disclosed herein. For example, the communications manager 820 may be configured as or otherwise support a means for receiving, from a base station, signaling indicating a CSI report configuration that indicates one or more CSI-RS resources, where the one or more CSI-RS resources correspond to a set of antenna panels of the base station, a set of sub-panels of an antenna panel of the base station, or any combination thereof. The communications manager 820 may be configured as or otherwise support a means for generating CSI based on a set of multiple hypotheses corresponding to measurements of one or more CSI-RSs received on the one or more CSI-RS resources, where the set of multiple hypotheses are based on the set of antenna panels, the set of sub-panels, or any combination thereof. The communications manager 820 may be configured as or otherwise support a means for transmitting, to the base station, a message reporting CSI feedback based on the set of multiple hypotheses.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for reporting CSI associated with antenna panels of a base station. For example, the device 805 may generate and report CSI based on an indicated CSI report configuration that includes a mapping between CSI-RS resources and antenna panels or subpanels of the base station, thereby increasing the efficacy and accuracy of the CSI report. Put another way, generating a CSI report at increasing levels of granularity enables the device 805 to provide CSI feedback that represents the channel with relatively increased accuracy. The device 805 may therefore select appropriate communications parameters, which may in turn reduce power consumption and increase communications efficiency at the device 805.

Figure 9:
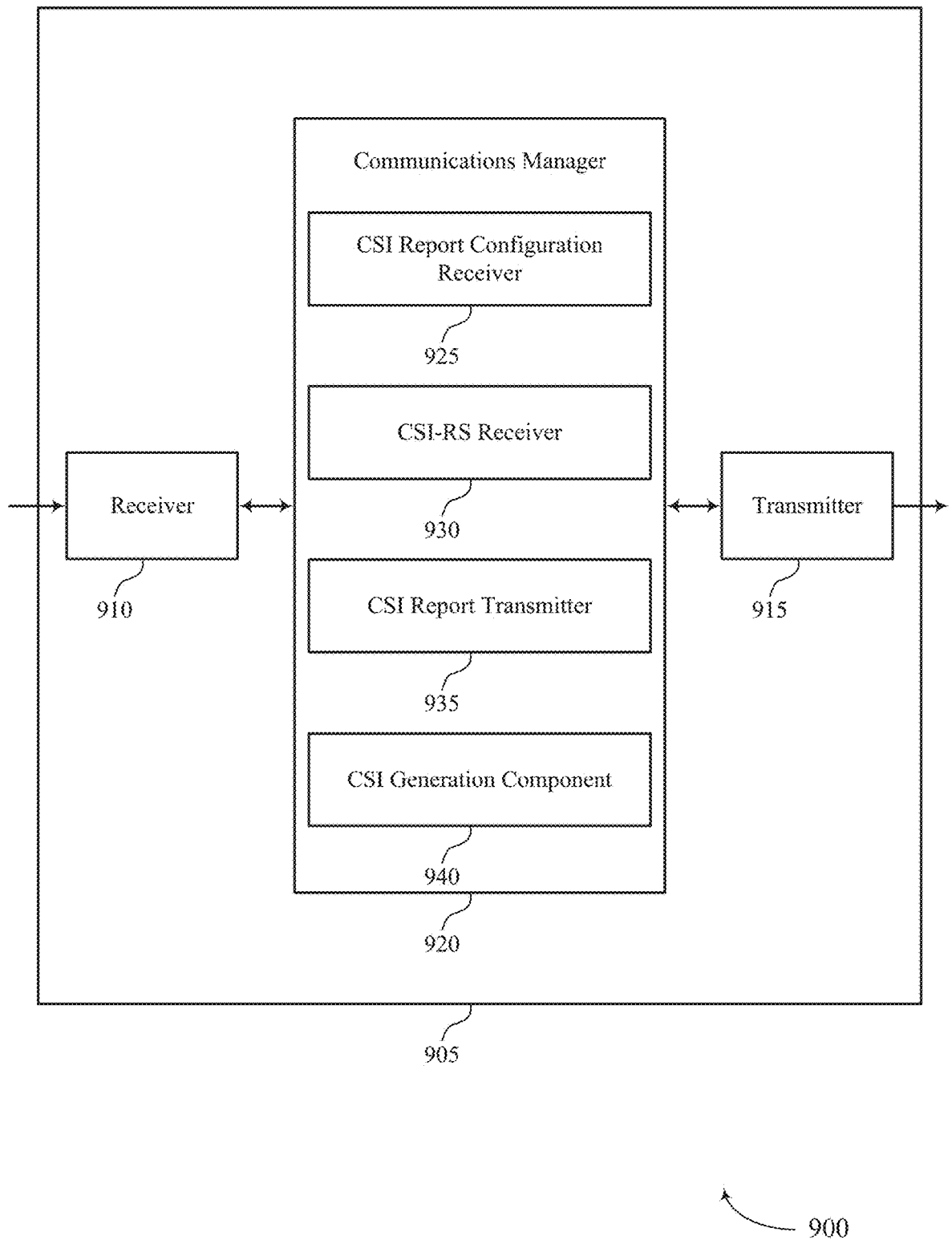

FIG. 9 shows a block diagram 900 of a device 905 that supports techniques for channel state feedback for panel adaptation in accordance with aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for channel state feedback for panel adaptation). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for channel state feedback for panel adaptation). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of techniques for channel state feedback for panel adaptation as described herein. For example, the communications manager 920 may include a CSI report configuration receiver 925, a CSI-RS receiver 930, a CSI report transmitter 935, a CSI generation component 940, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a UE in accordance with examples as disclosed herein. The CSI report configuration receiver 925 may be configured as or otherwise support a means for receiving, from a base station, signaling indicating a CSI report configuration that indicates one or more CSI-RS resources, where the one or more CSI-RS resources are mapped to at least one antenna panel of the base station. The CSI-RS receiver 930 may be configured as or otherwise support a means for receiving one or more CSI-RSs on the one or more CSI-RS resources based on the CSI report configuration. The CSI report transmitter 935 may be configured as or otherwise support a means for transmitting, to the base station, a message reporting CSI feedback based on measurements associated with the received one or more CSI-RSs.

Additionally or alternatively, the communications manager 920 may support wireless communications at a UE in accordance with examples as disclosed herein. The CSI report configuration receiver 925 may be configured as or otherwise support a means for receiving, from a base station, signaling indicating a CSI report configuration that indicates one or more CSI-RS resources, where the one or more CSI-RS resources correspond to a set of antenna panels of the base station, a set of sub-panels of an antenna panel of the base station, or any combination thereof. The CSI generation component 940 may be configured as or otherwise support a means for generating CSI based on a set of multiple hypotheses corresponding to measurements of one or more CSI-RSs received on the one or more CSI-RS resources, where the set of multiple hypotheses are based on the set of antenna panels, the set of sub-panels, or any combination thereof. The CSI report transmitter 935 may be configured as or otherwise support a means for transmitting, to the base station, a message reporting CSI feedback based on the set of multiple hypotheses.

Figure 10:
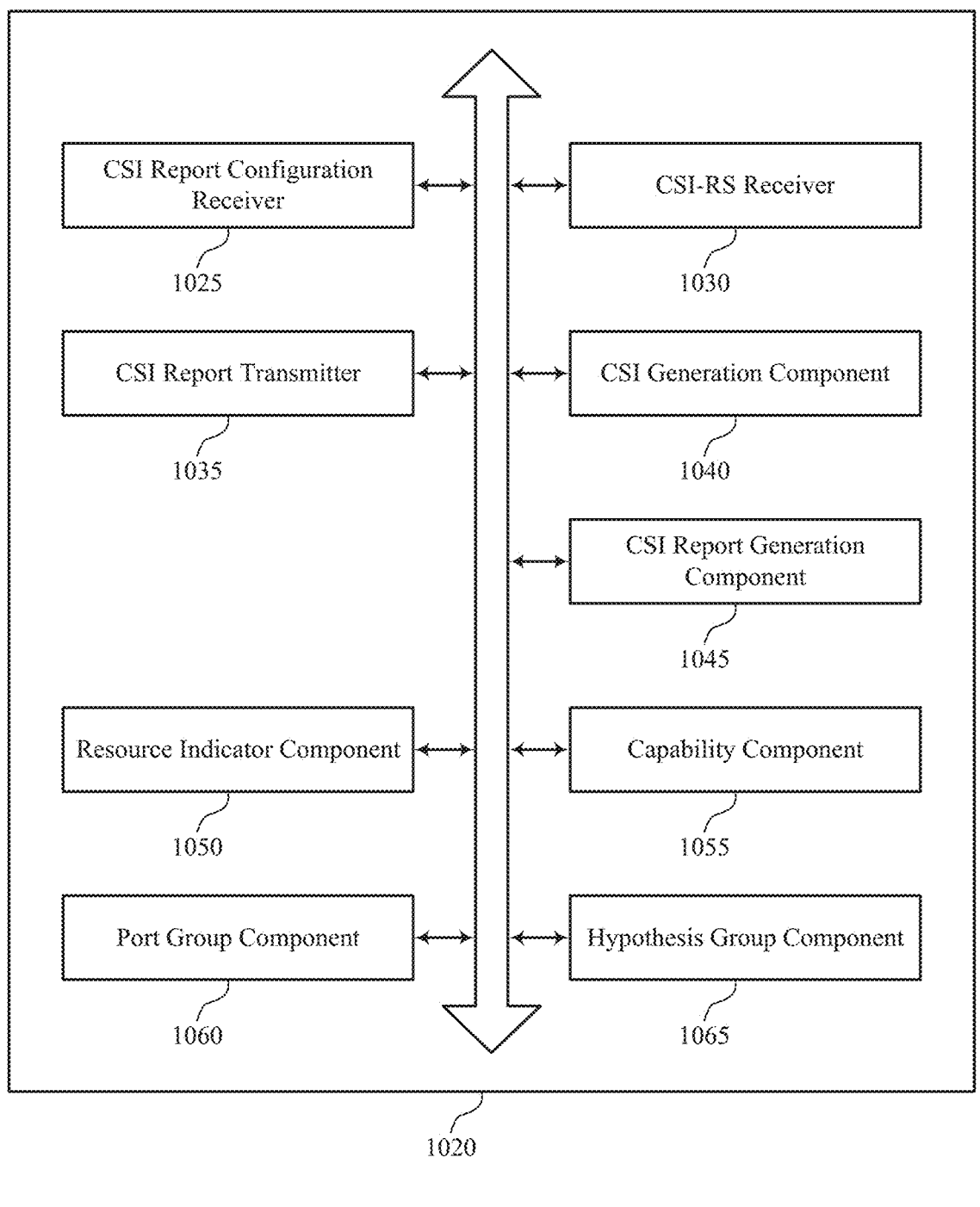
FIG. 10 shows a block diagram of a communications manager that supports techniques for channel state feedback for panel adaptation in accordance with aspects of the present disclosure.

FIG. 10 shows a block diagram 1000 of a communications manager 1020 that supports techniques for channel state feedback for panel adaptation in accordance with aspects of the present disclosure. The communications manager 1020 may be an example of aspects of a communications manager 820, a communications manager 920, or both, as described herein. The communications manager 1020, or various components thereof, may be an example of means for performing various aspects of techniques for channel state feedback for panel adaptation as described herein. For example, the communications manager 1020 may include a CSI report configuration receiver 1025, a CSI-RS receiver 1030, a CSI report transmitter 1035, a CSI generation component 1040, a CSI report generation component 1045, a resource indicator component 1050, a capability component 1055, a port group component 1060, a hypothesis group component 1065, or any combination thereof. Each of these components may communicate, directly or indirectly, with one another (e.g., via one or more buses).

The communications manager 1020 may support wireless communications at a UE in accordance with examples as disclosed herein. The CSI report configuration receiver 1025 may be configured as or otherwise support a means for receiving, from a base station, signaling indicating a CSI report configuration that indicates one or more CSI-RS resources, where the one or more CSI-RS resources are mapped to at least one antenna panel of the base station. The CSI-RS receiver 1030 may be configured as or otherwise support a means for receiving one or more CSI-RSs on the one or more CSI-RS resources based on the CSI report configuration. The CSI report transmitter 1035 may be configured as or otherwise support a means for transmitting, to the base station, a message reporting CSI feedback based on measurements associated with the received one or more CSI-RSs.

In some examples, the CSI generation component 1040 may be configured as or otherwise support a means for generating the CSI feedback based on respective CSI-RS resources of the one or more CSI-RS resources being mapped to respective antenna panels of the base station in accordance with the CSI report configuration.

In some examples, to support generating the CSI feedback, the CSI generation component 1040 may be configured as or otherwise support a means for generating the CSI feedback based on a first quantity of CSI-RS ports associated with a first antenna panel of the base station and a second quantity of CSI-RS ports associated with a second antenna panel of the base station, the first antenna panel being mapped to a first CSI-RS resource and the second antenna panel being mapped to a second CSI-RS resource. In some examples, the first quantity of CSI-RS ports is the same as the second quantity of CSI-RS ports based on a number of antenna elements of the first antenna panel being the same as a number of antenna elements of the second antenna panel. In some examples, the first quantity of CSI-RS ports is different from the second quantity of CSI-RS ports based on a number of antenna elements of the first antenna panel being different from a number of antenna elements of the second antenna panel.

In some examples, the CSI generation component 1040 may be configured as or otherwise support a means for generating the CSI feedback based on a CSI-RS resource of the one or more CSI-RS resources being mapped to multiple antenna panels of the base station in accordance with the CSI report configuration.

In some examples, to support generating the CSI feedback, the port group component 1060 may be configured as or otherwise support a means for identifying a set of multiple port groups associated with the one or more CSI-RSs, where at least a first port group of the set of multiple port groups is associated with a first set of CSI-RS ports and a second port group of the set of multiple port groups is associated with a second set of CSI-RS ports. In some examples, to support generating the CSI feedback, the CSI generation component 1040 may be configured as or otherwise support a means for generating the CSI feedback based on the set of multiple port groups.

In some examples, each port group of the set of multiple port groups is mapped to a respective antenna panel of the base station. In some examples, a first antenna panel of the base station is mapped to one or more port groups of the set of multiple port groups based on a first number of antenna elements of the first antenna panel. In some examples, a second antenna panel of the base station is mapped to a single port group of the set of multiple port groups based on a second number of antenna elements of the second antenna panel.

In some examples, the set of multiple port groups is based on one or more code division multiplexing groups associated with CSI-RS locations, the CSI report configuration indicating a mapping between each of the one or more code division multiplexing groups and respective port groups of the set of multiple port groups.

In some examples, the CSI generation component 1040 may be configured as or otherwise support a means for generating the CSI feedback based on a CSI-RS resource of the one or more CSI-RS resources being mapped to multiple sub-panels of an antenna panel of the base station in accordance with the CSI report configuration.

In some examples, to support generating the CSI feedback, the port group component 1060 may be configured as or otherwise support a means for identifying a set of multiple port groups associated with the one or more CSI-RSs, where at least a first port group of the set of multiple port groups is associated with a first set of CSI-RS ports and a second port group of the set of multiple port groups is associated with a second set of CSI-RS ports. In some examples, to support generating the CSI feedback, the CSI generation component 1040 may be configured as or otherwise support a means for generating the CSI feedback based on the set of multiple port groups.

In some examples, each port group of the set of multiple port groups is mapped to respective sub-panels of the antenna panel of the base station.

In some examples, a first sub-panel of the antenna panel is mapped to one or more port groups of the set of multiple port groups based on a first number of antenna elements of the first sub-panel. In some examples, a second sub-panel of the antenna panel is mapped to a single port group of the set of multiple port groups based on a second number of antenna elements of the second sub-panel.

In some examples, the set of multiple port groups is based on one or more code division multiplexing groups associated with CSI-RS locations, the CSI report configuration indicating a mapping between each of the one or more code division multiplexing groups and respective port groups of the set of multiple port groups. In some examples, the CSI report configuration is associated with a single transmission configuration indicator state.

Additionally or alternatively, the communications manager 1020 may support wireless communications at a UE in accordance with examples as disclosed herein. In some examples, the CSI report configuration receiver 1025 may be configured as or otherwise support a means for receiving, from a base station, signaling indicating a CSI report configuration that indicates one or more CSI-RS resources, where the one or more CSI-RS resources correspond to a set of antenna panels of the base station, a set of sub-panels of an antenna panel of the base station, or any combination thereof. The CSI generation component 1040 may be configured as or otherwise support a means for generating CSI based on a set of multiple hypotheses corresponding to measurements of one or more CSI-RSs received on the one or more CSI-RS resources, where the set of multiple hypotheses are based on the set of antenna panels, the set of sub-panels, or any combination thereof. In some examples, the CSI report transmitter 1035 may be configured as or otherwise support a means for transmitting, to the base station, a message reporting CSI feedback based on the set of multiple hypotheses.

In some examples, a first hypothesis group of the set of hypothesis groups includes one or more hypotheses based on respective antenna panels of the set of antenna panels, respective sub-panels of the set of sub-panels, or any combination thereof. In some examples, a second hypothesis group of the set of hypothesis groups includes one or more hypotheses based on antenna panel pairs of the set of antenna panels, sub-panel pairs of the set of sub-panels, or any combination thereof. In some examples, a third hypothesis group of the set of hypothesis groups includes one or more hypotheses based on a set of multiple antenna panels of the set of antenna panels, a set of multiple sub-panels of the set of sub-panels, or any combination thereof. In some examples, a fourth hypothesis group of the set of hypothesis groups includes a single hypothesis based on the set of antenna panels, the set of sub-panels, or any combination thereof.

In some examples, the hypothesis group component 1065 may be configured as or otherwise support a means for receiving, within the CSI report configuration, an indication to use one or more hypothesis groups from the set of hypothesis groups, where generating the CSI feedback is based on the one or more hypothesis groups.

In some examples, to support transmitting the message reporting the CSI feedback, the CSI report generation component 1045 may be configured as or otherwise support a means for generating a first CSI report including first CSI feedback that is based on a first hypothesis selected from a first set of multiple hypotheses of a first hypothesis group. In some examples, to support transmitting the message reporting the CSI feedback, the CSI report generation component 1050 may be configured as or otherwise support a means for generating a second CSI report including second CSI feedback that is based on a second hypothesis selected from a second set of multiple hypotheses of a second hypothesis group. In some examples, to support transmitting the message reporting the CSI feedback, the CSI report transmitter 1035 may be configured as or otherwise support a means for transmitting the first CSI report and the second CSI report to the base station.

In some examples, to support transmitting the message reporting the CSI feedback, the CSI report generation component 1045 may be configured as or otherwise support a means for generating one or more first CSI reports each including CSI feedback that is based on respective hypotheses selected from a first set of multiple hypotheses of a first hypothesis group. In some examples, to support transmitting the message reporting the CSI feedback, the CSI report generation component 1045 may be configured as or otherwise support a means for generating one or more second CSI reports each including CSI feedback that is based on respective hypotheses selected from a second set of multiple hypotheses of a second hypothesis group. In some examples, to support transmitting the message reporting the CSI feedback, the CSI report transmitter 1035 may be configured as or otherwise support a means for transmitting the one or more first CSI reports and the one or more second CSI reports to the base station.

In some examples, to support transmitting the message reporting the CSI feedback, the CSI report generation component 1045 may be configured as or otherwise support a means for generating a first CSI report including first CSI feedback that is based on a first hypothesis selected from a set of hypothesis groups. In some examples, to support transmitting the message reporting the CSI feedback, the CSI report generation component 1045 may be configured as or otherwise support a means for generating a second CSI report including second CSI feedback that is based on a second hypothesis corresponding to a single antenna panel of the set of antenna panels, or a single sub-panel of the set of sub-panels, or any combination thereof. In some examples, to support transmitting the message reporting the CSI feedback, the CSI report transmitter 1035 may be configured as or otherwise support a means for transmitting the first CSI report and the second CSI report to the base station.

In some examples, to support transmitting the message reporting the CSI feedback, the CSI report generation component 1045 may be configured as or otherwise support a means for generating a first CSI report including first CSI feedback that is based on a first hypothesis selected from a set of hypothesis groups. In some examples, to support transmitting the message reporting the CSI feedback, the CSI report generation component 1045 may be configured as or otherwise support a means for generating a second CSI report including second CSI feedback that is based on a second hypothesis corresponding to a threshold number of antenna panels of the set of antenna panels, or a threshold number of sub-panels of the set of sub-panels, or any combination thereof. In some examples, to support transmitting the message reporting the CSI feedback, the CSI report transmitter 1035 may be configured as or otherwise support a means for transmitting the first CSI report and the second CSI report to the base station.

In some examples, the set of multiple hypotheses includes a set of hypothesis groups, and the resource indicator component 1050 may be configured as or otherwise support a means for determining respective CSI-RS resource indicators for respective hypotheses from each hypothesis group, or respective CSI-RS resource indicators for respective hypotheses from the set of hypothesis groups, or any combination thereof, where the CSI feedback includes an indication of the respective CSI-RS resource indicators.

In some examples, the capability component 1055 may be configured as or otherwise support a means for transmitting, to the base station, signaling including capability information for the UE, the capability information including a threshold number of hypothesis groups, or a threshold number of hypotheses within a hypothesis group, or a threshold number of CSI reports within a hypothesis group, or a threshold number of CSI reports for a set of multiple hypothesis groups, or any combination thereof.

Figure 11:
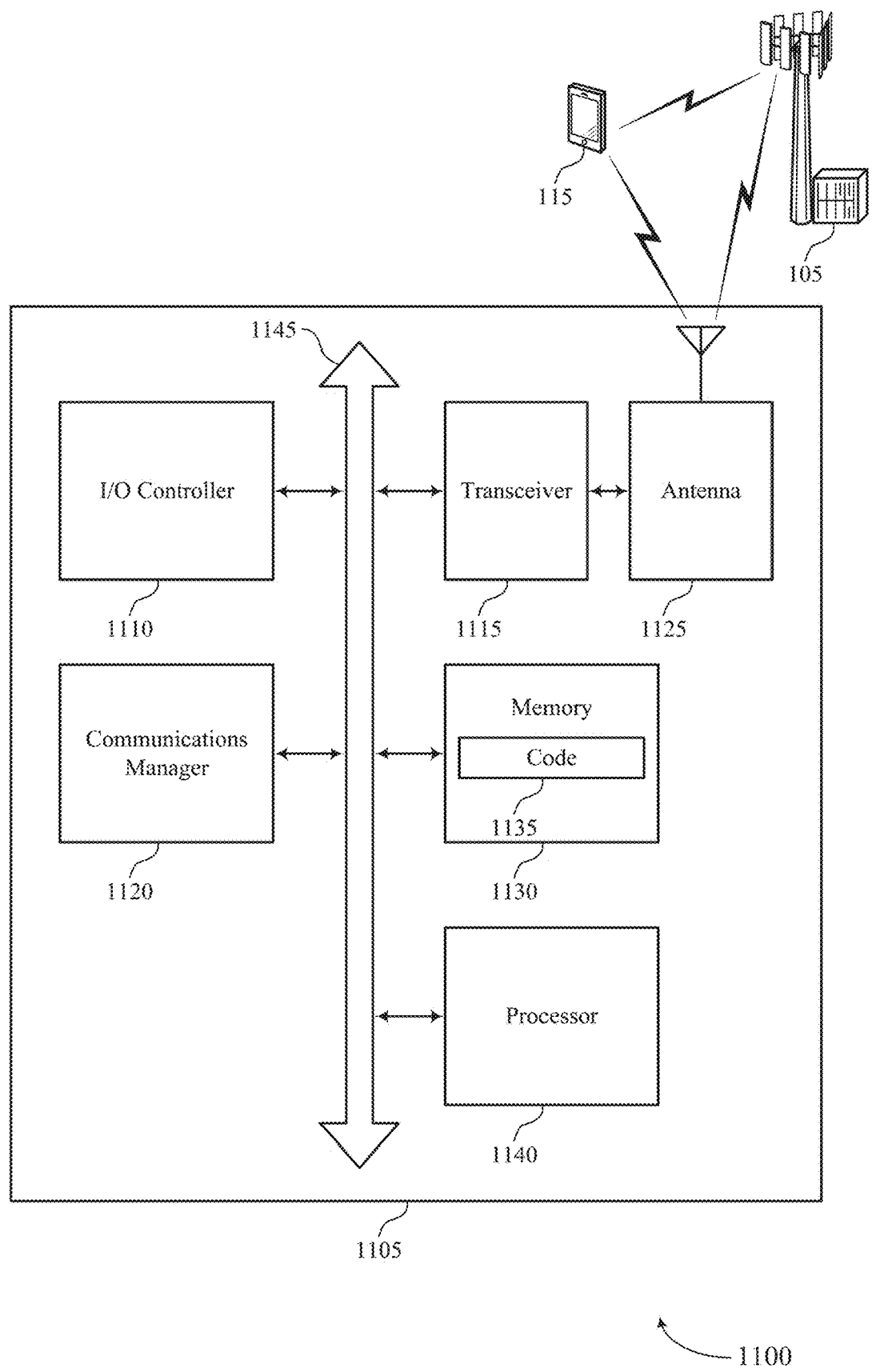
FIG. 11 shows a diagram of a system including a device that supports techniques for channel state feedback for panel adaptation in accordance with aspects of the present disclosure.

FIG. 11 shows a diagram of a system 1100 including a device 1105 that supports techniques for channel state feedback for panel adaptation in accordance with aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for channel state feedback for panel adaptation). For example, the device 1105 or a component of the device 1105 may include a processor 1140 and memory 1130 coupled to the processor 1140, the processor 1140 and memory 1130 configured to perform various functions described herein.

The communications manager 1120 may support wireless communications at a UE in accordance with examples as disclosed herein. For example, the communications manager 1120 may be configured as or otherwise support a means for receiving, from a base station, signaling indicating a CSI report configuration that indicates one or more CSI-RS resources, where the one or more CSI-RS resources are mapped to at least one antenna panel of the base station. The communications manager 1120 may be configured as or otherwise support a means for receiving one or more CSI-RSs on the one or more CSI-RS resources based on the CSI report configuration. The communications manager 1120 may be configured as or otherwise support a means for transmitting, to the base station, a message reporting CSI feedback based on measurements associated with the received one or more CSI-RSs.

Additionally or alternatively, the communications manager 1120 may support wireless communications at a UE in accordance with examples as disclosed herein. For example, the communications manager 1120 may be configured as or otherwise support a means for receiving, from a base station, signaling indicating a CSI report configuration that indicates one or more CSI-RS resources, where the one or more CSI-RS resources correspond to a set of antenna panels of the base station, a set of sub-panels of an antenna panel of the base station, or any combination thereof. The communications manager 1120 may be configured as or otherwise support a means for generating CSI based on a set of multiple hypotheses corresponding to measurements of one or more CSI-RSs received on the one or more CSI-RS resources, where the set of multiple hypotheses are based on the set of antenna panels, the set of sub-panels, or any combination thereof. The communications manager 1120 may be configured as or otherwise support a means for transmitting, to the base station, a message reporting CSI feedback based on the set of multiple hypotheses.

By including or configuring the communications manager 1120 in accordance with examples as described herein, the device 1105 may support techniques for reporting CSI associated with antenna panels or subpanels of a base station. For example, the device 1105 may generate and report CSI at increasing levels of granularity with respect to the antenna panels or subpanels, such the CSI may represent the channel with relatively increased accuracy. Increasing accuracy and efficacy of CSI may enable the device 1105, and other devices with which the device 1105 communicates (e.g., base stations 105, etc.), to perform more efficient link adaptation procedures, which in turn may increase communications reliability and efficiency in the system.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of techniques for channel state feedback for panel adaptation as described herein, or the processor 1140 and the memory 1130 may be otherwise configured to perform or support such operations.

Figure 12:
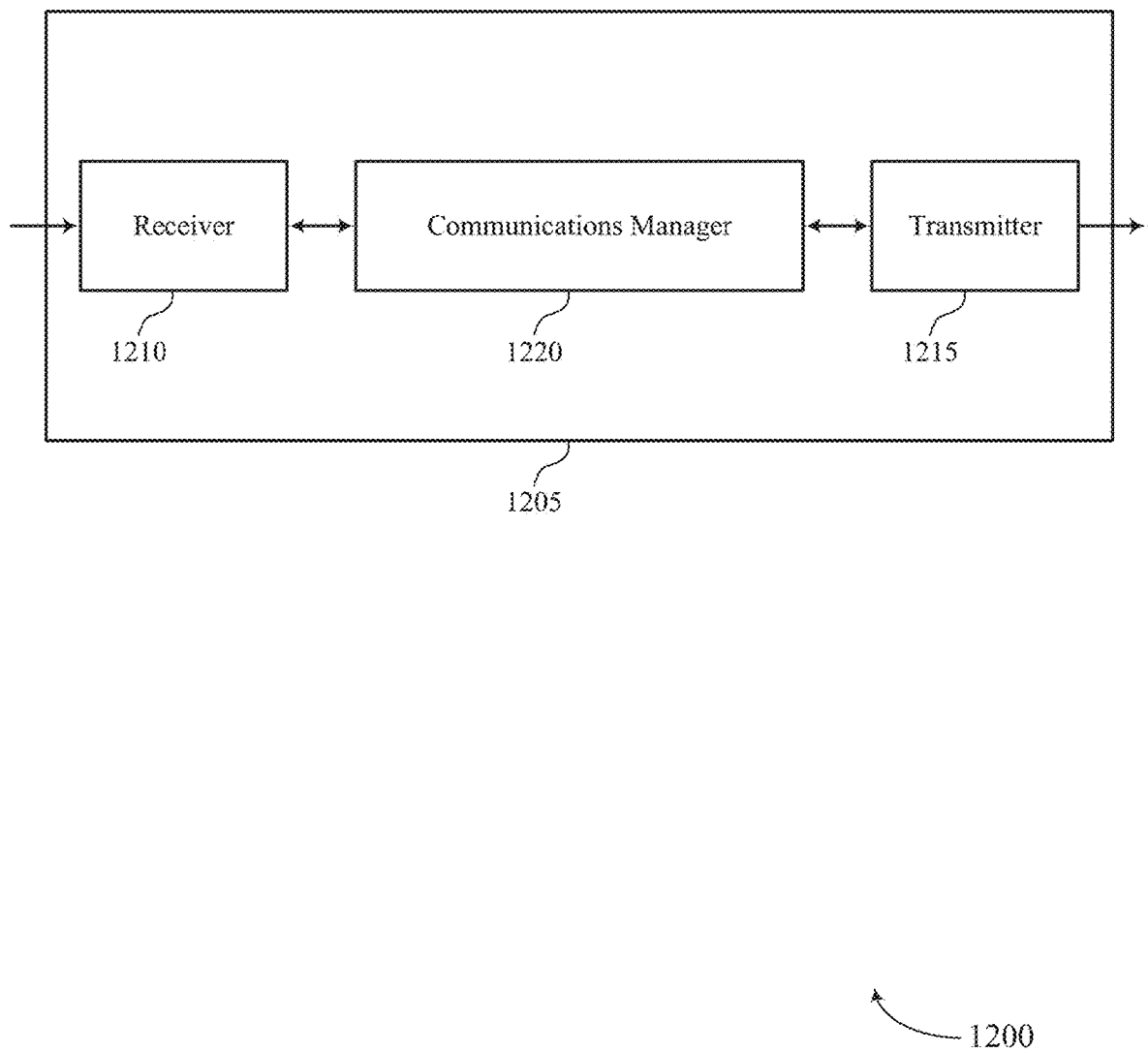
FIGS. 12 and 13 show block diagrams of devices that support techniques for channel state feedback for panel adaptation in accordance with aspects of the present disclosure.

FIG. 12 shows a block diagram 1200 of a device 1205 that supports techniques for channel state feedback for panel adaptation in accordance with aspects of the present disclosure. The device 1205 may be an example of aspects of a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to techniques for channel state feedback for panel adaptation). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to techniques for channel state feedback for panel adaptation). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of techniques for channel state feedback for panel adaptation as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1220 may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a base station in accordance with examples as disclosed herein. For example, the communications manager 1220 may be configured as or otherwise support a means for transmitting, to a UE, signaling indicating a CSI report configuration that indicates one or more CSI-RS resources, where the one or more CSI-RS resources correspond to at least one antenna panel of the base station. The communications manager 1220 may be configured as or otherwise support a means for transmitting one or more CSI-RSs on the one or more CSI-RS resources based on the CSI report configuration. The communications manager 1220 may be configured as or otherwise support a means for receiving, from the UE, a message reporting CSI feedback based on measurements associated with the received one or more CSI-RSs.

By including or configuring the communications manager 1220 in accordance with examples as described herein, the device 1205 (e.g., a processor controlling or otherwise coupled to the receiver 1210, the transmitter 1215, the communications manager 1220, or a combination thereof) may support techniques for CSI feedback in consideration of panel adaptation at the device 1205. For instance, the device 1205 may perform panel adaptation by turning off one or more antenna panels or subpanels at the device 1205 without negatively impacting CSI procedures at other devices that communicate with the device 1205. Further, panel adaptation at the device 1205 may reduce power consumption at the device 1205.

Figure 13:
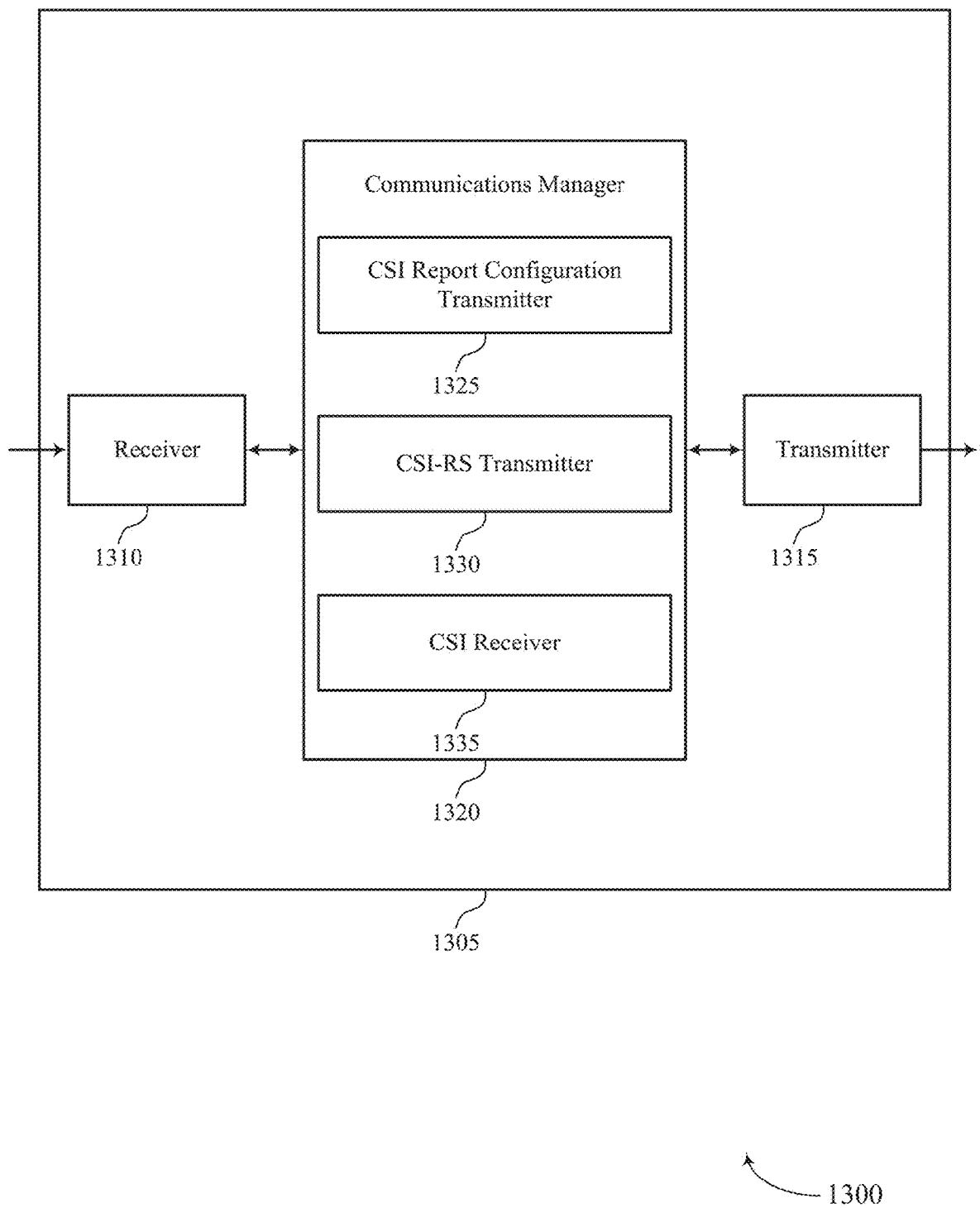

FIG. 13 shows a block diagram 1300 of a device 1305 that supports techniques for channel state feedback for panel adaptation in accordance with aspects of the present disclosure. The device 1305 may be an example of aspects of a device 1205 or a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to techniques for channel state feedback for panel adaptation). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to techniques for channel state feedback for panel adaptation). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of techniques for channel state feedback for panel adaptation as described herein. For example, the communications manager 1320 may include a CSI report configuration transmitter 1325, a CSI-RS transmitter 1330, a CSI receiver 1335, or any combination thereof. The communications manager 1320 may be an example of aspects of a communications manager 1220 as described herein. In some examples, the communications manager 1320, or various components thereof, may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communications at a base station in accordance with examples as disclosed herein. The CSI report configuration transmitter 1325 may be configured as or otherwise support a means for transmitting, to a UE, signaling indicating a CSI report configuration that indicates one or more CSI-RS resources, where the one or more CSI-RS resources correspond to at least one antenna panel of the base station. The CSI-RS transmitter 1330 may be configured as or otherwise support a means for transmitting one or more CSI-RSs on the one or more CSI-RS resources based on the CSI report configuration. The CSI receiver 1335 may be configured as or otherwise support a means for receiving, from the UE, a message reporting CSI feedback based on measurements associated with the received one or more CSI-RSs.

Figure 14:
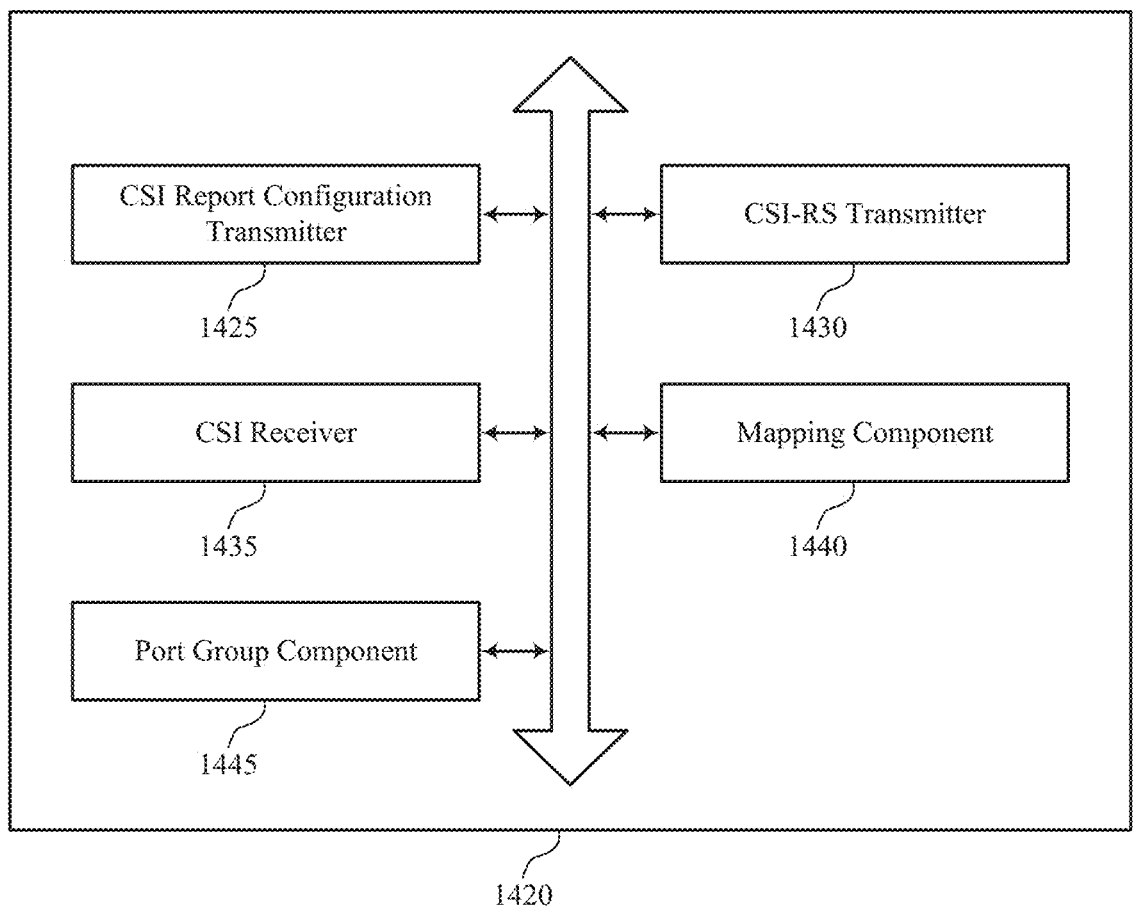
FIG. 14 shows a block diagram of a communications manager that supports techniques for channel state feedback for panel adaptation in accordance with aspects of the present disclosure.

FIG. 14 shows a block diagram 1400 of a communications manager 1420 that supports techniques for channel state feedback for panel adaptation in accordance with aspects of the present disclosure. The communications manager 1420 may be an example of aspects of a communications manager 1220, a communications manager 1320, or both, as described herein. The communications manager 1420, or various components thereof, may be an example of means for performing various aspects of techniques for channel state feedback for panel adaptation as described herein. For example, the communications manager 1420 may include a CSI report configuration transmitter 1425, a CSI-RS transmitter 1430, a CSI receiver 1435, a mapping component 1440, a port group component 1445, or any combination thereof. Each of these components may communicate, directly or indirectly, with one another (e.g., via one or more buses).

The communications manager 1420 may support wireless communications at a base station in accordance with examples as disclosed herein. The CSI report configuration transmitter 1425 may be configured as or otherwise support a means for transmitting, to a UE, signaling indicating a CSI report configuration that indicates one or more CSI-RS resources, where the one or more CSI-RS resources correspond to at least one antenna panel of the base station. The CSI-RS transmitter 1430 may be configured as or otherwise support a means for transmitting one or more CSI-RSs on the one or more CSI-RS resources based on the CSI report configuration. The CSI receiver 1435 may be configured as or otherwise support a means for receiving, from the UE, a message reporting CSI feedback based on measurements associated with the received one or more CSI-RSs.

In some examples, the mapping component 1440 may be configured as or otherwise support a means for determining a mapping between respective CSI-RS resources of the one or more CSI-RS resources and respective antenna panels of the base station, the CSI report configuration indicating the mapping, where the CSI feedback is based on the respective CSI-RS resources of the one or more CSI-RS resources being mapped to the respective antenna panels of the base station in accordance with the CSI report configuration.

In some examples, the mapping component 1440 may be configured as or otherwise support a means for determining a mapping between a CSI-RS resource of the one or more CSI-RS resources and multiple antenna panels of the base station. In some examples, the port group component 1445 may be configured as or otherwise support a means for identifying a set of multiple port groups associated with the one or more CSI-RSs, at least a first port group of the set of multiple port groups being associated with a first set of CSI-RS ports and a second port group of the set of multiple port groups being associated with a second set of CSI-RS ports, where the CSI feedback is based on a set of multiple port groups and the CSI-RS resource being mapped to the multiple antenna panels of the base station, and where the set of multiple port groups is based on one or more code division multiplexing groups associated with CSI-RS locations.

In some examples, the mapping component 1440 may be configured as or otherwise support a means for determining a mapping between a CSI-RS resource of the one or more CSI-RS resources and multiple sub-panels of an antenna panel of the base station. In some examples, the port group component 1445 may be configured as or otherwise support a means for identifying a set of multiple port groups associated with the one or more CSI-RSs, at least a first port group of the set of multiple port groups being associated with a first set of CSI-RS ports and a second port group of the set of multiple port groups being associated with a second set of CSI-RS ports, where the CSI feedback is based on the set of multiple port groups and the CSI-RS resource being mapped to the multiple sub-panels, and where the set of multiple port groups is based on one or more code division multiplexing groups associated with CSI-RS locations.

Figure 15:
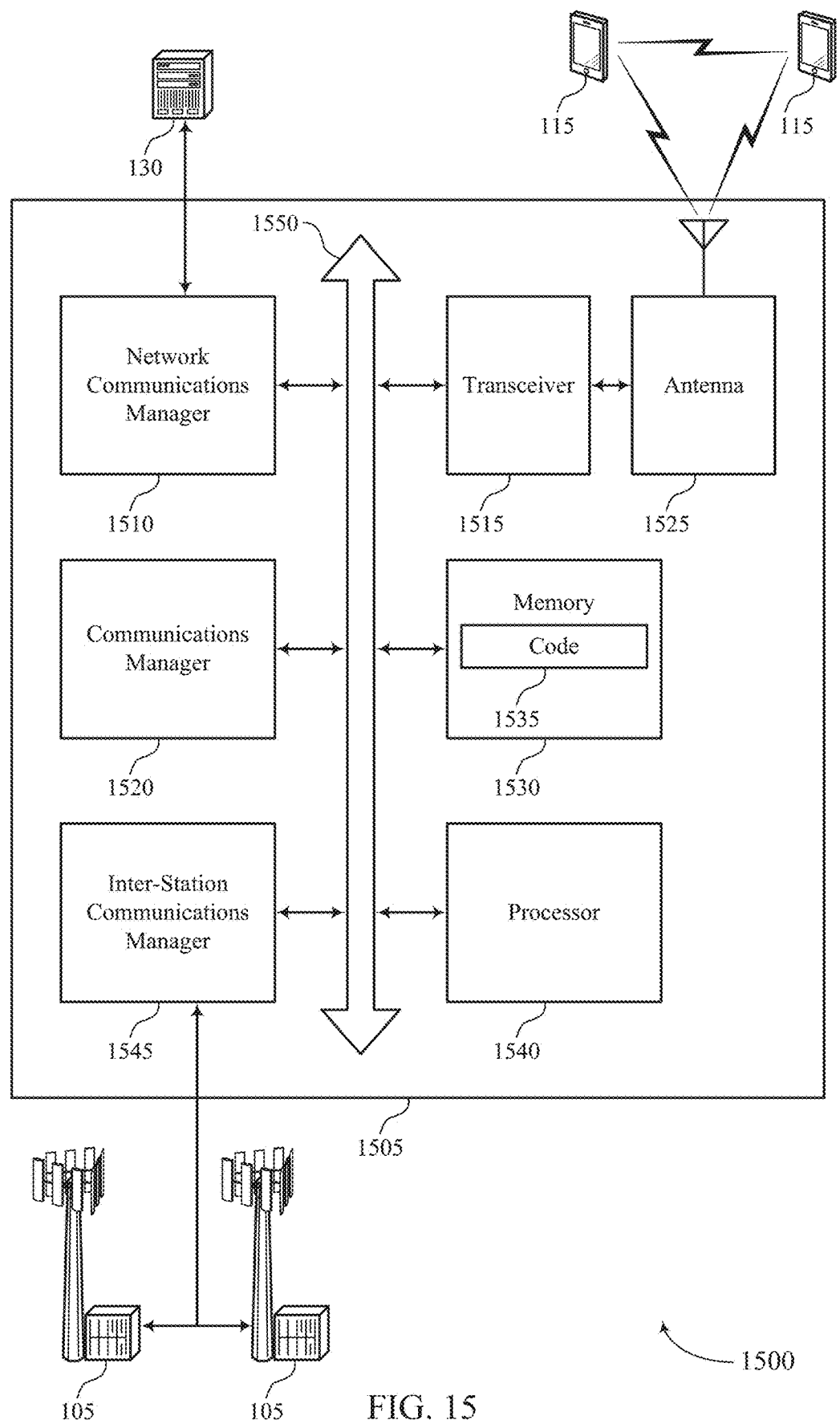
FIG. 15 shows a diagram of a system including a device that supports techniques for channel state feedback for panel adaptation in accordance with aspects of the present disclosure.

FIG. 15 shows a diagram of a system 1500 including a device 1505 that supports techniques for channel state feedback for panel adaptation in accordance with aspects of the present disclosure. The device 1505 may be an example of or include the components of a device 1205, a device 1305, or a base station 105 as described herein. The device 1505 may communicate wirelessly with one or more base stations 105, UEs 115, or any combination thereof. The device 1505 may include components for bi-directional voice and data communications including components for transmitting and receiving communications, such as a communications manager 1520, a network communications manager 1510, a transceiver 1515, an antenna 1525, a memory 1530, code 1535, a processor 1540, and an inter-station communications manager 1545. These components may be in electronic communication or otherwise coupled (e.g., operatively, communicatively, functionally, electronically, electrically) via one or more buses (e.g., a bus 1550).

The network communications manager 1510 may manage communications with a core network 130 (e.g., via one or more wired backhaul links). For example, the network communications manager 1510 may manage the transfer of data communications for client devices, such as one or more UEs 115.

In some cases, the device 1505 may include a single antenna 1525. However, in some other cases the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The memory 1530 may include RAM and ROM. The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory. In some cases, the code 1535 may not be directly executable by the processor 1540 but may cause a computer (e.g., when compiled and executed) to perform functions described herein. In some cases, the memory 1530 may contain, among other things, a BIOS which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting techniques for channel state feedback for panel adaptation). For example, the device 1505 or a component of the device 1505 may include a processor 1540 and memory 1530 coupled to the processor 1540, the processor 1540 and memory 1530 configured to perform various functions described herein.

The inter-station communications manager 1545 may manage communications with other base stations 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communications network technology to provide communication between base stations 105.

The communications manager 1520 may support wireless communications at a base station in accordance with examples as disclosed herein. For example, the communications manager 1520 may be configured as or otherwise support a means for transmitting, to a UE, signaling indicating a CSI report configuration that indicates one or more CSI-RS resources, where the one or more CSI-RS resources correspond to at least one antenna panel of the base station. The communications manager 1520 may be configured as or otherwise support a means for transmitting one or more CSI-RSs on the one or more CSI-RS resources based on the CSI report configuration. The communications manager 1520 may be configured as or otherwise support a means for receiving, from the UE, a message reporting CSI feedback based on measurements associated with the received one or more CSI-RSs.

By including or configuring the communications manager 1520 in accordance with examples as described herein, the device 1505 may support techniques for CSI feedback in consideration of panel adaptation at the device 1205. For instance, the device 1205 may configure a UE, such as a UE 115, with a CSI report configuration that indicates a mapping between CSI-RS resources and one or more antenna panels or subpanels at the device 1505. The device 1505 may therefore receive CSI reports from the UE 115 associated with respective antenna panels or subpanels, which may enable the device 1505 to perform more effective and accurate link adaptation procedures. For example, the device 1505 may adjust one or more parameters for communications with the UE 115 based on one or more received CSI reports, which may increase communications efficiency and reliability. Additionally, or alternatively, the device 1505 may select an antenna panel configuration based on one or more received CSI reports that supports reduced power consumption, increased spectral efficiency and throughput, or a combination thereof.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include instructions executable by the processor 1540 to cause the device 1505 to perform various aspects of techniques for channel state feedback for panel adaptation as described herein, or the processor 1540 and the memory 1530 may be otherwise configured to perform or support such operations.

Figure 16:
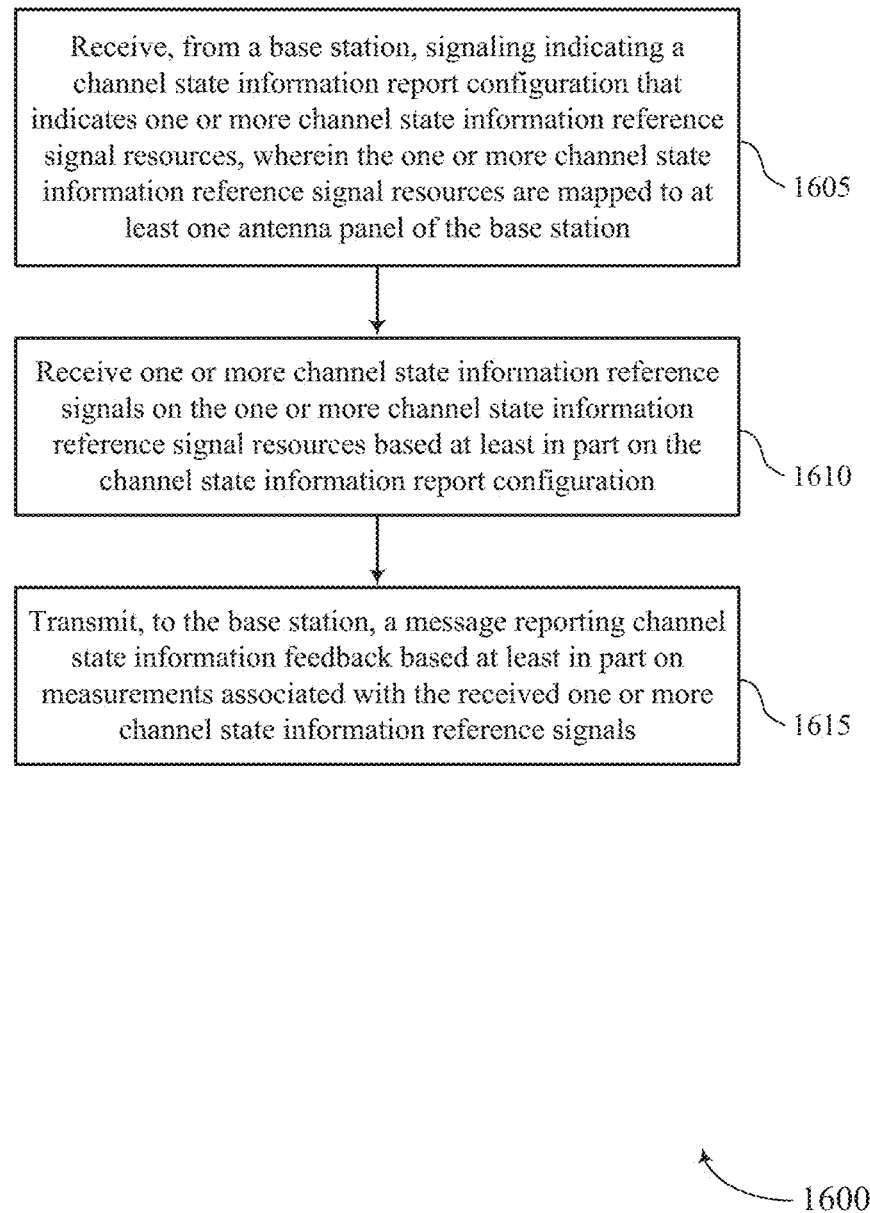
FIGS. 16 through 18 show flowcharts illustrating methods that support techniques for channel state feedback for panel adaptation in accordance with aspects of the present disclosure.

FIG. 16 shows a flowchart illustrating a method 1600 that supports techniques for channel state feedback for panel adaptation in accordance with aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, signaling indicating a CSI report configuration that indicates one or more CSI-RS resources, where the one or more CSI-RS resources are mapped to at least one antenna panel of the base station. The operations of 1605 may be performed in accordance with examples as disclosed herein. In some examples, aspects of the operations of 1605 may be performed by a CSI report configuration receiver 1025 as described with reference to FIG. 10.

At 1610, the method may include receiving one or more CSI-RSs on the one or more CSI-RS resources based on the CSI report configuration. The operations of 1610 may be performed in accordance with examples as disclosed herein. In some examples, aspects of the operations of 1610 may be performed by a CSI-RS receiver 1030 as described with reference to FIG. 10.

At 1615, the method may include transmitting, to the base station, a message reporting CSI feedback based on measurements associated with the received one or more CSI-RSs. The operations of 1615 may be performed in accordance with examples as disclosed herein. In some examples, aspects of the operations of 1615 may be performed by a CSI report transmitter 1035 as described with reference to FIG. 10.

Figure 17:
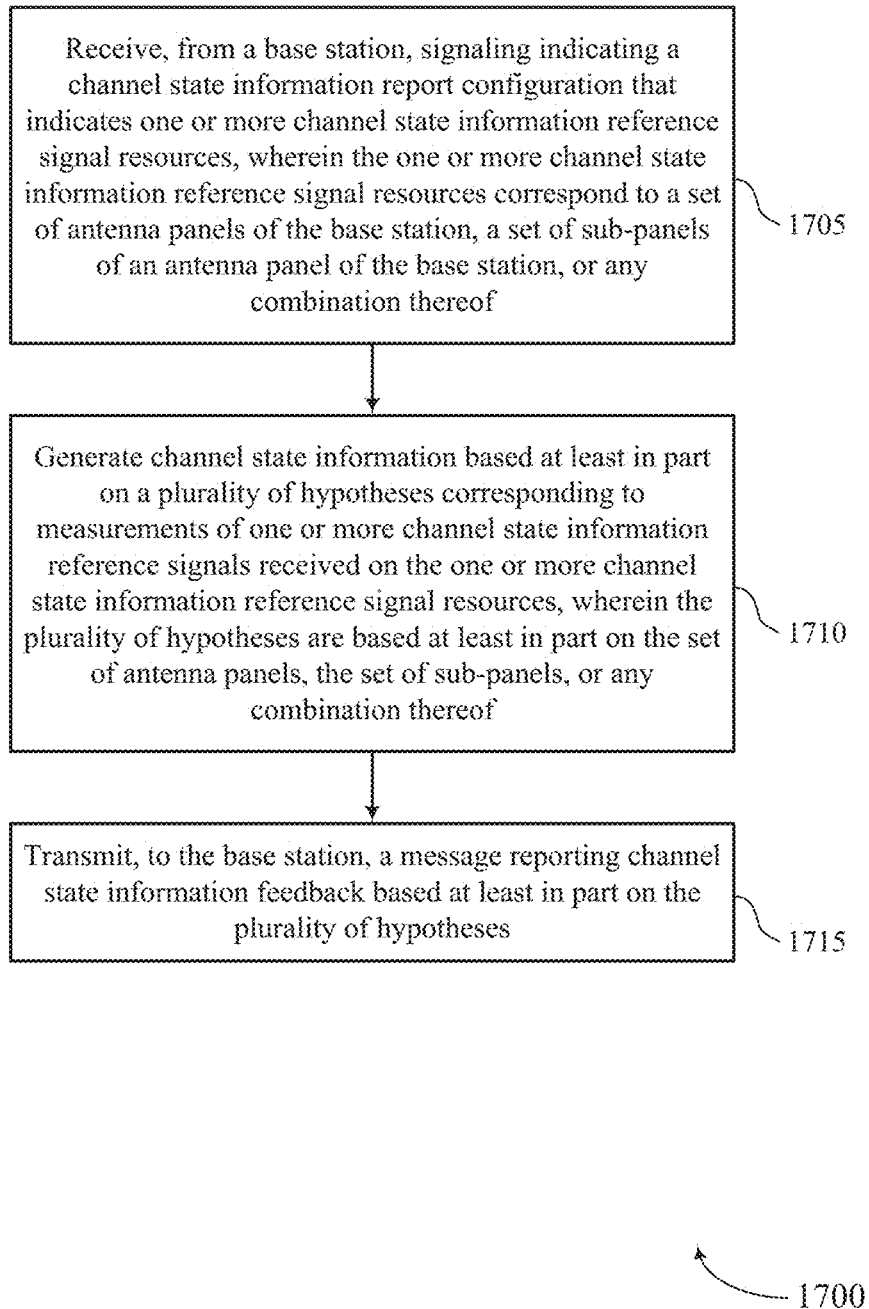

FIG. 17 shows a flowchart illustrating a method 1700 that supports techniques for channel state feedback for panel adaptation in accordance with aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1705, the method may include receiving, from a base station, signaling indicating a CSI report configuration that indicates one or more CSI-RS resources, where the one or more CSI-RS resources correspond to a set of antenna panels of the base station, a set of sub-panels of an antenna panel of the base station, or any combination thereof. The operations of 1705 may be performed in accordance with examples as disclosed herein. In some examples, aspects of the operations of 1705 may be performed by a CSI report configuration receiver 1025 as described with reference to FIG. 10.

At 1710, the method may include generating CSI based on a set of multiple hypotheses corresponding to measurements of one or more CSI-RSs received on the one or more CSI-RS resources, where the set of multiple hypotheses are based on the set of antenna panels, the set of sub-panels, or any combination thereof. The operations of 1710 may be performed in accordance with examples as disclosed herein. In some examples, aspects of the operations of 1710 may be performed by a CSI generation component 1040 as described with reference to FIG. 10.

At 1715, the method may include transmitting, to the base station, a message reporting CSI feedback based on the set of multiple hypotheses. The operations of 1715 may be performed in accordance with examples as disclosed herein. In some examples, aspects of the operations of 1715 may be performed by a CSI report transmitter 1035 as described with reference to FIG. 10.

Figure 18:
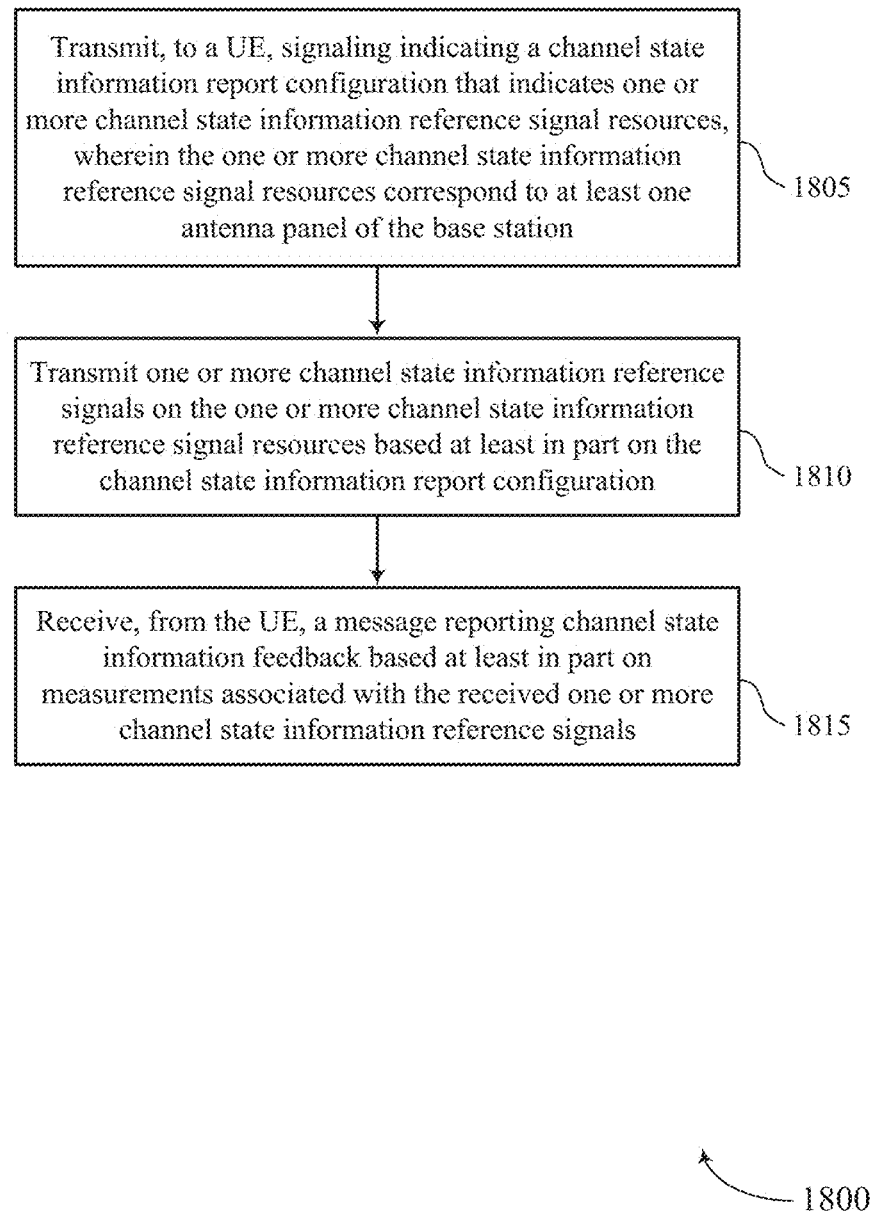

FIG. 18 shows a flowchart illustrating a method 1800 that supports techniques for channel state feedback for panel adaptation in accordance with aspects of the present disclosure. The operations of the method 1800 may be implemented by a base station or its components as described herein. For example, the operations of the method 1800 may be performed by a base station 105 as described with reference to FIGS. 1 through 7 and 12 through 15. In some examples, a base station may execute a set of instructions to control the functional elements of the base station to perform the described functions. Additionally or alternatively, the base station may perform aspects of the described functions using special-purpose hardware.

At 1805, the method may include transmitting, to a UE, signaling indicating a CSI report configuration that indicates one or more CSI-RS resources, where the one or more CSI-RS resources correspond to at least one antenna panel of the base station. The operations of 1805 may be performed in accordance with examples as disclosed herein. In some examples, aspects of the operations of 1805 may be performed by a CSI report configuration transmitter 1425 as described with reference to FIG. 14.

At 1810, the method may include transmitting one or more CSI-RSs on the one or more CSI-RS resources based on the CSI report configuration. The operations of 1810 may be performed in accordance with examples as disclosed herein. In some examples, aspects of the operations of 1810 may be performed by a CSI-RS transmitter 1430 as described with reference to FIG. 14.

At 1815, the method may include receiving, from the UE, a message reporting CSI feedback based on measurements associated with the received one or more CSI-RSs. The operations of 1815 may be performed in accordance with examples as disclosed herein. In some examples, aspects of the operations of 1815 may be performed by a CSI receiver 1435 as described with reference to FIG. 14.

The following provides an overview of aspects of the present disclosure:

Aspect 1: A method for wireless communications at a UE, comprising: receiving, from a base station, signaling indicating a CSI report configuration that indicates one or more CSI-RS resources, wherein the one or more CSI-RS resources are mapped to at least one antenna panel of the base station; receiving one or more CSI-RSs on the one or more CSI-RS resources based at least in part on the CSI report configuration; and transmitting, to the base station, a message reporting CSI feedback based at least in part on measurements associated with the received one or more CSI-RSs.

Aspect 2: The method of aspect 1, further comprising: generating the CSI feedback based at least in part on respective CSI-RS resources of the one or more CSI-RS resources being mapped to respective antenna panels of the base station in accordance with the CSI report configuration.

Aspect 3: The method of aspect 2, wherein generating the CSI feedback comprises: generating the CSI feedback based at least in part on a first quantity of CSI-RS ports associated with a first antenna panel of the base station and a second quantity of CSI-RS ports associated with a second antenna panel of the base station, the first antenna panel being mapped to a first CSI-RS resource and the second antenna panel being mapped to a second CSI-RS resource.

Aspect 4: The method of aspect 3, wherein the first quantity of CSI-RS ports is the same as the second quantity of CSI-RS ports based at least in part on a number of antenna elements of the first antenna panel being the same as a number of antenna elements of the second antenna panel.

Aspect 5: The method of any of aspects 3 through 4, wherein the first quantity of CSI-RS ports is different from the second quantity of CSI-RS ports based at least in part on a number of antenna elements of the first antenna panel being different from a number of antenna elements of the second antenna panel.

Aspect 6: The method of any of aspects 1 through 5, further comprising: generating the CSI feedback based at least in part on a CSI-RS resource of the one or more CSI-RS resources being mapped to multiple antenna panels of the base station in accordance with the CSI report configuration.

Aspect 7: The method of aspect 6, wherein generating the CSI feedback comprises: identifying a plurality of port groups associated with the one or more CSI-RSs, wherein at least a first port group of the plurality of port groups is associated with a first set of CSI-RS ports and a second port group of the plurality of port groups is associated with a second set of CSI-RS ports; and generating the CSI feedback based at least in part on the plurality of port groups.

Aspect 8: The method of aspect 7, wherein each port group of the plurality of port groups is mapped to a respective antenna panel of the base station.

Aspect 9: The method of any of aspects 7 through 8, wherein a first antenna panel of the base station is mapped to one or more port groups of the plurality of port groups based at least in part on a first number of antenna elements of the first antenna panel, and a second antenna panel of the base station is mapped to a single port group of the plurality of port groups based at least in part on a second number of antenna elements of the second antenna panel.

Aspect 10: The method of any of aspects 7 through 9, wherein the plurality of port groups is based at least in part on one or more CDM groups associated with CSI-RS locations, the CSI report configuration indicating a mapping between each of the one or more CDM groups and respective port groups of the plurality of port groups.

Aspect 11: The method of any of aspects 1 through 10, further comprising: generating the CSI feedback based at least in part on a CSI-RS resource of the one or more CSI-RS resources being mapped to multiple sub-panels of an antenna panel of the base station in accordance with the CSI report configuration.

Aspect 12: The method of aspect 11, wherein generating the CSI feedback comprises: identifying a plurality of port groups associated with the one or more CSI-RSs, wherein at least a first port group of the plurality of port groups is associated with a first set of CSI-RS ports and a second port group of the plurality of port groups is associated with a second set of CSI-RS ports; and generating the CSI feedback based at least in part on the plurality of port groups.

Aspect 13: The method of aspect 12, wherein each port group of the plurality of port groups is mapped to respective sub-panels of the antenna panel of the base station.

Aspect 14: The method of any of aspects 12 through 13, wherein a first sub-panel of the antenna panel is mapped to one or more port groups of the plurality of port groups based at least in part on a first number of antenna elements of the first sub-panel, and a second sub-panel of the antenna panel is mapped to a single port group of the plurality of port groups based at least in part on a second number of antenna elements of the second sub-panel.

Aspect 15: The method of any of aspects 12 through 14, wherein the plurality of port groups is based at least in part on one or more CDM groups associated with CSI-RS locations, the CSI report configuration indicating a mapping between each of the one or more CDM groups and respective port groups of the plurality of port groups.

Aspect 16: The method of any of aspects 1 through 15, wherein the CSI report configuration is associated with a single TCI state.

Aspect 17: A method for wireless communications at a UE, comprising: receiving, from a base station, signaling indicating a CSI report configuration that indicates one or more CSI-RS resources, wherein the one or more CSI-RS resources correspond to a set of antenna panels of the base station, a set of sub-panels of an antenna panel of the base station, or any combination thereof; generating CSI based at least in part on a plurality of hypotheses corresponding to measurements of one or more CSI-RSs received on the one or more CSI-RS resources, wherein the plurality of hypotheses are based at least in part on the set of antenna panels, the set of sub-panels, or any combination thereof; and transmitting, to the base station, a message reporting CSI feedback based at least in part on the plurality of hypotheses.

Aspect 18: The method of aspect 17, wherein the plurality of hypotheses comprises a set of hypothesis groups, the set of hypothesis groups comprising at least one of: a first hypothesis group of the set of hypothesis groups comprising one or more hypotheses based at least in part on respective antenna panels of the set of antenna panels, respective sub-panels of the set of sub-panels, or any combination thereof, a second hypothesis group of the set of hypothesis groups comprising one or more hypotheses based at least in part on antenna panel pairs of the set of antenna panels, sub-panel pairs of the set of sub-panels, or any combination thereof; a third hypothesis group of the set of hypothesis groups comprising one or more hypotheses based at least in part on a plurality of antenna panels of the set of antenna panels, a plurality of sub-panels of the set of sub-panels, or any combination thereof, or a fourth hypothesis group of the set of hypothesis groups comprising a single hypothesis based at least in part on the set of antenna panels, the set of sub-panels, or any combination thereof.

Aspect 19: The method of aspect 18, further comprising: receiving, within the CSI report configuration, an indication to use one or more hypothesis groups from the set of hypothesis groups, wherein generating the CSI feedback is based at least in part on the one or more hypothesis groups.

Aspect 20: The method of any of aspects 17 through 19, wherein transmitting the message reporting the CSI feedback comprises: generating a first CSI report comprising first CSI feedback that is based at least in part on a first hypothesis selected from a first plurality of hypotheses of a first hypothesis group; generating a second CSI report comprising second CSI feedback that is based at least in part on a second hypothesis selected from a second plurality of hypotheses of a second hypothesis group; and transmitting the first CSI report and the second CSI report to the base station.

Aspect 21: The method of any of aspects 17 through 20, wherein transmitting the message reporting the CSI feedback comprises: generating one or more first CSI reports each comprising CSI feedback that is based at least in part on respective hypotheses selected from a first plurality of hypotheses of a first hypothesis group; generating one or more second CSI reports each comprising CSI feedback that is based at least in part on respective hypotheses selected from a second plurality of hypotheses of a second hypothesis group; and transmitting the one or more first CSI reports and the one or more second CSI reports to the base station.

Aspect 22: The method of any of aspects 17 through 21, wherein transmitting the message reporting the CSI feedback comprises: generating a first CSI report comprising first CSI feedback that is based at least in part on a first hypothesis selected from a set of hypothesis groups; generating a second CSI report comprising second CSI feedback that is based at least in part on a second hypothesis corresponding to a single antenna panel of the set of antenna panels, or a single sub-panel of the set of sub-panels, or any combination thereof, and transmitting the first CSI report and the second CSI report to the base station.

Aspect 23: The method of any of aspects 17 through 22, wherein transmitting the message reporting the CSI feedback comprises: generating a first CSI report comprising first CSI feedback that is based at least in part on a first hypothesis selected from a set of hypothesis groups; generating a second CSI report comprising second CSI feedback that is based at least in part on a second hypothesis corresponding to a threshold number of antenna panels of the set of antenna panels, or a threshold number of sub-panels of the set of sub-panels, or any combination thereof, and transmitting the first CSI report and the second CSI report to the base station.

Aspect 24: The method of any of aspects 17 through 23, wherein the plurality of hypotheses comprises a set of hypothesis groups, and the method further comprising: determining respective CSI-RS resource indicators for respective hypotheses from each hypothesis group, or respective CSI-RS resource indicators for respective hypotheses from the set of hypothesis groups, or any combination thereof, wherein the CSI feedback comprises an indication of the respective CSI-RS resource indicators.

Aspect 25: The method of any of aspects 17 through 24, further comprising: transmitting, to the base station, signaling comprising capability information for the UE, the capability information comprising a threshold number of hypothesis groups, or a threshold number of hypotheses within a hypothesis group, or a threshold number of CSI reports within a hypothesis group, or a threshold number of CSI reports for a plurality of hypothesis groups, or any combination thereof.

Aspect 26: A method for wireless communications at a base station, comprising: transmitting, to a UE, signaling indicating a CSI report configuration that indicates one or more CSI-RS resources, wherein the one or more CSI-RS resources correspond to at least one antenna panel of the base station; transmitting one or more CSI-RSs on the one or more CSI-RS resources based at least in part on the CSI report configuration; and receiving, from the UE, a message reporting CSI feedback based at least in part on measurements associated with the received one or more CSI-RSs.

Aspect 27: The method of aspect 26, further comprising: determining a mapping between respective CSI-RS resources of the one or more CSI-RS resources and respective antenna panels of the base station, the CSI report configuration indicating the mapping, wherein the CSI feedback is based at least in part on the respective CSI-RS resources of the one or more CSI-RS resources being mapped to the respective antenna panels of the base station in accordance with the CSI report configuration.

Aspect 28: The method of any of aspects 26 through 27, further comprising: determining a mapping between a CSI-RS resource of the one or more CSI-RS resources and multiple antenna panels of the base station; and identifying a plurality of port groups associated with the one or more CSI-RSs, at least a first port group of the plurality of port groups being associated with a first set of CSI-RS ports and a second port group of the plurality of port groups being associated with a second set of CSI-RS ports, wherein the CSI feedback is based at least in part on a plurality of port groups and the CSI-RS resource being mapped to the multiple antenna panels of the base station, and wherein the plurality of port groups is based at least in part on one or more CDM groups associated with CSI-RS locations.

Aspect 29: The method of any of aspects 26 through 28, further comprising: determining a mapping between a CSI-RS resource of the one or more CSI-RS resources and multiple sub-panels of an antenna panel of the base station; and identifying a plurality of port groups associated with the one or more CSI-RSs, at least a first port group of the plurality of port groups being associated with a first set of CSI-RS ports and a second port group of the plurality of port groups being associated with a second set of CSI-RS ports, wherein the CSI feedback is based at least in part on the plurality of port groups and the CSI-RS resource being mapped to the multiple sub-panels, and wherein the plurality of port groups is based at least in part on one or more CDM groups associated with CSI-RS locations.

Aspect 30: An apparatus for wireless communications at a UE, comprising a processor; memory coupled with the processor; and instructions stored in the memory and executable by the processor to cause the apparatus to perform a method of any of aspects 1 through 16.

Aspect 31: An apparatus for wireless communications at a UE, comprising at least one means for performing a method of any of aspects 1 through 16.

Aspect 32: A non-transitory computer-readable medium storing code for wireless communications at a UE, the code comprising instructions executable by a processor to perform a method of any of aspects 1 through 16.

Aspect 33: An apparatus for wireless communications at a UE, comprising a processor; memory coupled with the processor; and instructions stored in the memory and executable by the processor to cause the apparatus to perform a method of any of aspects 17 through 25.

Aspect 34: An apparatus for wireless communications at a UE, comprising at least one means for performing a method of any of aspects 17 through 25.

Aspect 35: A non-transitory computer-readable medium storing code for wireless communications at a UE, the code comprising instructions executable by a processor to perform a method of any of aspects 17 through 25.

Aspect 36: An apparatus for wireless communications at a base station, comprising a processor; memory coupled with the processor; and instructions stored in the memory and executable by the processor to cause the apparatus to perform a method of any of aspects 26 through 29.

Aspect 37: An apparatus for wireless communications at a base station, comprising at least one means for performing a method of any of aspects 26 through 29.

Aspect 38: A non-transitory computer-readable medium storing code for wireless communications at a base station, the code comprising instructions executable by a processor to perform a method of any of aspects 26 through 29.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
a memory; and
a processor coupled to the memory and configured to:
receive, from a network device, signaling indicating a channel state information report configuration that indicates one or more channel state information reference signal resources, wherein the channel state information report configuration indicates a mapping between the one or more channel state information reference signal resources and one or more active antenna panels of the network device or one or more active subpanels of the network device;
receive one or more channel state information reference signals on the one or more channel state information reference signal resources based at least in part on the channel state information report configuration; and
transmit, to the network device, a message reporting channel state information feedback based at least in part on measurements associated with the received one or more channel state information reference signals.

2. The apparatus of claim 1, wherein the processor is further configured to:
generate the channel state information feedback based at least in part on respective channel state information reference signal resources of the one or more channel state information reference signal resources being mapped to respective antenna panels of the network device in accordance with the channel state information report configuration.

3. The apparatus of claim 2, wherein, to generate the channel state information feedback, the processor is configured to:
generate the channel state information feedback based at least in part on a first quantity of channel state information reference signal ports associated with a first antenna panel of the network device and a second quantity of channel state information reference signal ports associated with a second antenna panel of the network device, the first antenna panel being mapped to a first channel state information reference signal resource and the second antenna panel being mapped to a second channel state information reference signal resource.

4. The apparatus of claim 3, wherein the first quantity of channel state information reference signal ports is the same as the second quantity of channel state information reference signal ports based at least in part on a number of antenna elements of the first antenna panel being the same as a number of antenna elements of the second antenna panel.

5. The apparatus of claim 3, wherein the first quantity of channel state information reference signal ports is different from the second quantity of channel state information reference signal ports based at least in part on a number of antenna elements of the first antenna panel being different from a number of antenna elements of the second antenna panel.

6. The apparatus of claim 1, wherein the processor is further configured to:
generate the channel state information feedback based at least in part on a channel state information reference signal resource of the one or more channel state information reference signal resources being mapped to multiple antenna panels of the network device in accordance with the channel state information report configuration.

7. The apparatus of claim 6, wherein, to generate the channel state information feedback, the processor is configured to:
identify a plurality of port groups associated with the one or more channel state information reference signals, wherein at least a first port group of the plurality of port groups is associated with a first set of channel state information reference signal ports and a second port group of the plurality of port groups is associated with a second set of channel state information reference signal ports; and
generate the channel state information feedback based at least in part on the plurality of port groups.

8. The apparatus of claim 7, wherein each port group of the plurality of port groups is mapped to a respective antenna panel of the network device.

9. The apparatus of claim 7, wherein:
a first antenna panel of the network device is mapped to one or more port group of the plurality of port groups based at least in part on a first number of antenna elements of the first antenna panel, and
a second antenna panel of the network device is mapped to a single port group of the plurality of port groups based at least in part on a second number of antenna elements of the second antenna panel.

10. The apparatus of claim 7, wherein the plurality of port groups is based at least in part on one or more code division multiplexing groups associated with channel state information reference signal locations, the channel state information report configuration indicating a mapping between each of the one or more code division multiplexing groups and respective port groups of the plurality of port groups.

11. The apparatus of claim 1, wherein the processor is further configured to:
generate the channel state information feedback based at least in part on a channel state information reference signal resource of the one or more channel state information reference signal resources being mapped to multiple sub-panels of an antenna panel of the network device in accordance with the channel state information report configuration.

12. The apparatus of claim 11, wherein, to generate the channel state information feedback, the processor is configured to:
identify a plurality of port groups associated with the one or more channel state information reference signals, wherein at least a first port group of the plurality of port groups is associated with a first set of channel state information reference signal ports and a second port group of the plurality of port groups is associated with a second set of channel state information reference signal ports; and
generate the channel state information feedback based at least in part on the plurality of port groups.

13. The apparatus of claim 12, wherein each port group of the plurality of port groups is mapped to respective sub-panels of the antenna panel of the network device.

14. The apparatus of claim 12, wherein:
a first sub-panel of the antenna panel is mapped to one or more port group of the plurality of port groups based at least in part on a first number of antenna elements of the first sub-panel, and a second sub-panel of the antenna panel is mapped to a single port group of the plurality of port groups based at least in part on a second number of antenna elements of the second sub-panel.

15. The apparatus of claim 12, wherein the plurality of port groups is based at least in part on one or more code division multiplexing groups associated with channel state information reference signal locations, the channel state information report configuration indicating a mapping between each of the one or more code division multiplexing groups and respective port groups of the plurality of port groups.

16. The apparatus of claim 1, wherein the channel state information report configuration is associated with a single transmission configuration indicator state.

17. An apparatus for wireless communications at a user equipment (UE), comprising:
a memory; and
a processor coupled to the memory and configured to
receive, from a network device, signaling indicating a channel state information report configuration that indicates one or more channel state information reference signal resources, wherein the channel state information report configuration indicates a mapping between the one or more channel state information reference signal resources and a set of active antenna panels of the network device, a set of active sub-panels of an antenna panel of the network device, or any combination thereof;
generate channel state information based at least in part on a plurality of hypotheses corresponding to measurements of one or more channel state information reference signals received on the one or more channel state information reference signal resources, wherein the plurality of hypotheses are based at least in part on the set of active antenna panels, the set of active sub-panels, or any combination thereof, and
transmit, to the base station network device, a message reporting channel state information feedback based at least in part on the plurality of hypotheses.

18. The apparatus of claim 17, wherein the plurality of hypotheses comprises a set of hypothesis groups, the set of hypothesis groups comprising at least one of:
a first hypothesis group of the set of hypothesis groups comprising one or more hypotheses based at least in part on respective antenna panels of the set of active antenna panels, respective sub-panels of the set of active sub-panels, or any combination thereof;
a second hypothesis group of the set of hypothesis groups comprising one or more hypotheses based at least in part on antenna panel pairs of the set of active antenna panels, sub-panel pairs of the set of active sub-panels, or any combination thereof;
a third hypothesis group of the set of hypothesis groups comprising one or more hypotheses based at least in part on a plurality of antenna panels of the set of active antenna panels, a plurality of sub-panels of the set of active sub-panels, or any combination thereof, or
a fourth hypothesis group of the set of hypothesis groups comprising a single hypothesis based at least in part on the set of active antenna panels, the set of active sub-panels, or any combination thereof.

19. The apparatus of claim 18, wherein the processor is further configured to:
receive, within the channel state information report configuration, an indication to use one or more hypothesis groups from the set of hypothesis groups, wherein generating the channel state information feedback is based at least in part on the one or more hypothesis groups.

20. The apparatus of claim 17, wherein, to transmit the message reporting the channel state information feedback, the processor is configured to:
generate a first channel state information report comprising first channel state information feedback that is based at least in part on a first hypothesis selected from a first plurality of hypotheses of a first hypothesis group;
generate a second channel state information report comprising second channel state information feedback that is based at least in part on a second hypothesis selected from a second plurality of hypotheses of a second hypothesis group; and
transmit the first channel state information report and the second channel state information report to the network device.

21. The apparatus of claim 17, wherein, to transmit the message reporting the channel state information feedback, the processor is configured to:
generate one or more first channel state information reports each comprising channel state information feedback that is based at least in part on respective hypotheses selected from a first plurality of hypotheses of a first hypothesis group;
generate one or more second channel state information reports each comprising channel state information feedback that is based at least in part on respective hypotheses selected from a second plurality of hypotheses of a second hypothesis group; and
transmit the one or more first channel state information reports and the one or more second channel state information reports to the network device.

22. The apparatus of claim 17, wherein, to transmit the message reporting the channel state information feedback, the processor is configured to:
generate a first channel state information report comprising first channel state information feedback that is based at least in part on a first hypothesis selected from a set of hypothesis groups;
generate a second channel state information report comprising second channel state information feedback that is based at least in part on a second hypothesis corresponding to a single antenna panel of the set of active antenna panels, or a single sub-panel of the set of active sub-panels, or any combination thereof; and
transmit the first channel state information report and the second channel state information report to the network device.

23. The apparatus of claim 17, wherein, to transmit the message reporting the channel state information feedback, the processor is configured to:
generate a first channel state information report comprising first channel state information feedback that is based at least in part on a first hypothesis selected from a set of hypothesis groups;
generate a second channel state information report comprising second channel state information feedback that is based at least in part on a second hypothesis corresponding to a threshold number of antenna panels of the set of active antenna panels, or a threshold number of sub-panels of the set of active sub-panels, or any combination thereof; and transmit the first channel state information report and the second channel state information report to the base station network device.

24. The apparatus of claim 17, wherein the plurality of hypotheses comprises a set of hypothesis groups, and the processor is further configured to:
   determine respective channel state information reference signal resource indicators for respective hypotheses from each hypothesis group, or respective channel state information reference signal resource indicators for respective hypotheses from the set of hypothesis groups, or any combination thereof, wherein the channel state information feedback comprises an indication of the respective channel state information reference signal resource indicators.

25. The apparatus of claim 17, wherein the processor is further configured to:
   transmit, to the network device, signaling comprising capability information for the UE, the capability information comprising a threshold number of hypothesis groups, or a threshold number of hypotheses within a hypothesis group, or a threshold number of channel state information reports within a hypothesis group, or a threshold number of channel state information reports for a plurality of hypothesis groups, or any combination thereof.

26. An apparatus for wireless communications at network device, comprising:
   a memory; and
   a processor coupled to the memory and configured to:
      transmit, to a user equipment (UE), signaling indicating a channel state information report configuration that indicates one or more channel state information reference signal resources, wherein the channel state information report configuration indicates a mapping between the one or more channel state information reference signal resources and one or more active antenna panels of the network device or one or more active subpanels of the network device;
      transmit one or more channel state information reference signals on the one or more channel state information reference signal resources based at least in part on the channel state information report configuration; and
      receive, from the UE, a message reporting channel state information feedback based at least in part on measurements associated with the received one or more channel state information reference signals.

27. The apparatus of claim 26, wherein the processor is further configured to:
   determine the mapping between respective channel state information reference signal resources of the one or more channel state information reference signal resources and respective antenna panels of the network device, the channel state information report configuration indicating the mapping, wherein the channel state information feedback is based at least in part on the respective channel state information reference signal resources of the one or more channel state information reference signal resources being mapped to the respective antenna panels of the network device in accordance with the channel state information report configuration.

28. The apparatus of claim 26, wherein the processor is further configured to:
   determine the mapping between a channel state information reference signal resource of the one or more channel state information reference signal resources and multiple antenna panels of the network device; and
   identify a plurality of port groups associated with the one or more channel state information reference signals, at least a first port group of the plurality of port groups being associated with a first set of channel state information reference signal ports and a second port group of the plurality of port groups being associated with a second set of channel state information reference signal ports, wherein the channel state information feedback is based at least in part on the plurality of port groups and the channel state information reference signal resource being mapped to the multiple antenna panels of the network device, and wherein the plurality of port groups is based at least in part on one or more code division multiplexing groups associated with channel state information reference signal locations.

29. The apparatus of claim 26, wherein the processor is further configured to:
   determine the mapping between a channel state information reference signal resource of the one or more channel state information reference signal resources and multiple sub-panels of an antenna panel of the network device; and
   identify a plurality of port groups associated with the one or more channel state information reference signals, at least a first port group of the plurality of port groups being associated with a first set of channel state information reference signal ports and a second port group of the plurality of port groups being associated with a second set of channel state information reference signal ports, wherein the channel state information feedback is based at least in part on the plurality of port groups and the channel state information reference signal resource being mapped to the multiple sub-panels, and wherein the plurality of port groups is based at least in part on one or more code division multiplexing groups associated with channel state information reference signal locations.

30. A method for wireless communications at a user equipment (UE), comprising:
   receiving, from a network device, signaling indicating a channel state information report configuration that indicates one or more channel state information reference signal resources, wherein the channel state information report configuration indicates a mapping between the one or more channel state information reference signal resources and one or more active antenna panels of the network device or one or more active subpanels of the network device;
   receiving one or more channel state information reference signals on the one or more channel state information reference signal resources based at least in part on the channel state information report configuration; and
   transmitting, to the network device, a message reporting channel state information feedback based at least in part on measurements associated with the received one or more channel state information reference signals.

* * * * *